INVENTOR
R. A. CHANEY
BY
S E Hollander
ATTORNEY

Nov. 28, 1967 R. A. CHANEY 3,355,556

AUTOMATIC MOBILE RADIO TELEPHONE SWITCHING SYSTEM

Filed May 18, 1964 42 Sheets-Sheet 2

AUTOMATIC MOBILE RADIO TELEPHONE SWITCHING SYSTEM

Filed May 18, 1964 42 Sheets-Sheet 6

Nov. 28, 1967 R. A. CHANEY 3,355,556

AUTOMATIC MOBILE RADIO TELEPHONE SWITCHING SYSTEM

Filed May 18, 1964 42 Sheets-Sheet 7

Nov. 28, 1967 R. A. CHANEY 3,355,556

AUTOMATIC MOBILE RADIO TELEPHONE SWITCHING SYSTEM

Filed May 18, 1964 42 Sheets-Sheet 8

Nov. 28, 1967 R. A. CHANEY 3,355,556

AUTOMATIC MOBILE RADIO TELEPHONE SWITCHING SYSTEM

Filed May 18, 1964 42 Sheets-Sheet 10

Nov. 28, 1967 R. A. CHANEY 3,355,556

AUTOMATIC MOBILE RADIO TELEPHONE SWITCHING SYSTEM

Filed May 18, 1964 42 Sheets-Sheet 15

AUTOMATIC MOBILE RADIO TELEPHONE SWITCHING SYSTEM

Filed May 18, 1964 42 Sheets-Sheet 17

Nov. 28, 1967 R. A. CHANEY 3,355,556

AUTOMATIC MOBILE RADIO TELEPHONE SWITCHING SYSTEM

Filed May 18, 1964 42 Sheets-Sheet 18

Nov. 28, 1967 R. A. CHANEY 3,355,556

AUTOMATIC MOBILE RADIO TELEPHONE SWITCHING SYSTEM

Filed May 18, 1964 42 Sheets-Sheet 21

AUTOMATIC MOBILE RADIO TELEPHONE SWITCHING SYSTEM

Filed May 18, 1964 42 Sheets-Sheet 22

Nov. 28, 1967 R. A. CHANEY 3,355,556

AUTOMATIC MOBILE RADIO TELEPHONE SWITCHING SYSTEM

Filed May 18, 1964 42 Sheets-Sheet 23

Nov. 28, 1967 R. A. CHANEY 3,355,556

AUTOMATIC MOBILE RADIO TELEPHONE SWITCHING SYSTEM

Filed May 18, 1964 42 Sheets-Sheet 25

Nov. 28, 1967 R. A. CHANEY 3,355,556

AUTOMATIC MOBILE RADIO TELEPHONE SWITCHING SYSTEM

Filed May 18, 1964 42 Sheets-Sheet 26

Nov. 28, 1967 R. A. CHANEY 3,355,556

AUTOMATIC MOBILE RADIO TELEPHONE SWITCHING SYSTEM

Filed May 18, 1964 42 Sheets-Sheet 28

Nov. 28, 1967 R. A. CHANEY 3,355,556

AUTOMATIC MOBILE RADIO TELEPHONE SWITCHING SYSTEM

Filed May 18, 1964 42 Sheets-Sheet 29

Nov. 28, 1967 R. A. CHANEY 3,355,556

AUTOMATIC MOBILE RADIO TELEPHONE SWITCHING SYSTEM

Filed May 18, 1964 42 Sheets-Sheet 30

Nov. 28, 1967 R. A. CHANEY 3,355,556

AUTOMATIC MOBILE RADIO TELEPHONE SWITCHING SYSTEM

Filed May 18, 1964 42 Sheets-Sheet 32

Nov. 28, 1967 R. A. CHANEY 3,355,556

AUTOMATIC MOBILE RADIO TELEPHONE SWITCHING SYSTEM

Filed May 18, 1964 42 Sheets-Sheet 33

Nov. 28, 1967 R. A. CHANEY 3,355,556

AUTOMATIC MOBILE RADIO TELEPHONE SWITCHING SYSTEM

Filed May 18, 1964 42 Sheets-Sheet 36

AUTOMATIC MOBILE RADIO TELEPHONE SWITCHING SYSTEM

Filed May 18, 1964

42 Sheets-Sheet 38

Nov. 28, 1967 R. A. CHANEY 3,355,556

AUTOMATIC MOBILE RADIO TELEPHONE SWITCHING SYSTEM

Filed May 18, 1964 42 Sheets-Sheet 40

Nov. 28, 1967 R. A. CHANEY 3,355,556

AUTOMATIC MOBILE RADIO TELEPHONE SWITCHING SYSTEM

Filed May 18, 1964 42 Sheets-Sheet 42

United States Patent Office 3,355,556
Patented Nov. 28, 1967

3,355,556
AUTOMATIC MOBILE RADIO TELEPHONE SWITCHING SYSTEM

Ralph A. Chaney, New Shrewsbury, N.J., assignor to American Telephone and Telegraph Company, New York, N.Y., a corporation of New York Filed May 18, 1964, Ser. No. 368,218
20 Claims. (Cl. 179—41)

ABSTRACT OF THE DISCLOSURE

In a mobile telephone system, service is provided closely approximating that available to land subscribers with full duplex operation and direct dialing to and from the mobile station. Each mobile unit is assigned a specific line termination in a central office and calls are extended through a control terminal from that termination. The control terminal includes facilities for distinguishing on the basis of different area codes between two mobiles having the same seven digit directory numbers. On outgoing calls the control terminal prefixes to the four digit station code the area code of the control terminal and transmits that to the mobile in place of the office code. On incoming calls differentiation between local and roaming mobiles is made on the basis of an area code comparison.

This invention relates to mobile radio telephone systems and more particularly to mobile telephone systems including unique facilities for differentially selecting among called mobile units and for detecting "foreign" (roaming) mobile units in a particular mobile area.

The literal mobility of telephone stations which are included in moving vehicles has presented a problem in prior arrangements which have attempted to afford automatic telephone operation to mobile users. It has been a goal of the mobile telephone service to approximate the facilities and conveniences available to fixed or immobile stations. As is well known, the latter have, in almost all instances, access to the direct distance dialing network and can complete calls to any substation within the network. Conversely, most fixed station subscribers can receive calls from any station within the network, all without the assistance or intervention of a telephone operator.

One approach to the provision of telephone service to mobile units on a basis which would minimize the distinctions in facilities available between mobile stations and fixed stations is to provide a terminal unique to each mobile station in a conventional telephone central office. All calls to and from the mobile station are completed over the line termination in the conventional office unique to the mobile station. The advantages in such an arrangement are manifest and include the facilitation of identification for billing purposes since the central office is, in effect, "unaware" that a mobile unit is (radio) linked to the termination in lieu of a conventional wire substation. While this procedure is expedient and advantageous, it carries in its wake a number of corresponding difficulties.

For example, in order to effect a terminating call to a particular mobile station from a fixed calling station, it is merely necessary to dial the exchange code and directory number digits unique to the line termination of the called mobile station. Thereafter, equipment in the control terminal will be effective to transmit by radio signals the identity of the called mobile station preparatory to extending a link thereto. Since mobile rather than fixed stations are involved, however, the selection of the called station by merely transmitting the digits or code unique to the office line termination assigned to the called mobile is insufficient. Thus, if the conventional directory number of the called New York city mobile station is REctor 2–1234, indicating that the subscriber has a termination in the REctor 2 telephone central office, the digits thus transmitted to the mobile unit would not differentially select between the desired mobile unit and a visiting or "roaming" mobile unit from Washington, D.C., for example, whose conventional directory number code is REpublic 2-1234. In short, since only the exchange code RE 2 and the digits 1234 would be transmitted, conflict might arise between the desired mobile unit "local" to the New York city area and the roaming mobile unit from Washington, D.C.

While it is conceivably possible to avoid this selection problem by restricting the assignment of mobile telephone numbers in such a manner that duplication would be avoided, the magnitude of such an undertaking would be imposing. It would require a nationwide registry of all mobile units with appropriate liaison between companies operating in different areas in order to insure that no two companies anywhere in the nation would assign the same exchange code and directory number to different mobile subscribers. Even if a task so onerous could be economically discharged, it would still severely restrict the technical advantages which flow from the "central office line termination per mobile subscriber" concept discussed above, since it would no longer be possible to arbitrarily assign mobile subscribers to a convenient conventional telephone office (having mobile radio facilities) but, instead, would necessitate the assignment of mobiles to offices and numbers which do not conflict with offices and numbers assigned by other companies. These difficulties are projected in sharpest relief when it is appreciated that this restriction would be necessary even as between such widely separated entities as companies operating in the northeast and companies operating in the southwest.

It is therefore an object of this invention to provide for the differential selection in any particular area among calling subscribers having identical directory numbers.

Still another object of this invention is to provide universal and unlimited freedom of movement by mobile telephone subscribers without the necessity of a nationwide registry of mobile station numbers.

Still another object of this invention is to provide for the completion of a call to a mobile unit by dialing the conventional directory number code assigned thereto in a manner analogous to that for calling a fixed station.

A further object of this invention is to provide for the unrestricted numbering of mobile stations independent of the numbering of mobile stations in any other area or company.

An additional object of this invention is to provide for the automatic selection of a called mobile station through a path including a line termination in a conventional telephone office unique to the called mobile station.

The analysis of the conveniences in traffic and billing which derive from the utilization of a line termination in a telephone office unique to each mobile station is apparent but in itself suggests the corollary inconvenience which obtains when it is appreciated that each mobile subscriber is assigned a line termination only in his local telephone area. Consequently, when a particular mobile subscriber from the New York area having the exchange code and directory number REctor 2–1234 is roaming in a "foreign" area (for example, Washington, D.C.), the question of calls to and from his mobile station is presented. In the first instance, facilities are necessary for permitting the calling roamer access to the telephone network in the manner to which he is accustomed in his local area but since no unique line termination is available, a problem arises with respect to the point of ingress of his call to the network and to exacting the applicable toll charges. Moreover, in extending an outgoing call to a roamer, the manner described above which includes a path over a termination unique to the called mobile station is unavailable since the roamer has no such terminal except in his "home" area.

It is therefore an additional object of this invention to provide for the immediate detection of originating calls by roaming mobile stations.

Still another object of this invention is to provide for the routing of originating calls from a roaming mobile to an assistance operator, automatically, and in response only to an off-hook condition at the calling roaming unit and the transmission of the calling mobile unit identification.

Still another object of this invention is to provide for the extension of terminating calls to a roaming mobile unit in an area where a local mobile unit has the identical exchange code and directory number.

These and other objects and features of the invention may be achieved in a specific illustrative embodiment in which a separate and unique telephone line termination is provided in a conventional office for each mobile station. Thus, for example, the New York city mobile customer whose directory number is REctor 2–1234 would have a specific line termination assigned to him in the REctor 2 telephone office. However, in lieu of having a conventional wire line coupled to the line termination, arrangements are provided for extending the line termination to a novel line switch unit associated with the radio equipment in the office which in turn extends the line termination to a link or radio channel over which the call may be completed to the remote mobile unit. Thus, the completion of a call to a mobile customer is simply executed by any calling customer from anywhere in the nation by dialing the directory number RE 2–1234 in the conventional manner. (Of course, if the call is a toll call or long distance call, the appropriate area code for New York city, 212, is included.) Conventional telephone switching facilities in the nationwide network extend the connection to the REctor 2 telephone office and ultimately to the line termination 1234 unique to the called mobile unit, all in a manner well known in the art. Thereupon, however, facilities coupled to the line termination regenerate the directory number and transmit a code pattern over an idle link indicative of the called substation identification. This code includes the area code 212 which is unique to the New York city area and the directory digits 1234 of the called mobile unit.

It may be observed at this juncture that the procedure utilized departs significantly from prior arrangements in which the area code is traditionally absorbed or "lost" prior to the final extension of the connection. In fact, area code 212, which may have been utilized by the calling customer, is absorbed in the switching network prior to the final selection of termination 1234 in the REctor 2 office. However, for purposes which will become apparent herein, the area code is expressly regenerated in selecting the called mobile station.

The rationale for this procedure is to discriminate between the New York city mobile having the exchange code REctor 2–1234 and divers roamers who may be present in the New York city area, for example, a roamer from Washington, D.C., having the exchange designation REpublic 2–1234. Since the New York city mobile signal selection transmission includes the area code 212, the correct mobile is selected by equipment which responds to the digits 212–1234. The Washington, D.C., mobile is arranged to respond only to the digits 202 (Washington, D.C. area code) 1234. The convenient differential selection among roamers and a home mobile station having the same conventional directory number is thus apparent.

In order to conveniently distinguish between roaming mobiles and local mobiles on the advent of mobile originated calls, a related procedure is followed. In this instance, each mobile is adapted to generate, in response to a signal from the central office, its own area code in addition to the directory number digits. In consequence, when a Washington, D.C., mobile originates a call in the New York city area, the digits 202–1234 will illustratively be transmitted to the control terminal at a New York city telephone office having mobile facilities. A comparison is made at the control terminal between the digits of the area code thus transmitted and the local area code digits (212). Facilities responsive to the mismatch effect a transfer of the call to a mobile operator who thereupon can extend the call and exact the appropriate toll charges.

If the corresponding local mobile subscriber having the exchange code REctor 2–1234 originates a call, the comparison of the area code digits with the local area code digits for the office effects a match and the call is extended via a radio channel to the actual line termination in the conventional office individual to the calling moble line. In the assumed illustration, the call will be extended to the line termination corresponding to directory number 1234 in the REctor 2 office. Facilities in the control terminal responsive to the extension of the connection to the line termination simulate a condition at the line termination equivalent to that which obtains on a call from a fixed station, that is, the tip and ring terminals are joined through an appropriate impedance to simulate the usual off-hook condition.

The central office may now proceed as though the calling station were, in fact, a fixed station by summoning a dial register (crossbar system) or line finder and first selector (step-by-step system) preparatory to extending the call through the telephone switching network. Facilities in the control terminal responsive to the coupling of the register to the line termination, in turn, transmit the central office dial tone signal to the remote mobile station. The calling subscriber thereupon dials in the conventional manner, the radio signals being converted to equivalent direct-current signals and supplied to the central office line terminal in a manner which, from the central office side of the terminal, is indistinguishable from conventional dial pulses. Thereafter, the switching equipment in the office proceeds to extend a connection to the called subscriber in response to the dialed digits in the usual manner.

In summary, the improved mobile telephone service is adapted to provide to the mobile subscriber the facilities and convenience heretofore available to fixed stations and in addition, to provide unrestricted mobility of movement between geographical and company areas. Viewed in over-all context, the system resembles a line concentrator including a relatively larger number of remote mobile stations, illustratively 480, and a relatively smaller number of radio channels (e.g. 8) linking the stations to a control terminal in the central office. At the office, the channels are "fanned-out" through crossbar switching equipment to terminations individual to the 480 mobile stations. Each of the stations has access to each of the radio channels (or "concentrator trunks"). As will be described herein, each mobile substation will be automatically coupled to an idle channel (if available) without the necessity of manual monitoring and selection. In addition, operations thereafter will be automatic and the ultimate connection between the mobile station and the corresponding termination at the office will be designed to provide a link equivalent to that which obtains between fixed stations.

The possibilities in such improved operation are apparent. Thus, it is apparent that a mobile subscriber traveling anywhere in the country may speak with any fixed (or, in fact, mobile) station anywhere else in the country. The unique identification procedure thus automatically and expeditiously opens to the calling mobile station the opportunity to reach any of the more than seventy million telephones in the country.

Currently the standard telephone numbering plan provides each subscriber with a directory number; in addition, for direct distance dialing, the country is divided into areas each assigned a unique area code. In accordance with this invention the mobile telephone subscriber may be assigned a telephone number just as if he were a normal subscriber. The complete code for the telephone subscriber will include ten digits. The first three digits, referred to as the area code, may be of the form N1X or N0X, where N represents any digit from 2 to 9 and X any digit from 0 to 9. The next seven digits, which are sometimes broadly referred to as the directory number or the telephone number, include two codes. The first of these, referred to as the exchange or office code, is of the form NNX. The last four digits, which are themselves sometimes referred to as the directory number, the line number or the station code, is of the form XXXX. In the subsequent discussion various of these terms are employed, but it is believed that the specific portion of the total telephone code referred to will be apparent from the context of the discussion.

These and other objects and features of the invention may be more readily comprehended from an examination of the following specification, appended claims, and attached drawing in which:

FIGS. 1A through 1H show a specific illustrative embodiment of the invention including the equipment at the control terminal connected to a telephone central office together with partial representations of the equipment in the sender circuit for prefixing the area code designation of a calling mobile unit and equipment in the register circuit for verifying the area code of a calling mobile unit to detect roamers;

Figure 5:
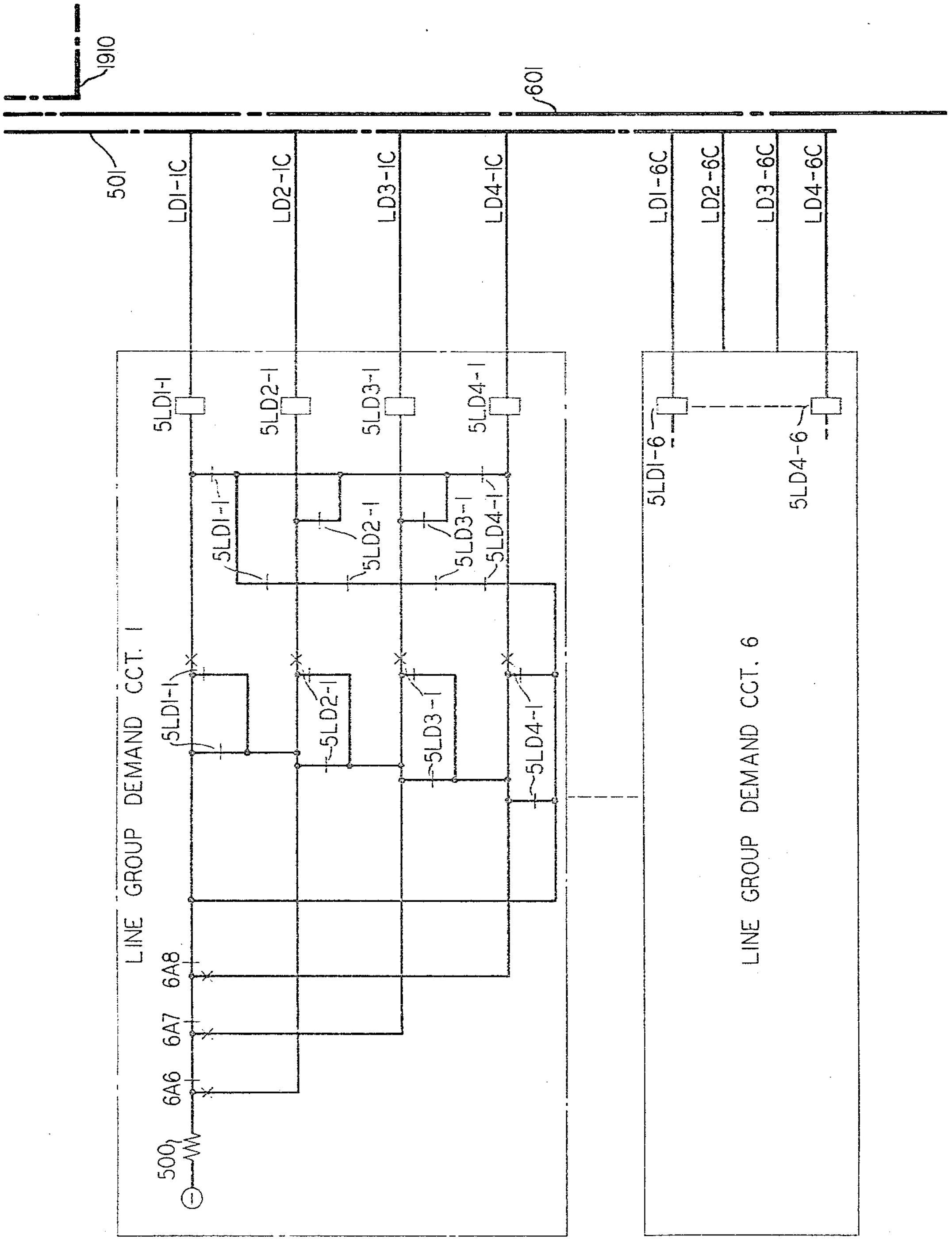
Figure 6:
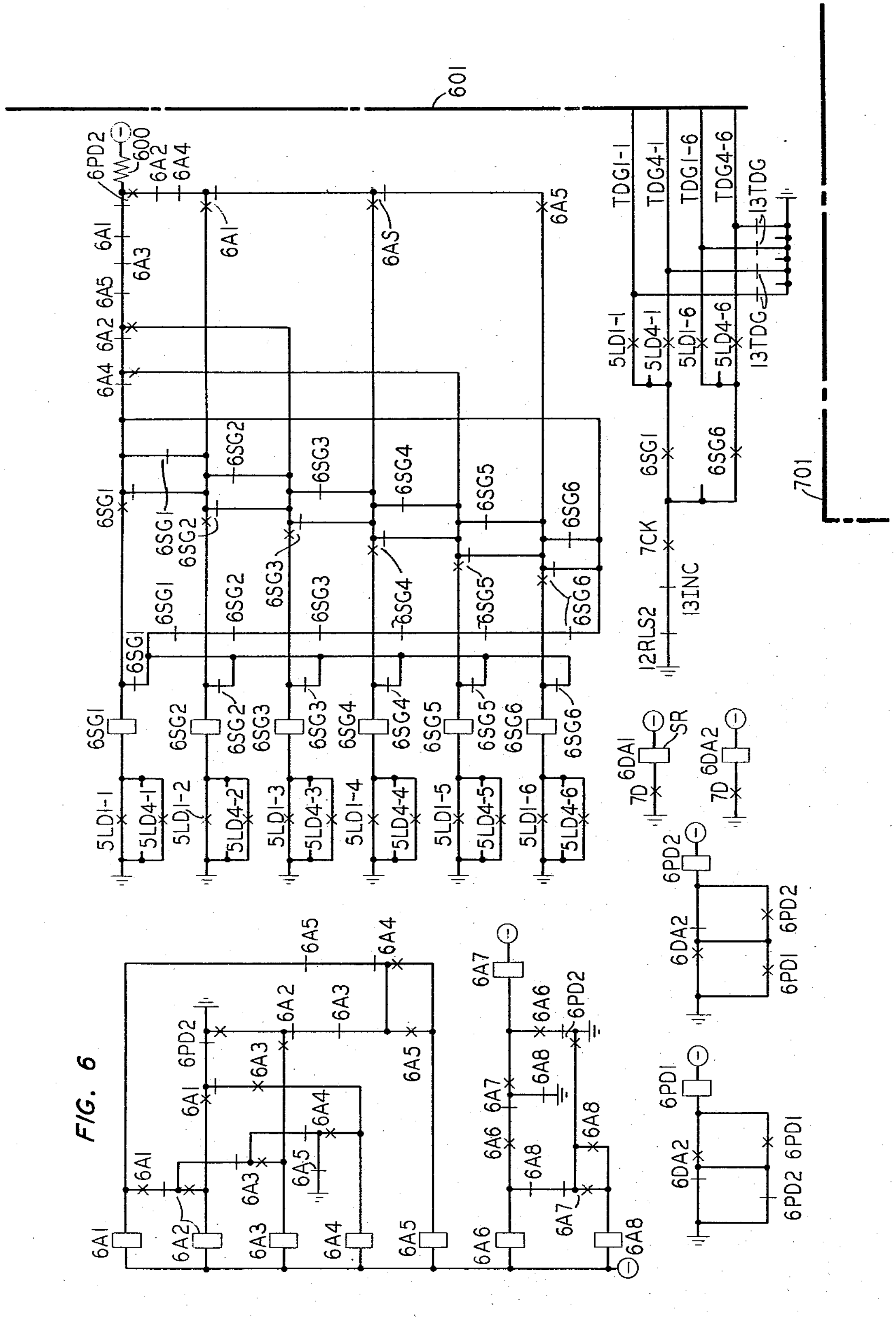
Figure 7:
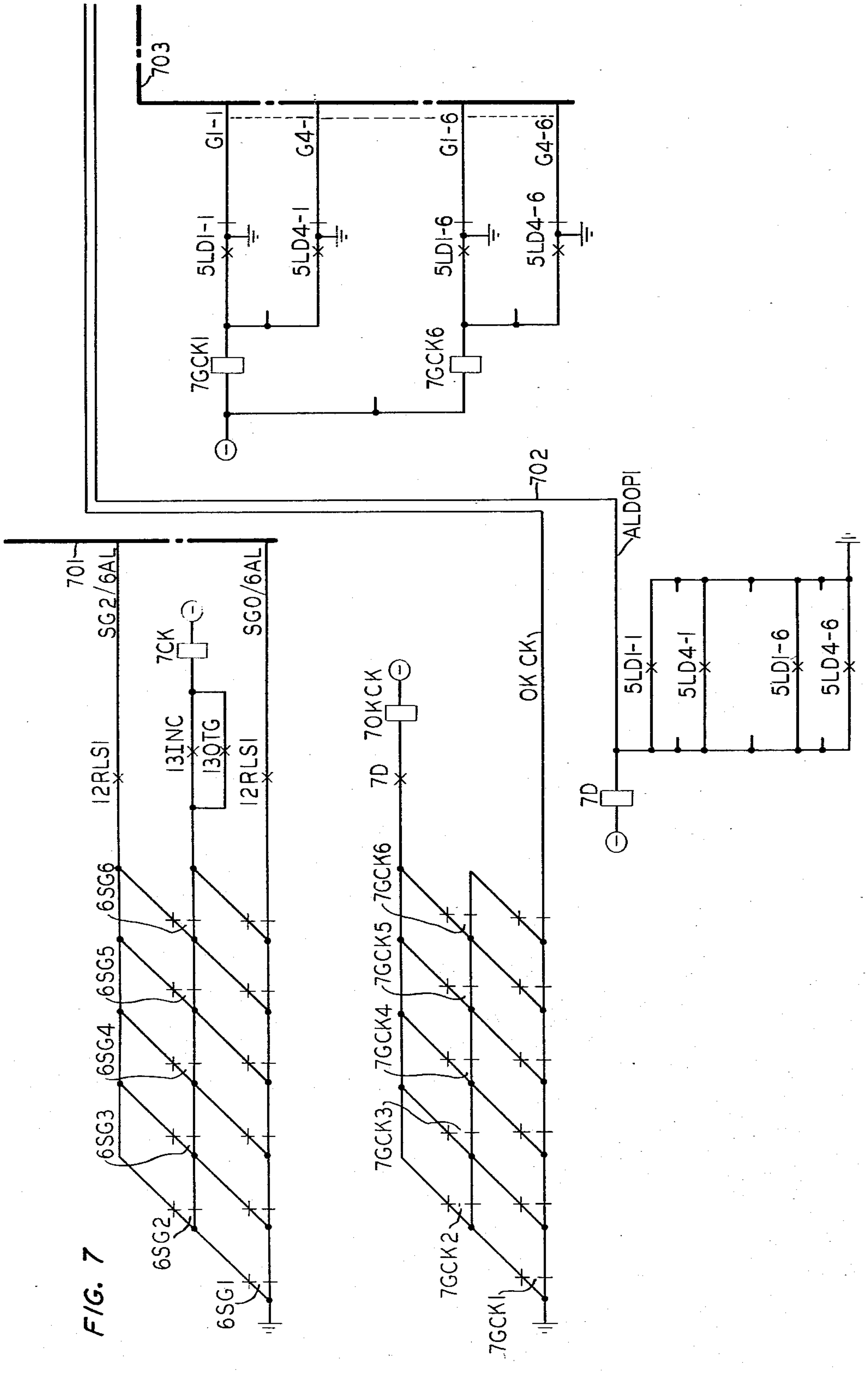
Figure 8:
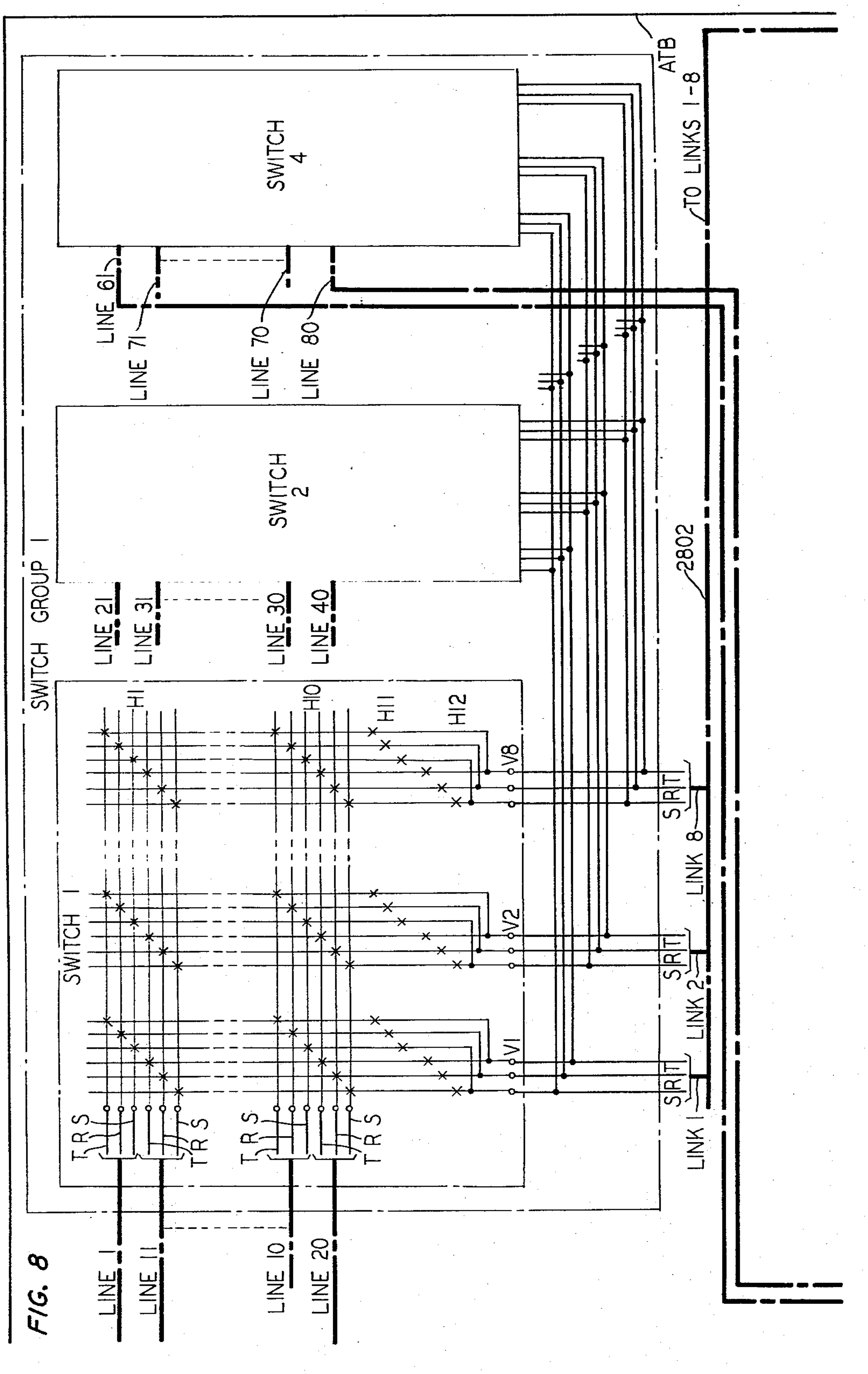
Figure 9:
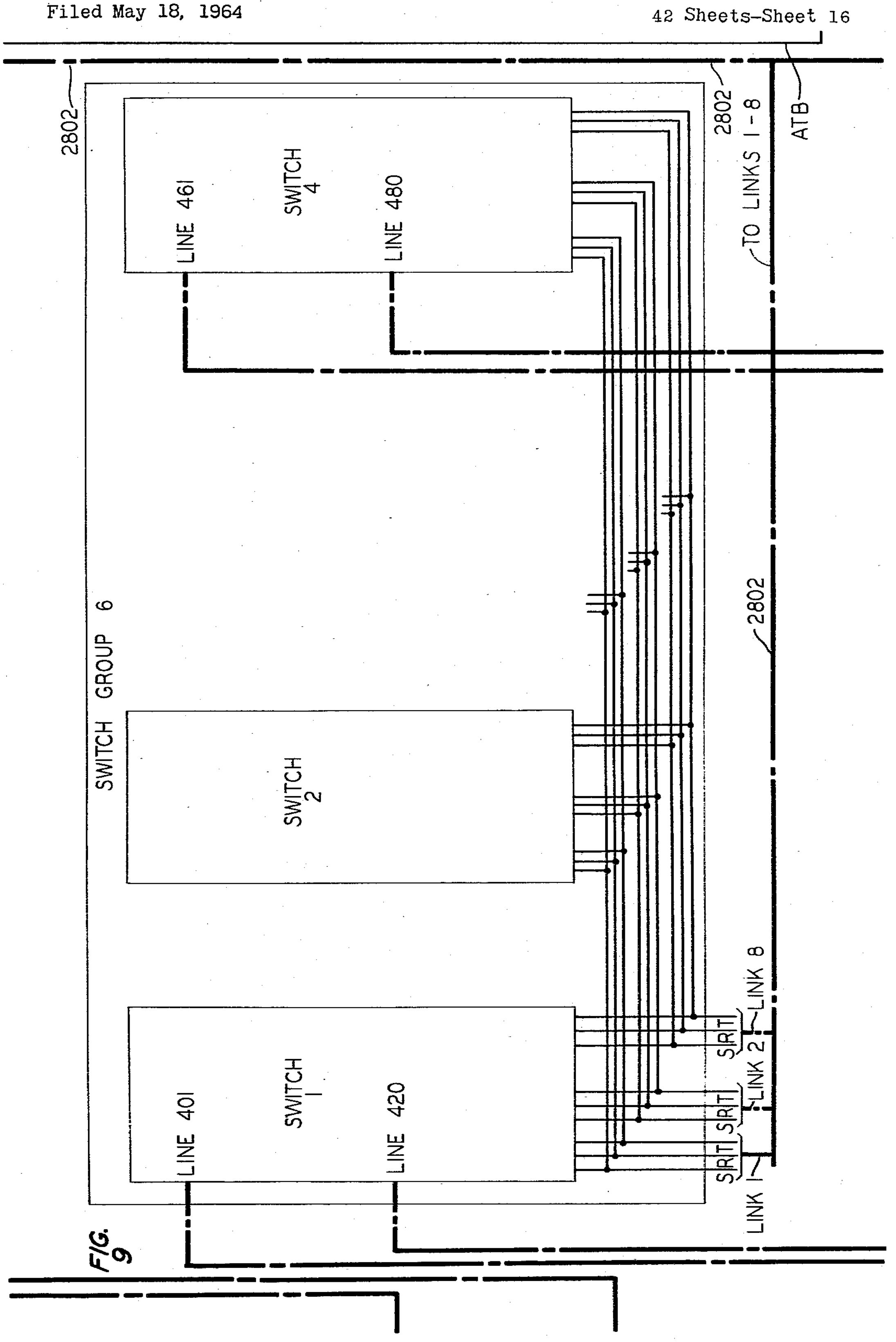
Figure 10:
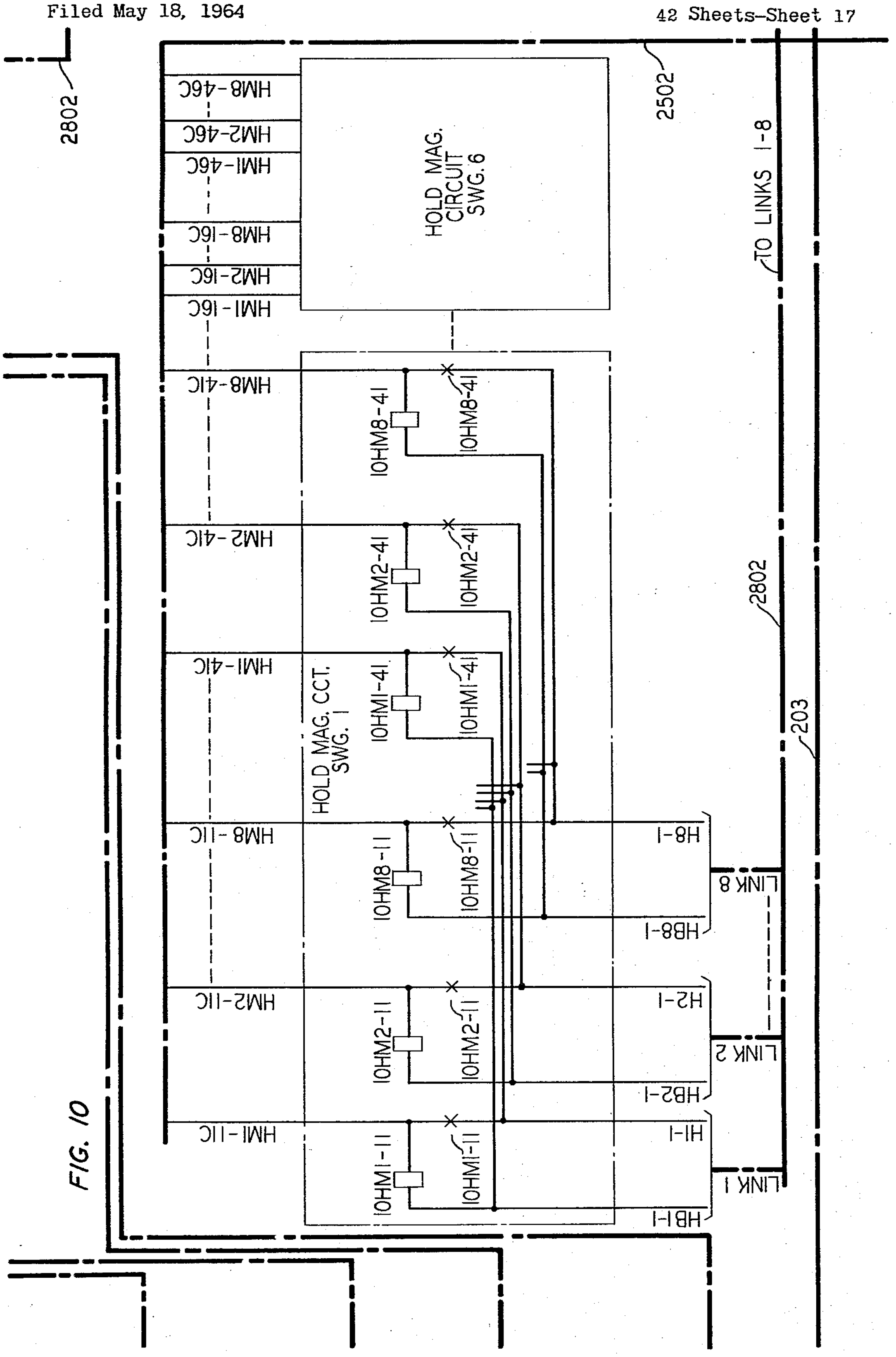
Figure 11:
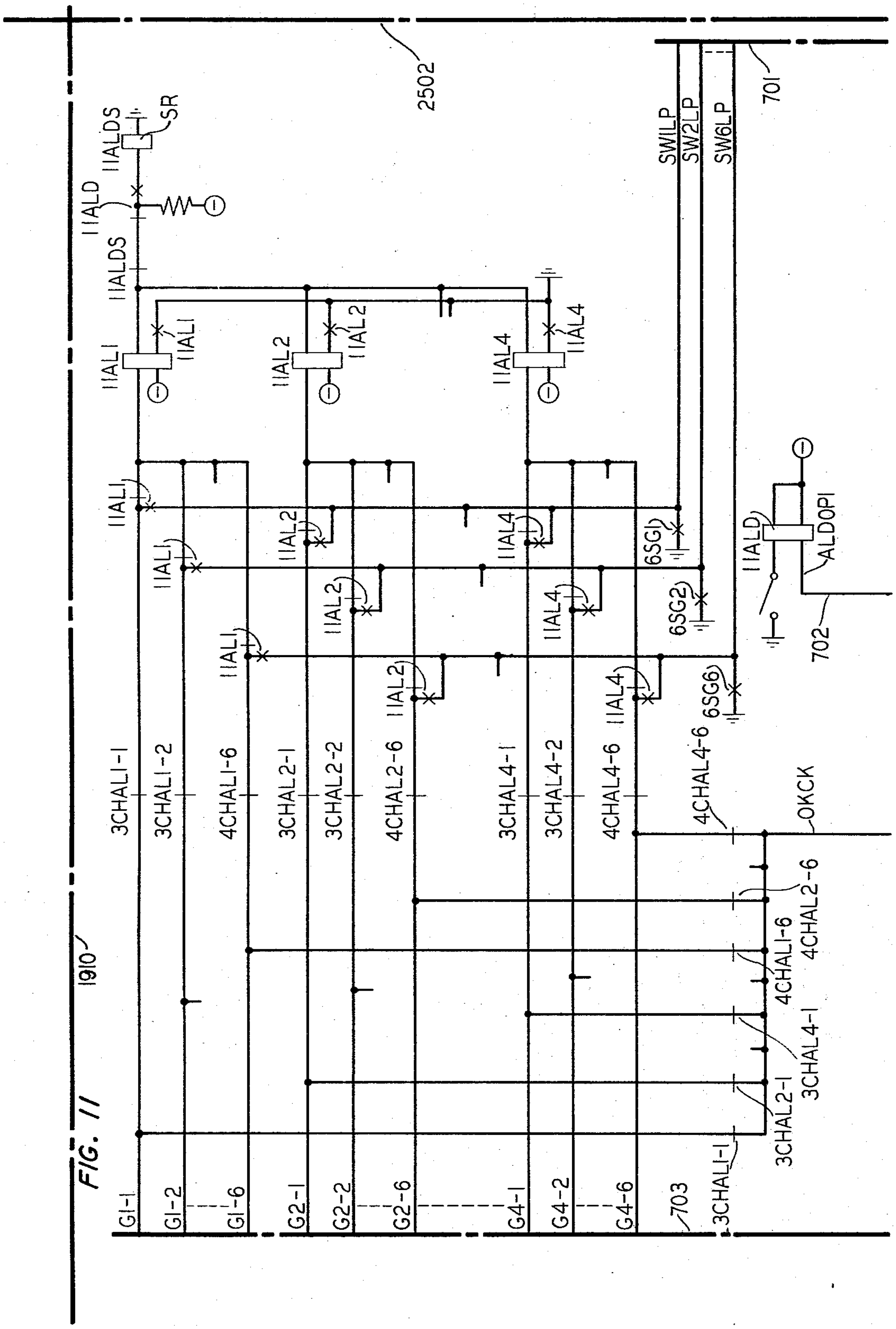
Figure 12:
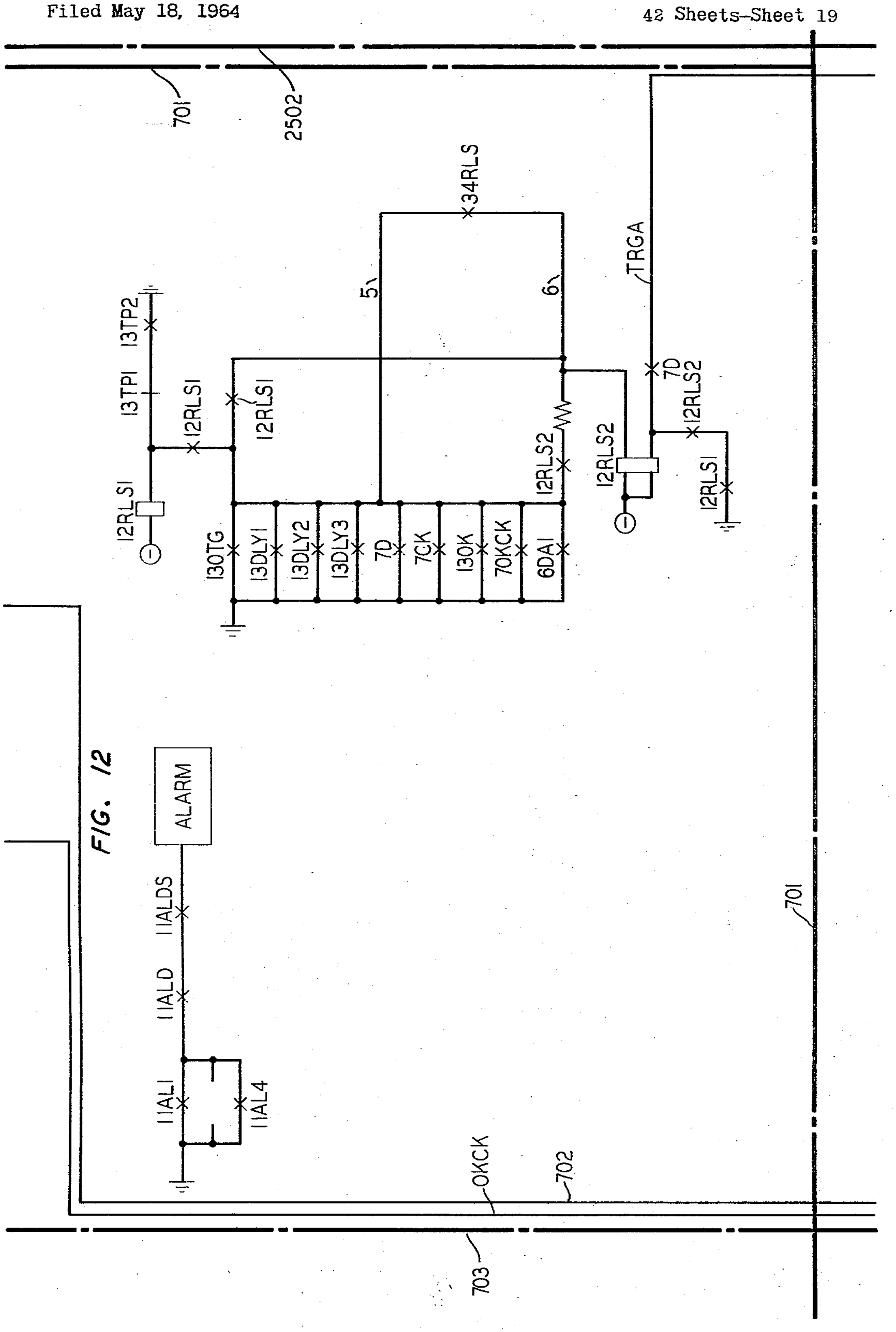
Figure 13:
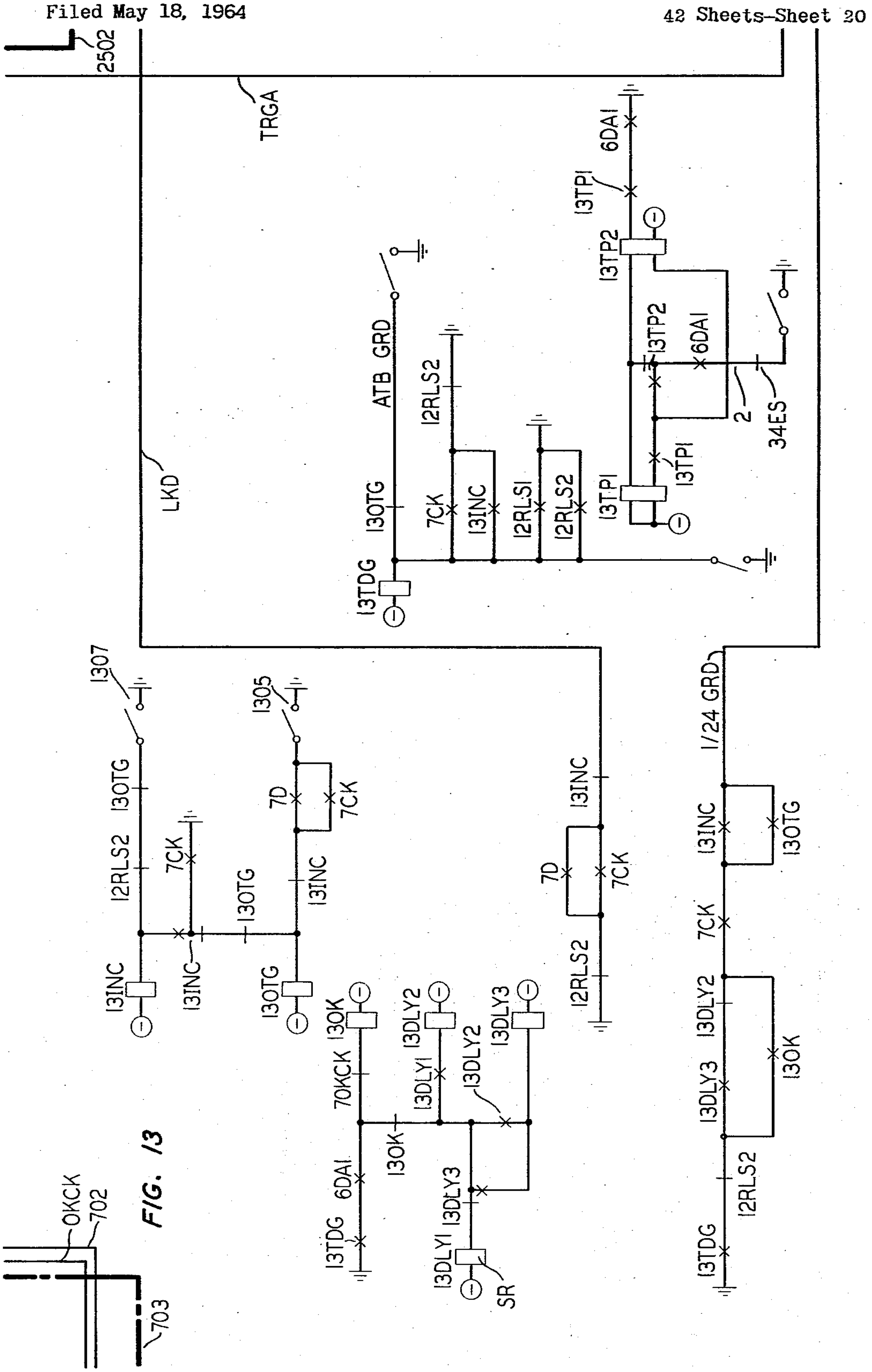
Figure 14:
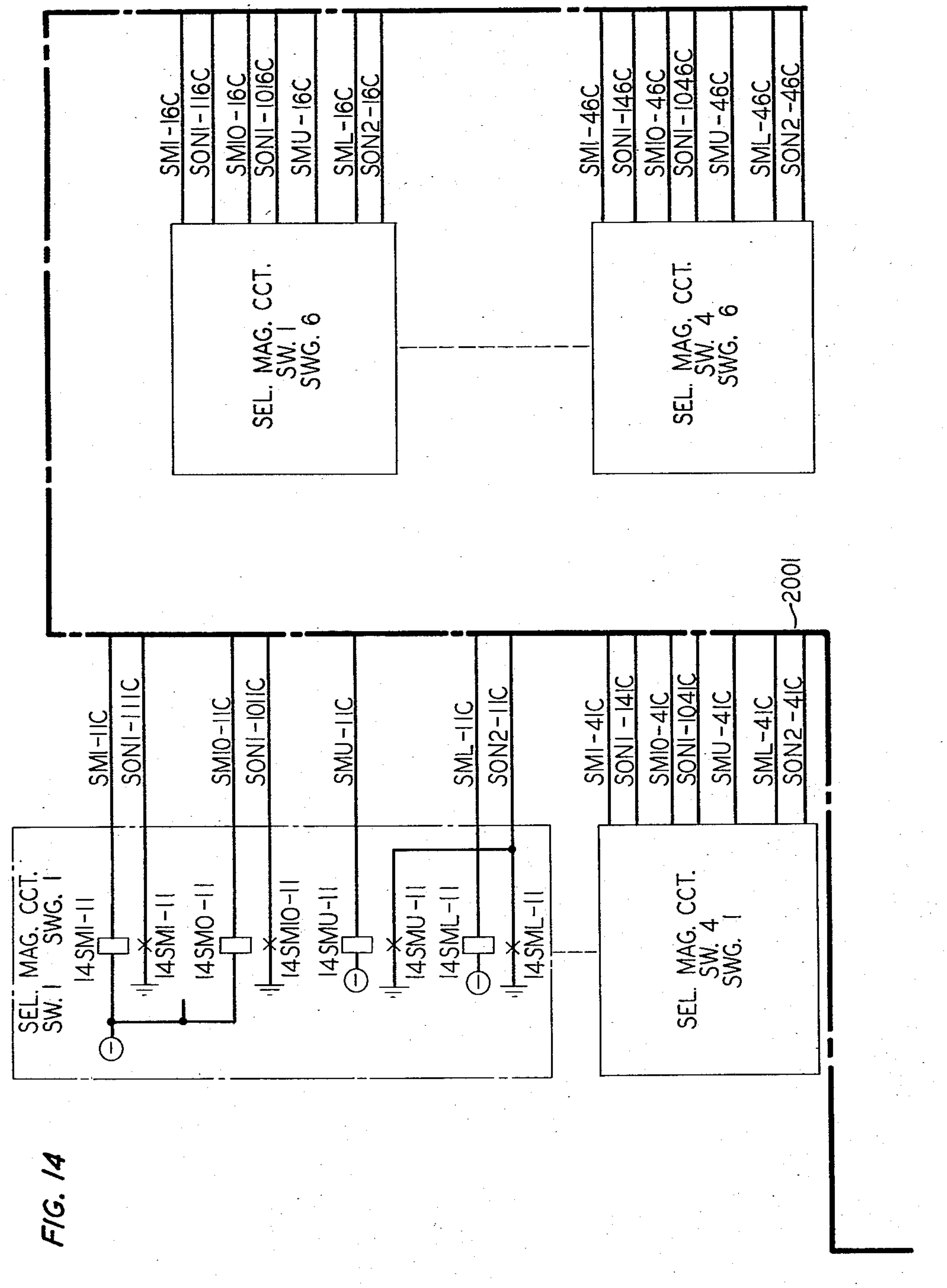
Figure 15:
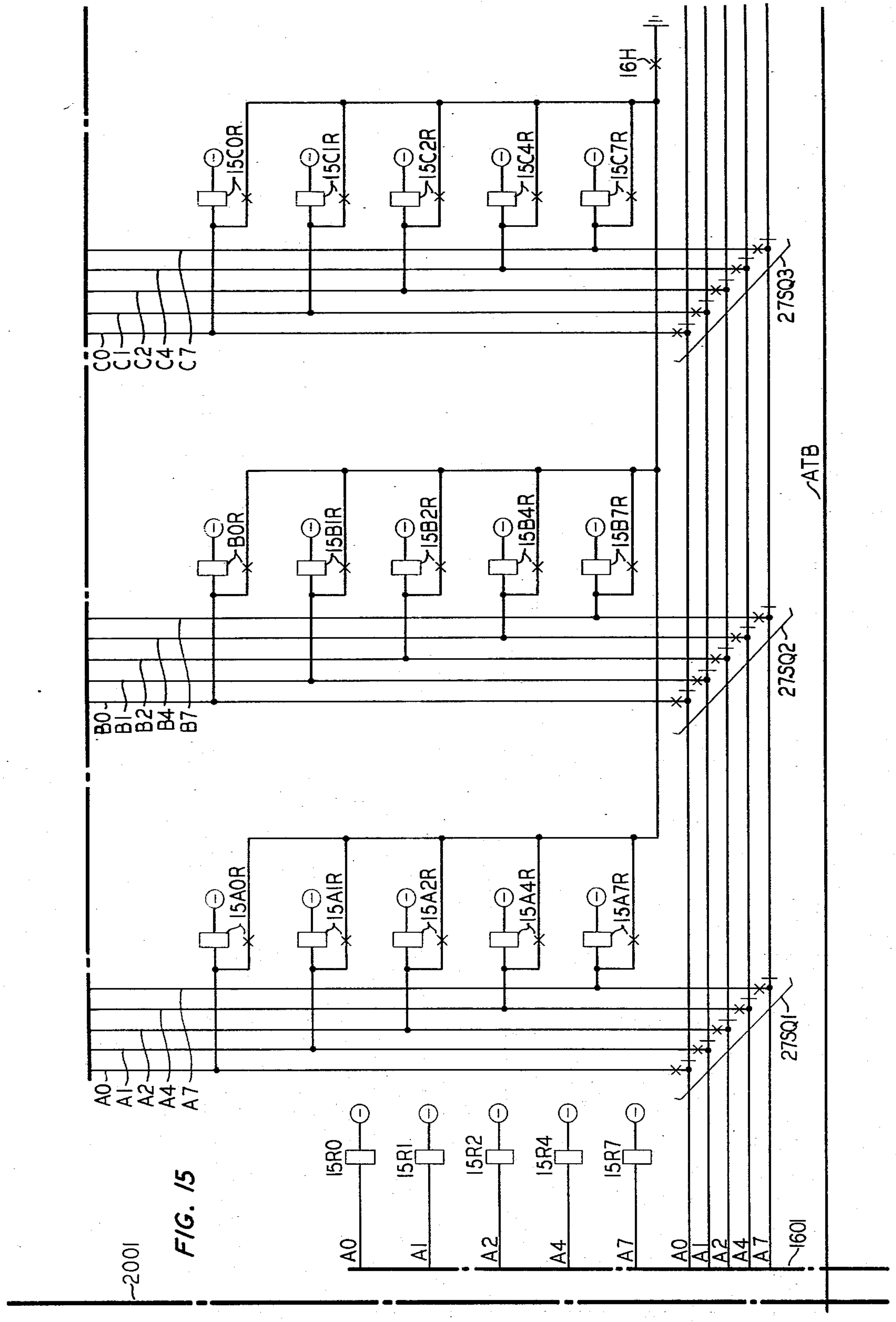
Figure 16:
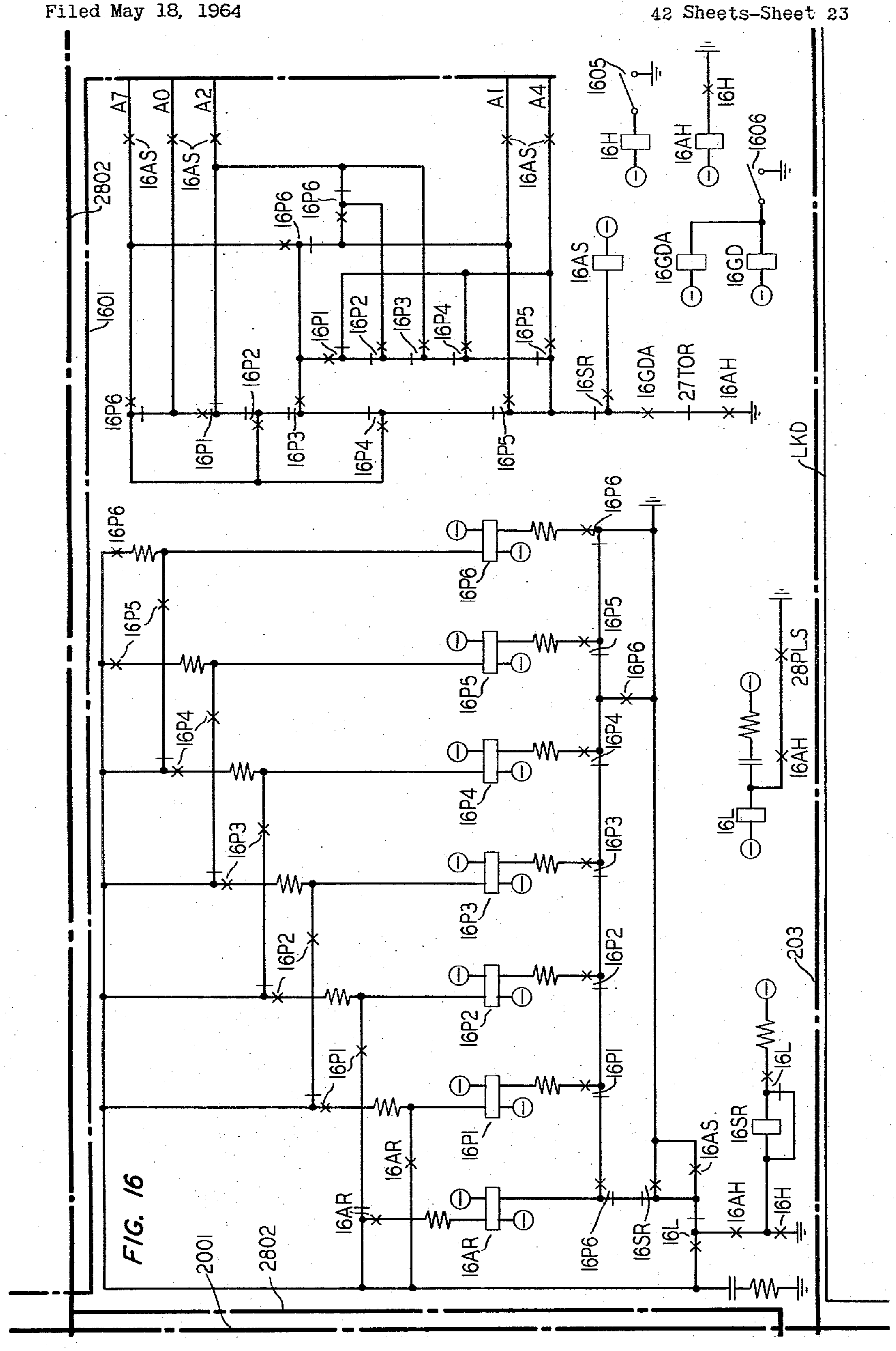
Figure 17:
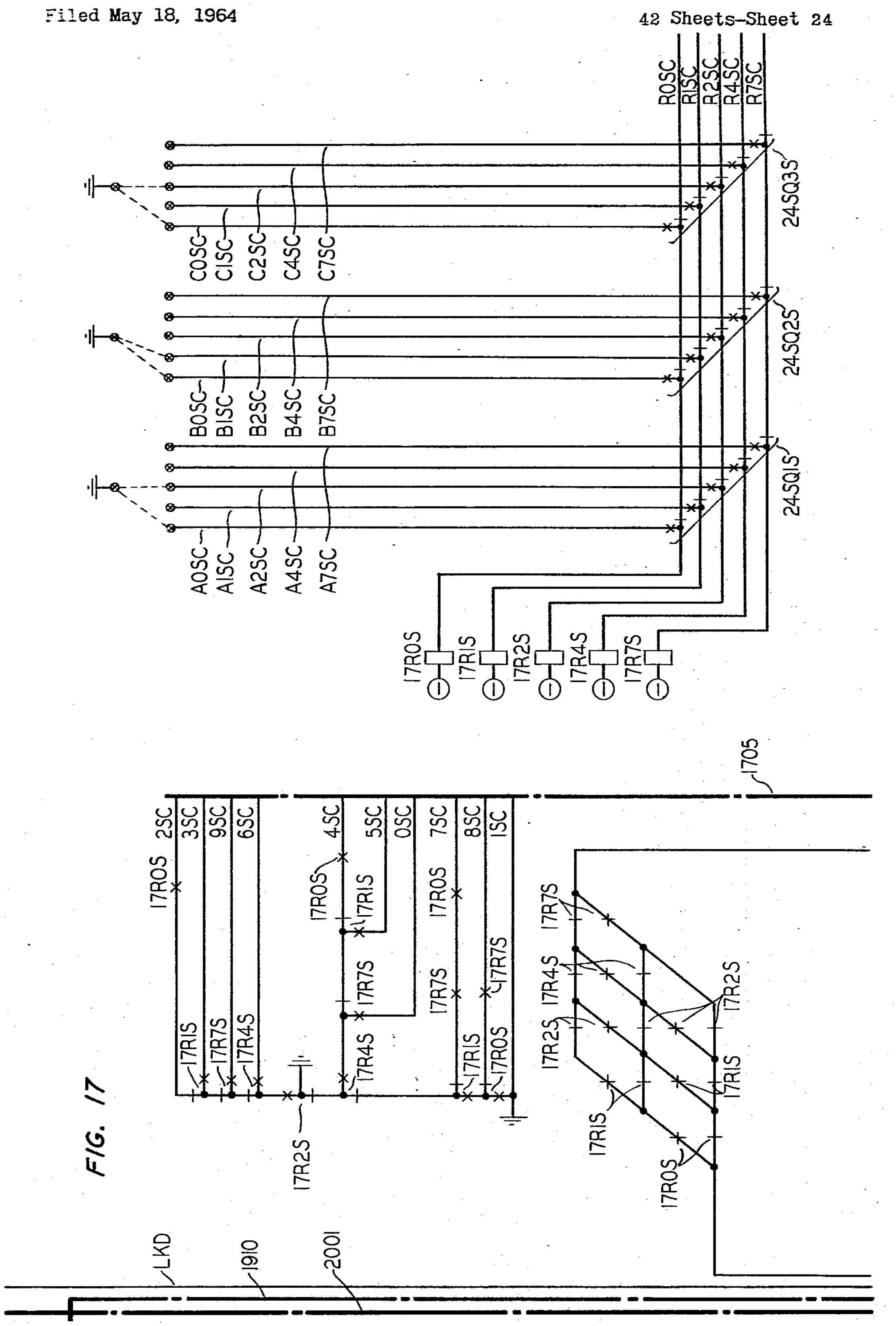
Figure 18:
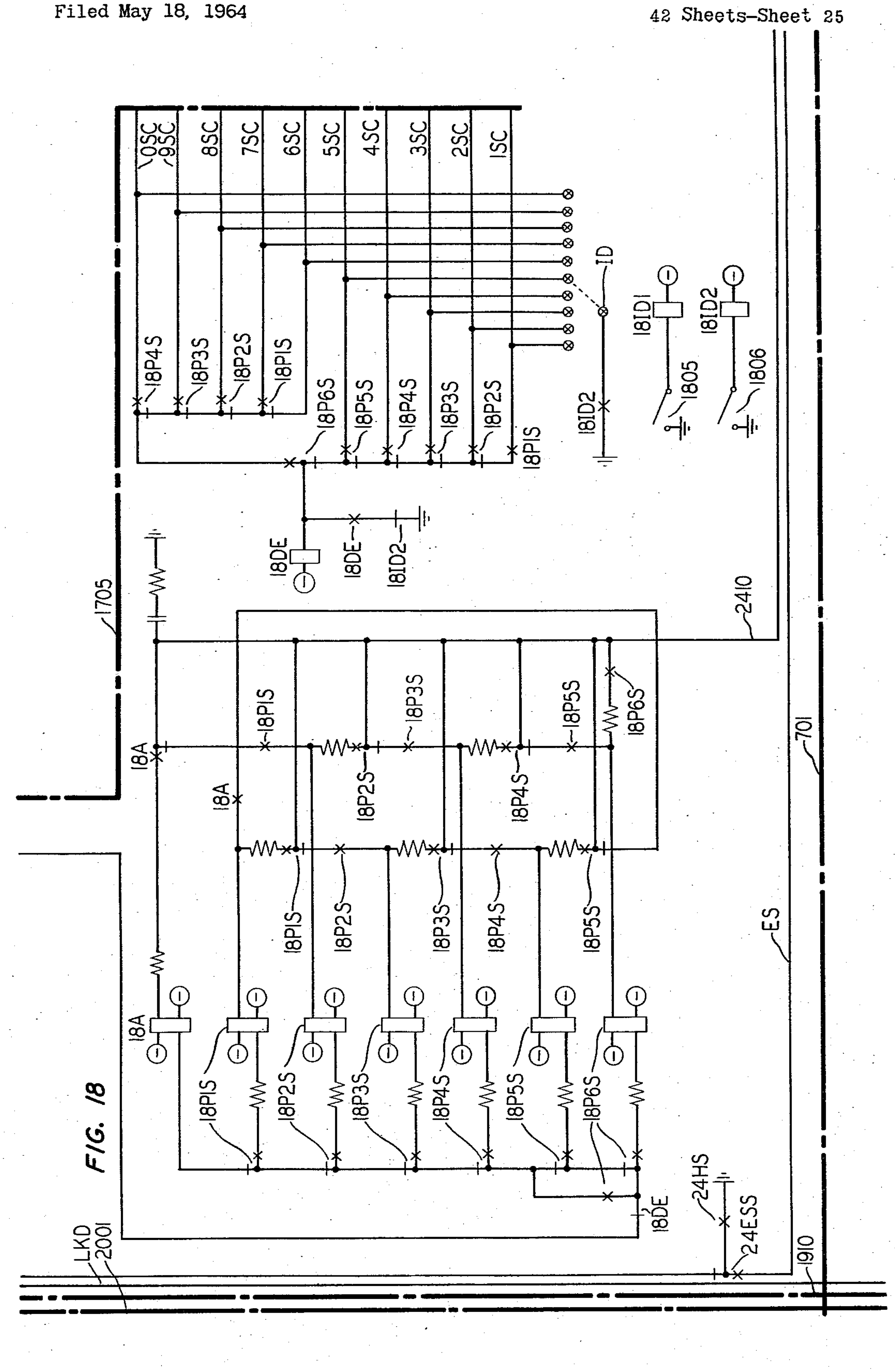
Figure 19:
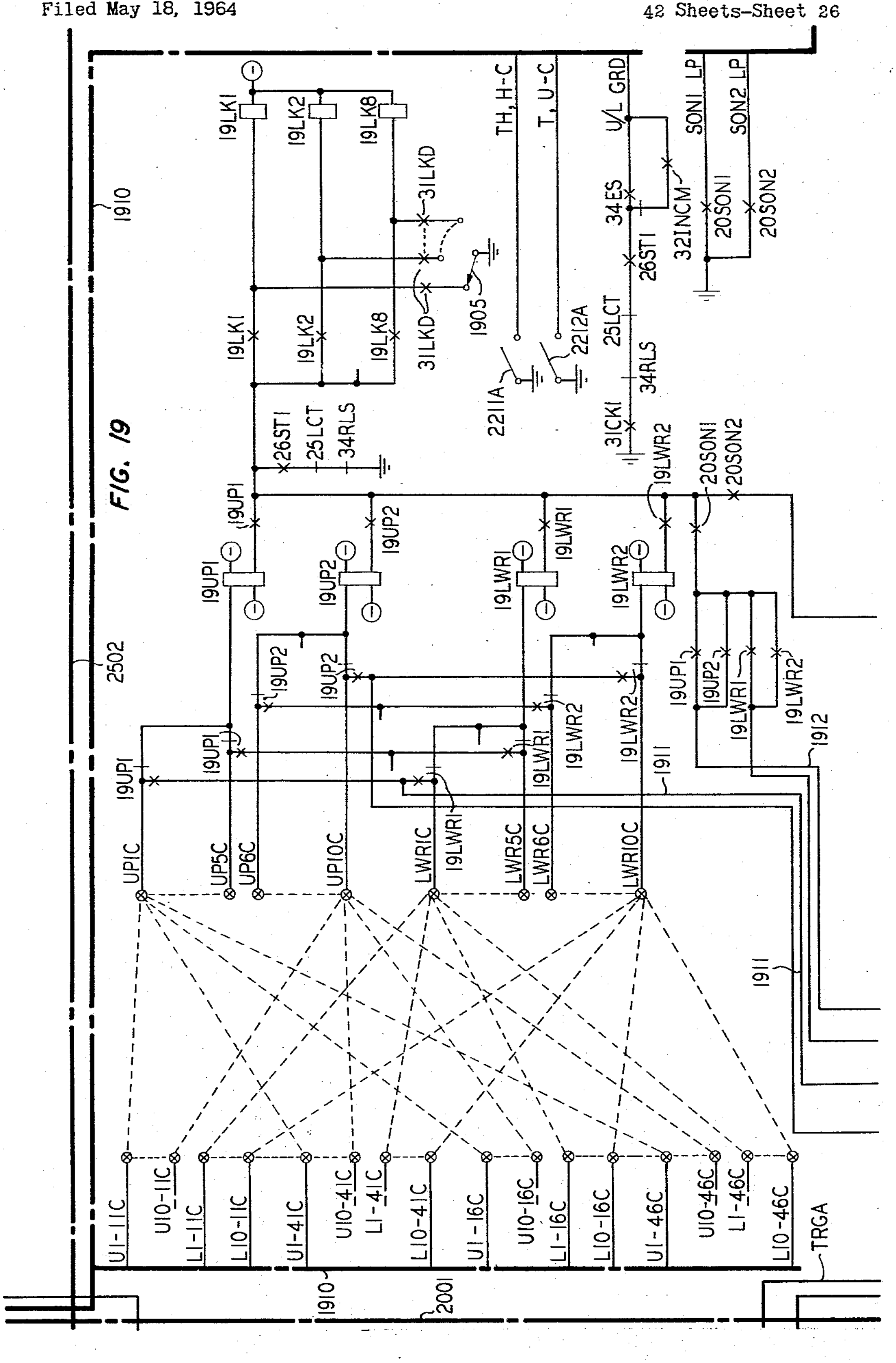
Figure 20:
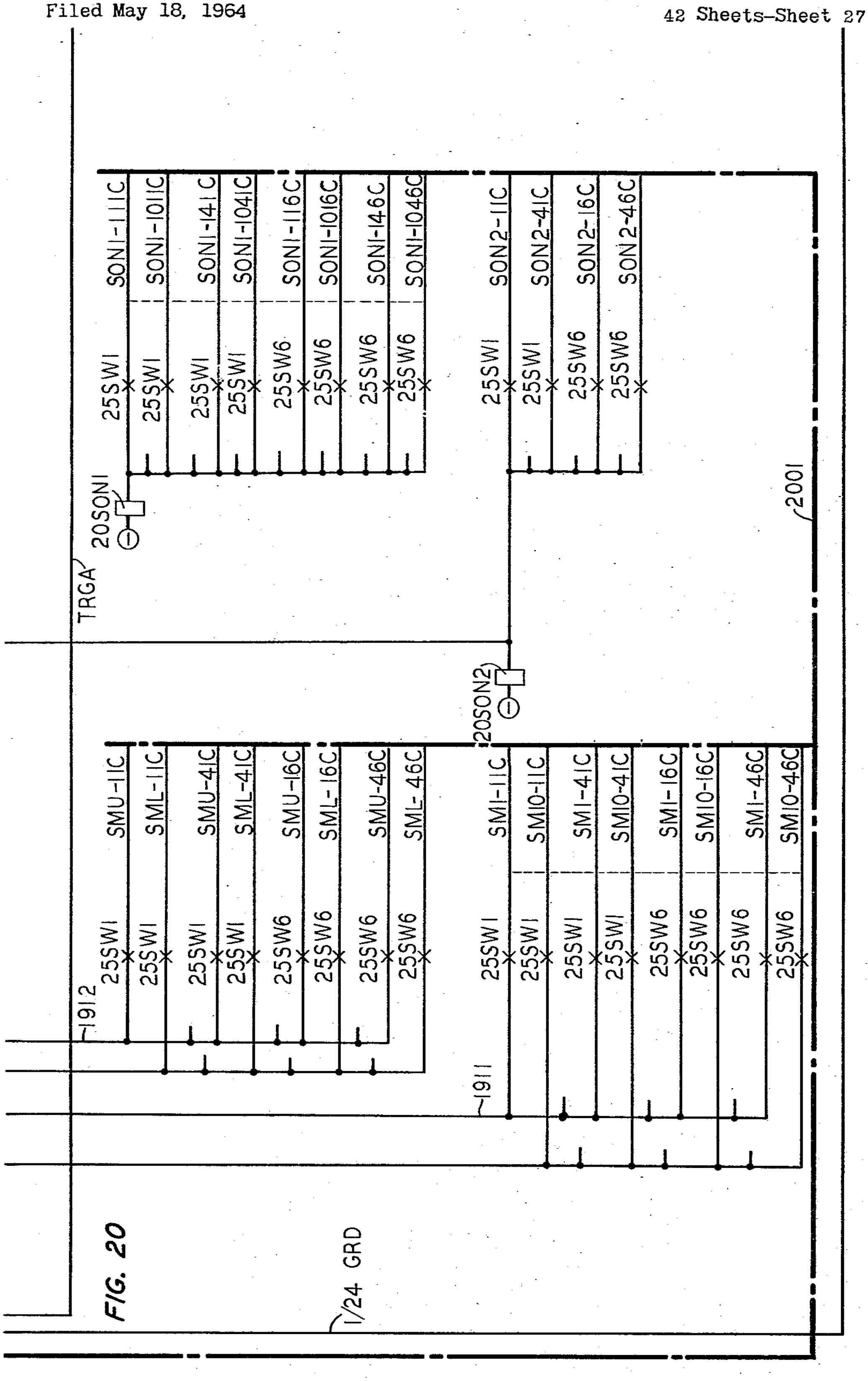
Figure 21:
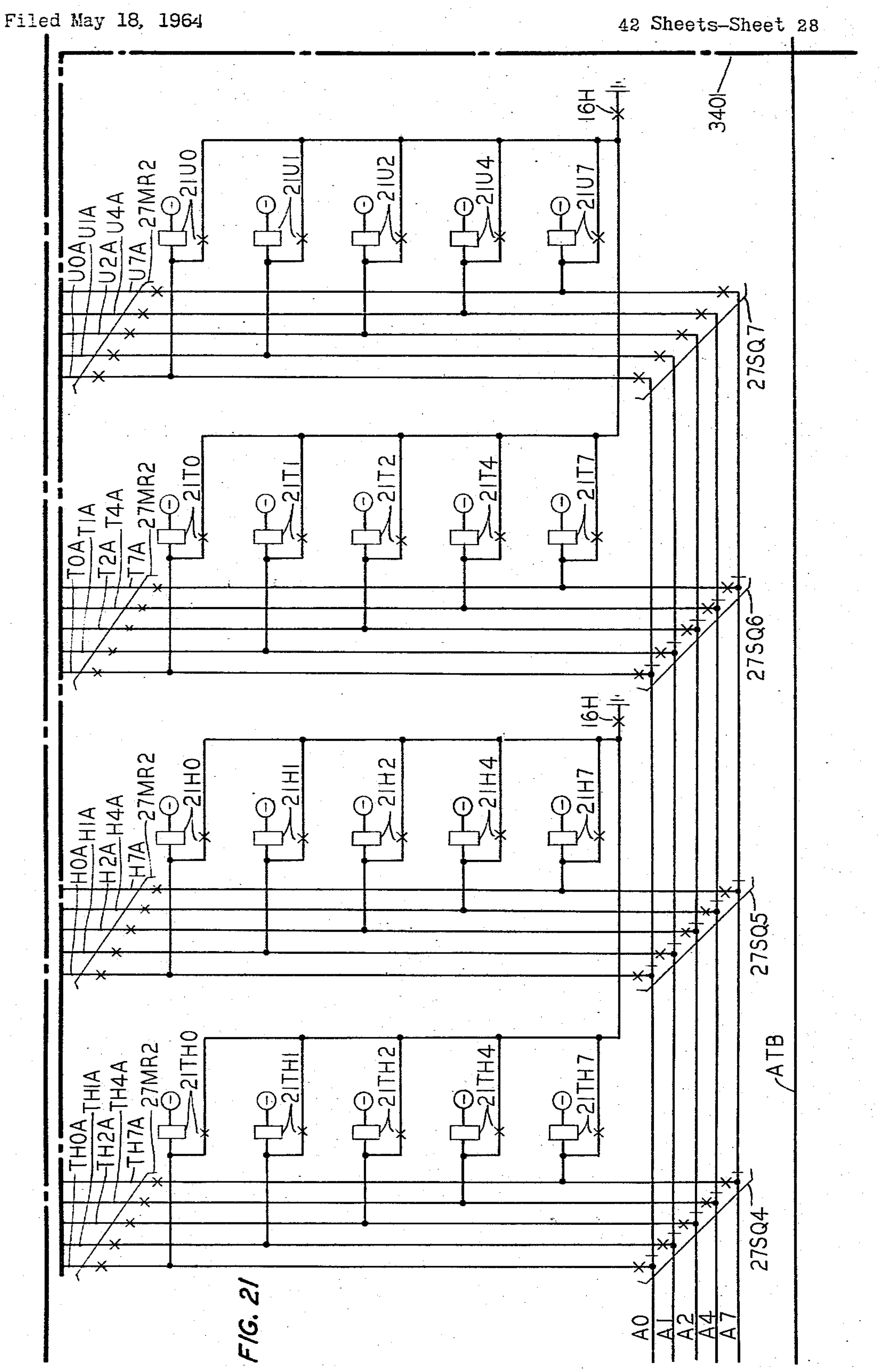
Figure 22:
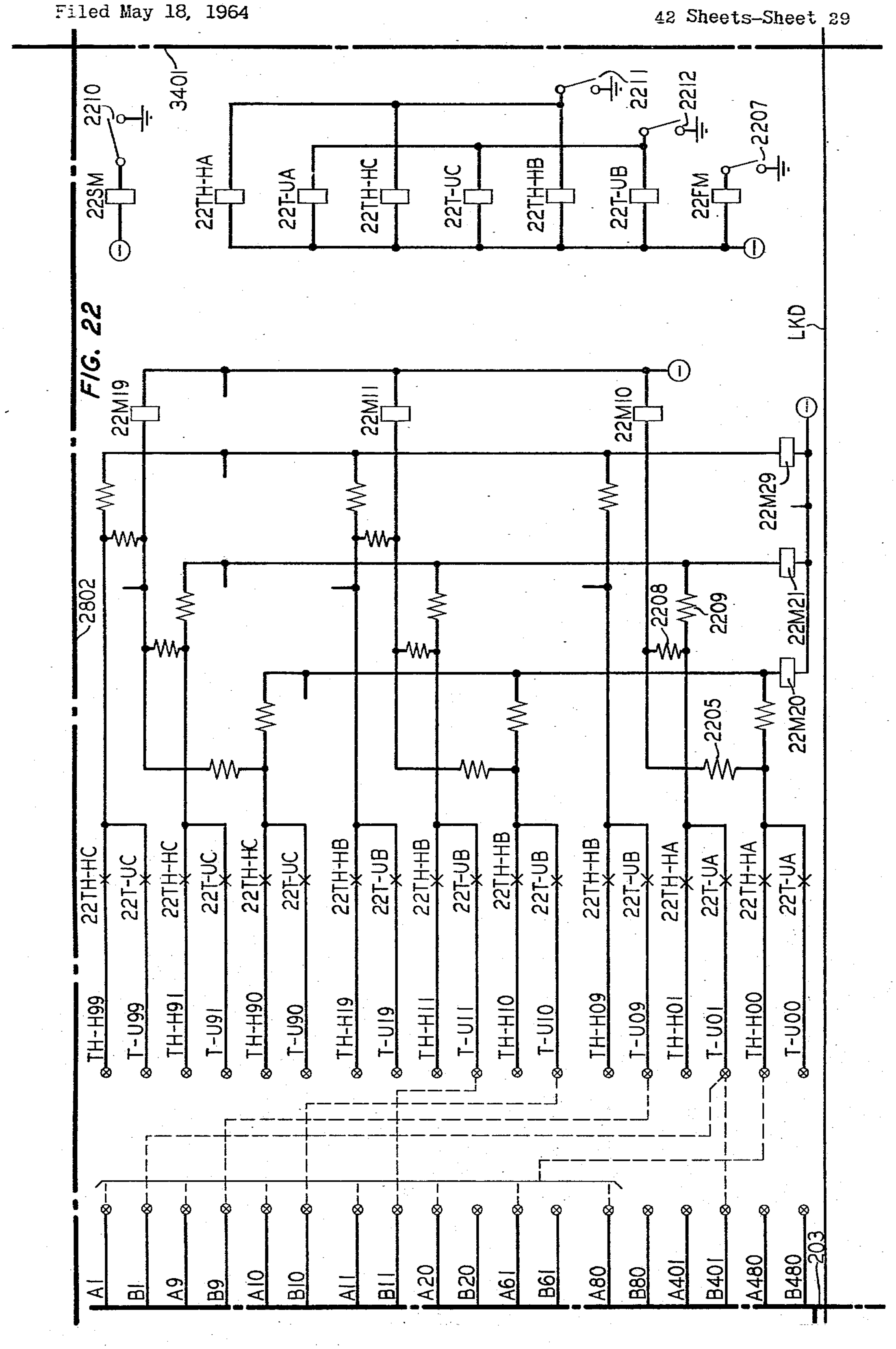
Figure 23:
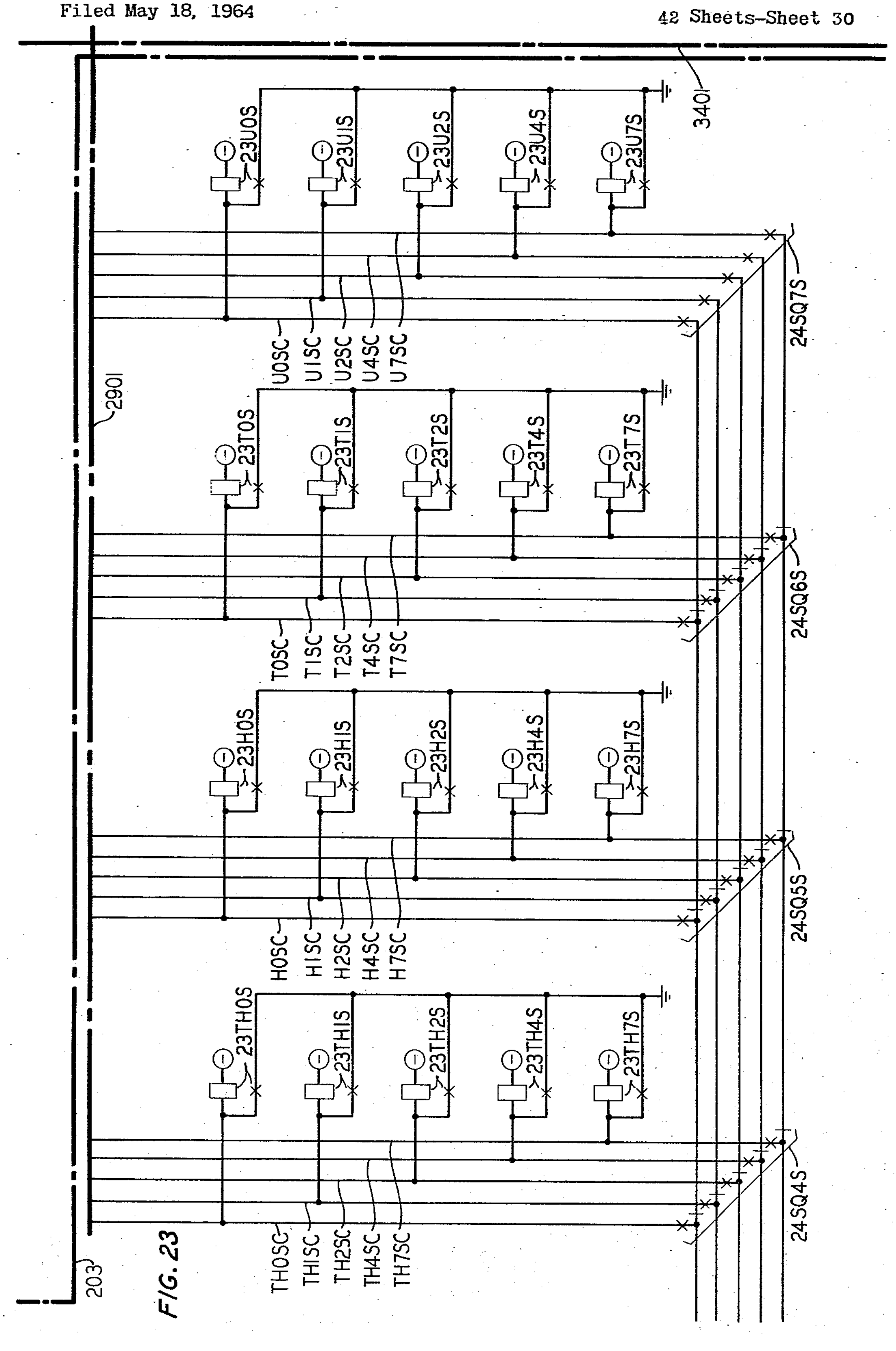
Figure 24:
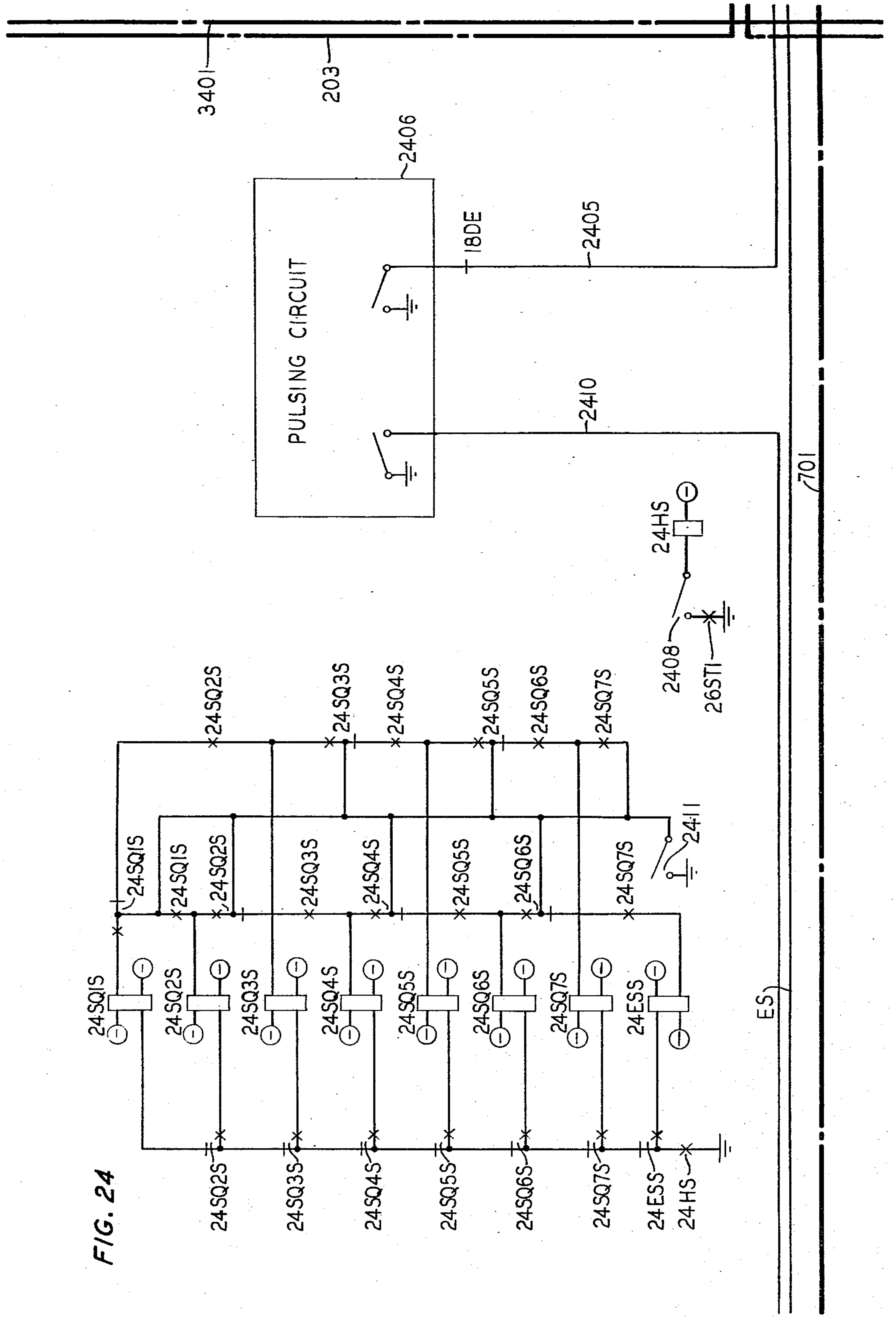
Figure 25:
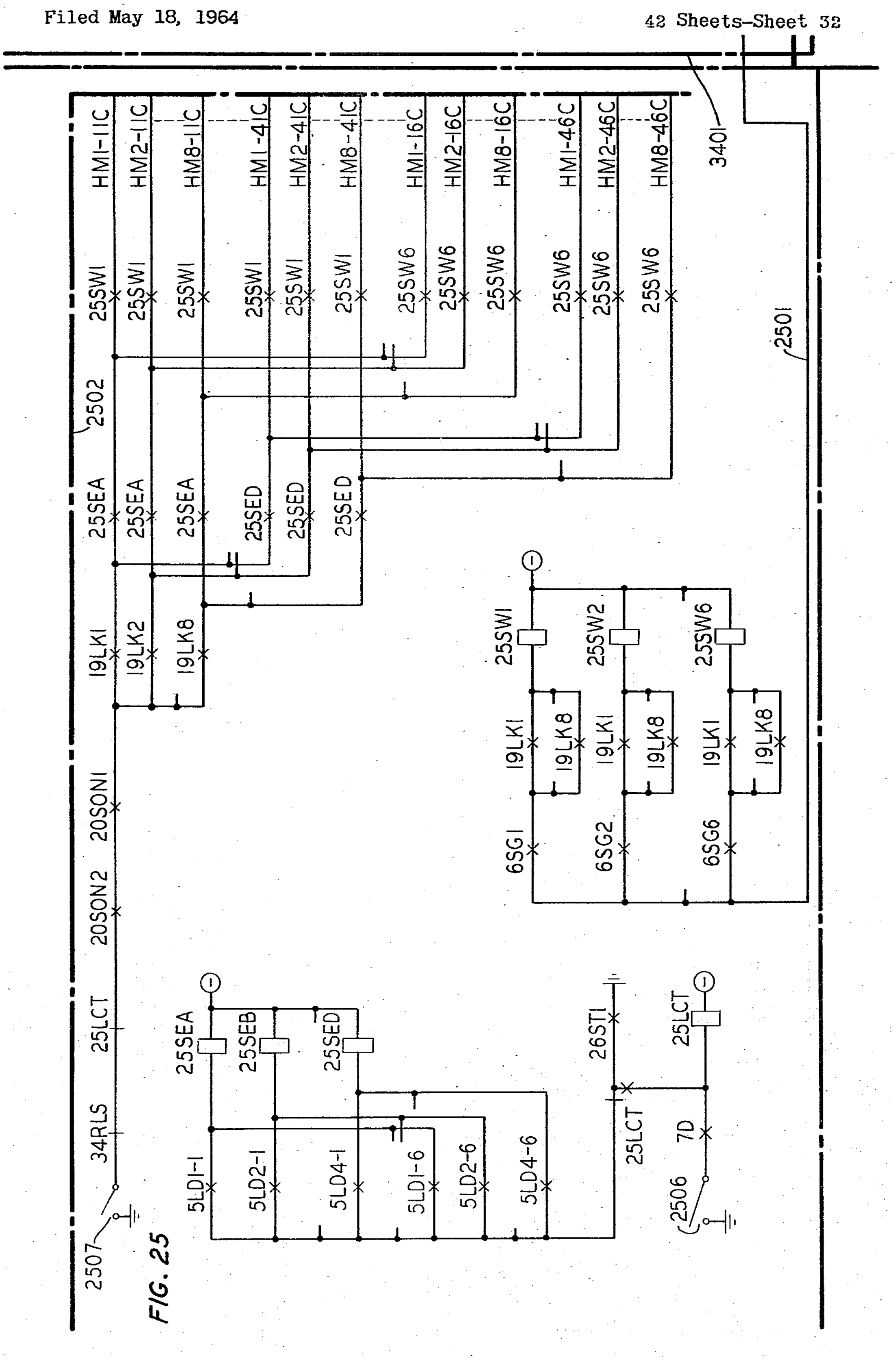
Figure 26:
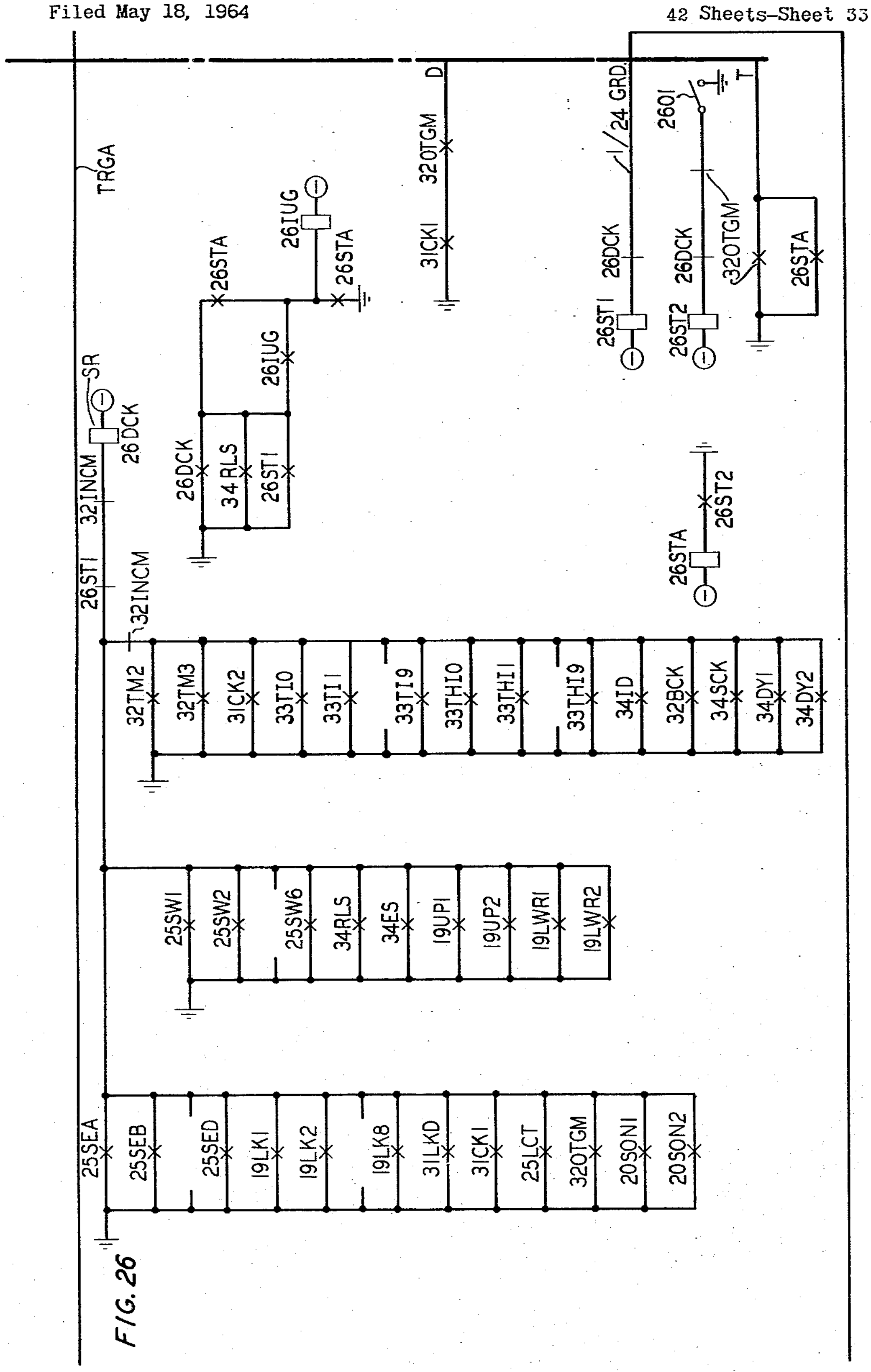
Figure 27:
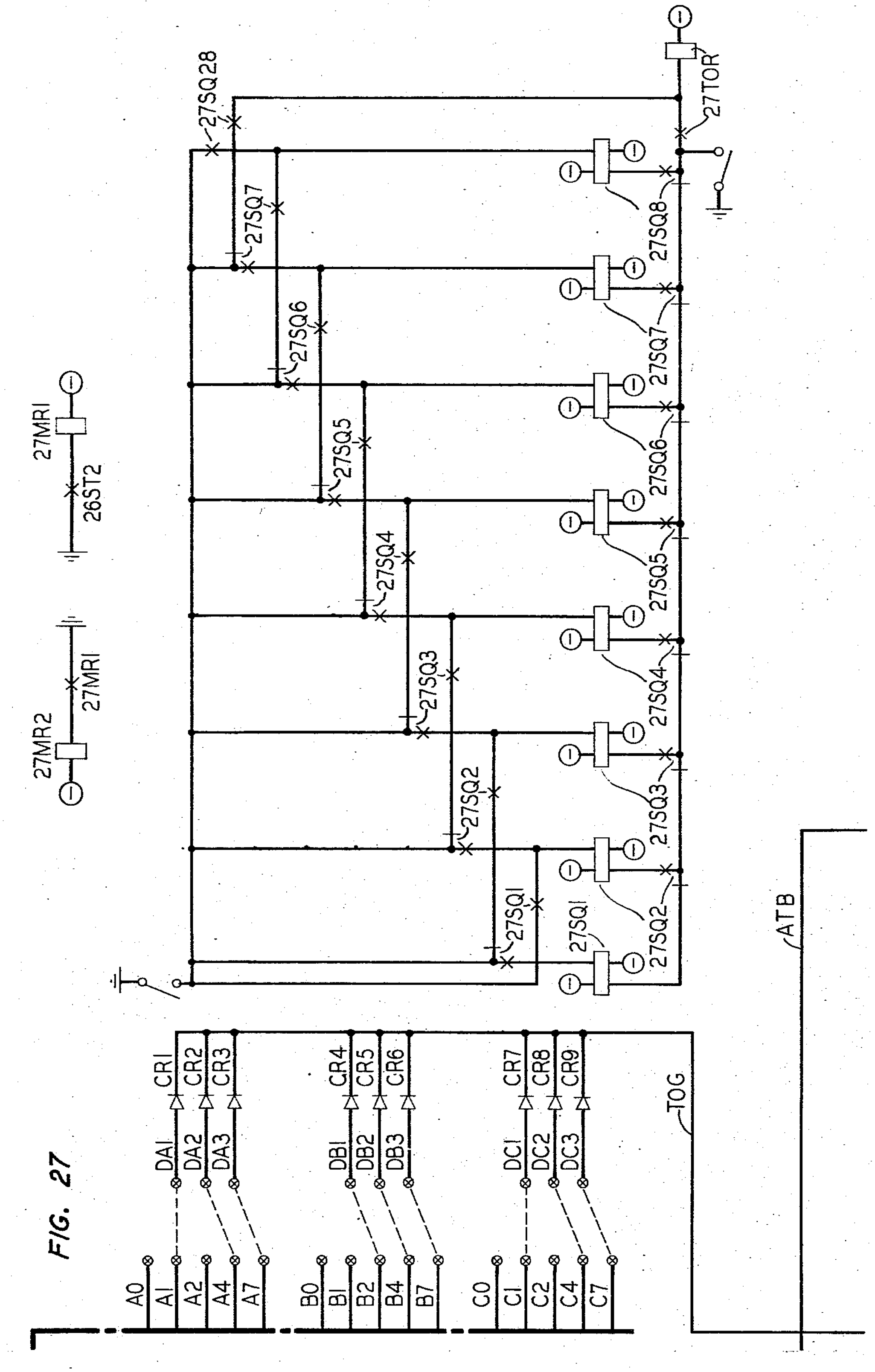
Figure 28:
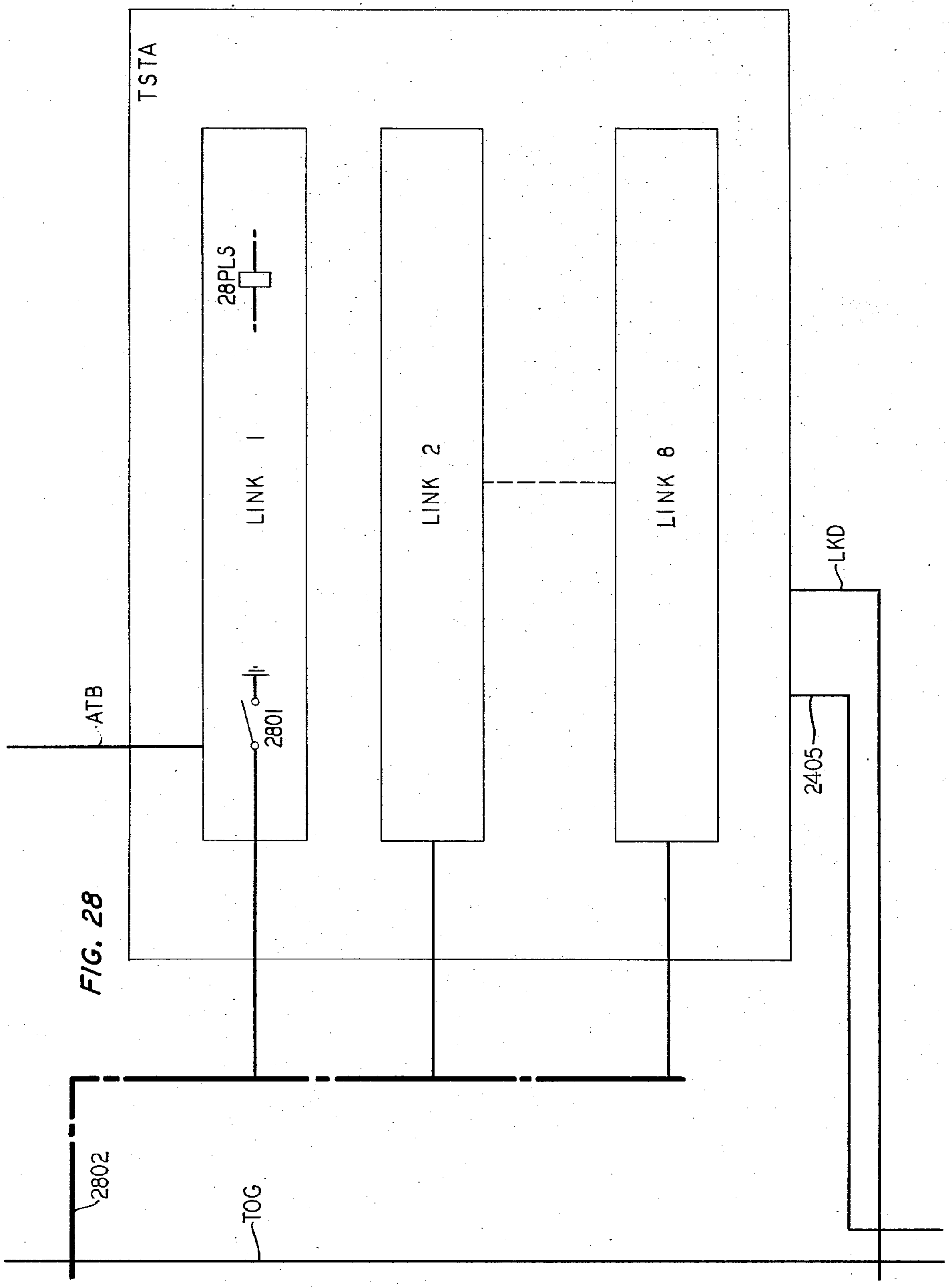
Figure 29:
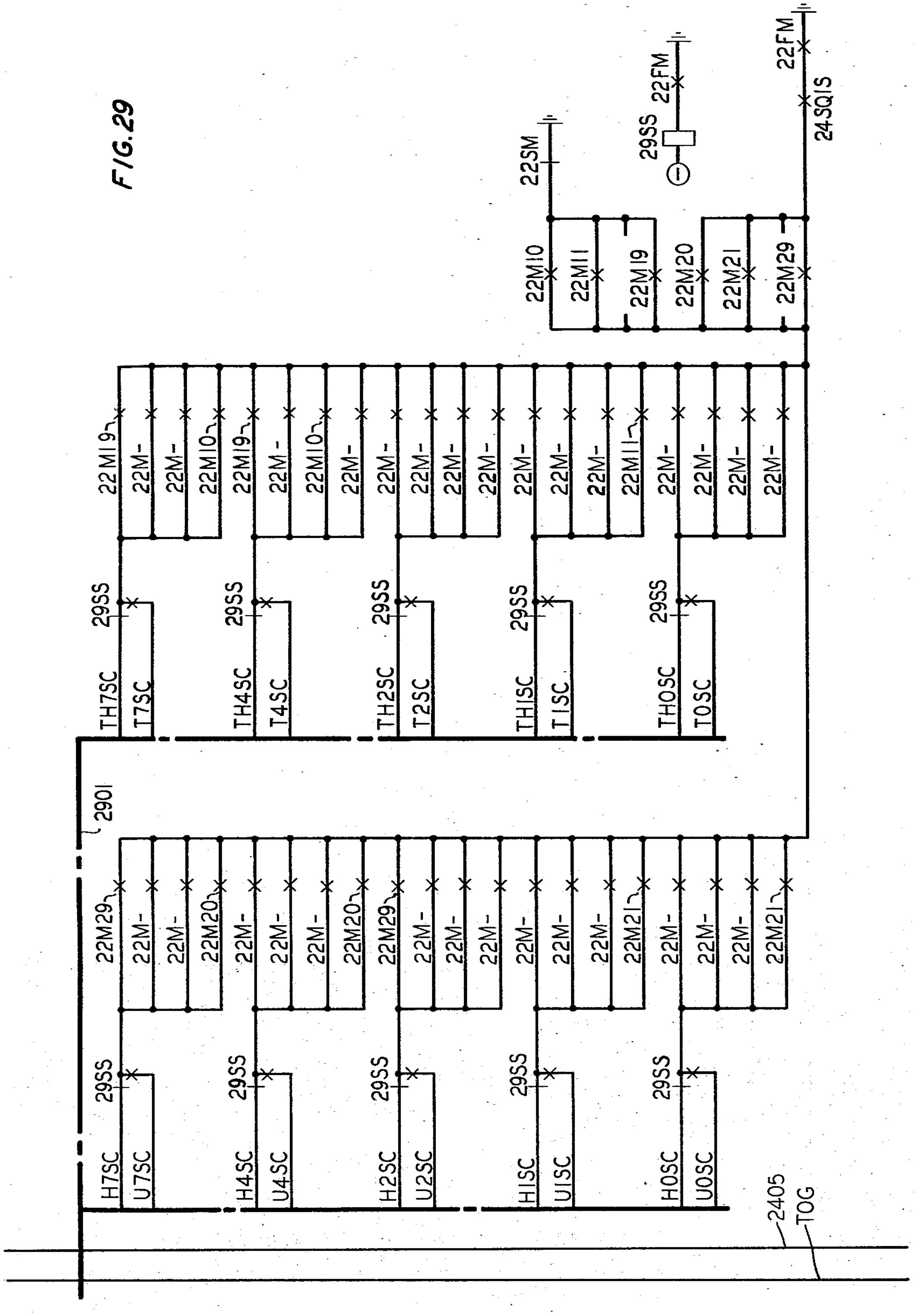
Figure 30:
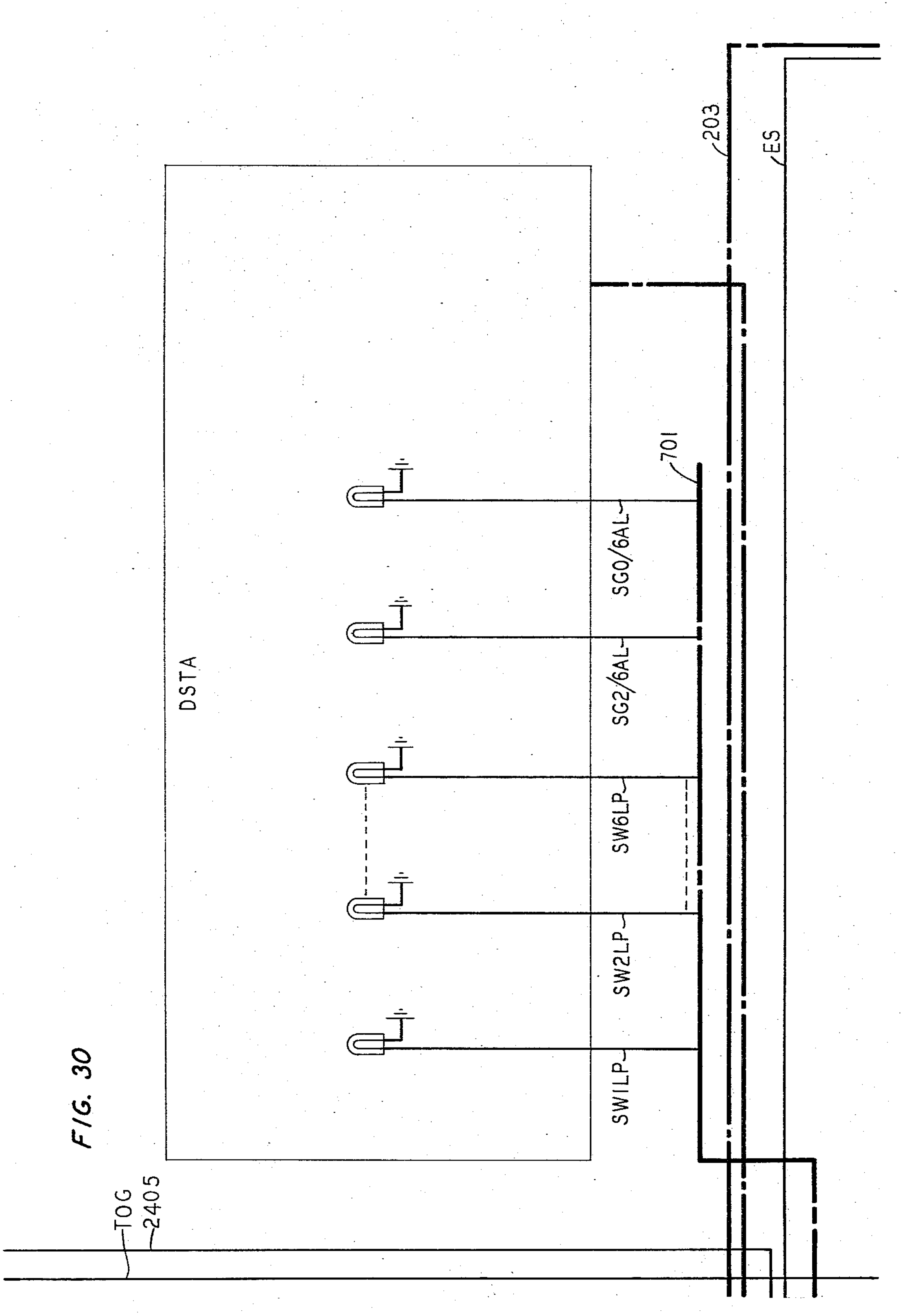
Figure 31:
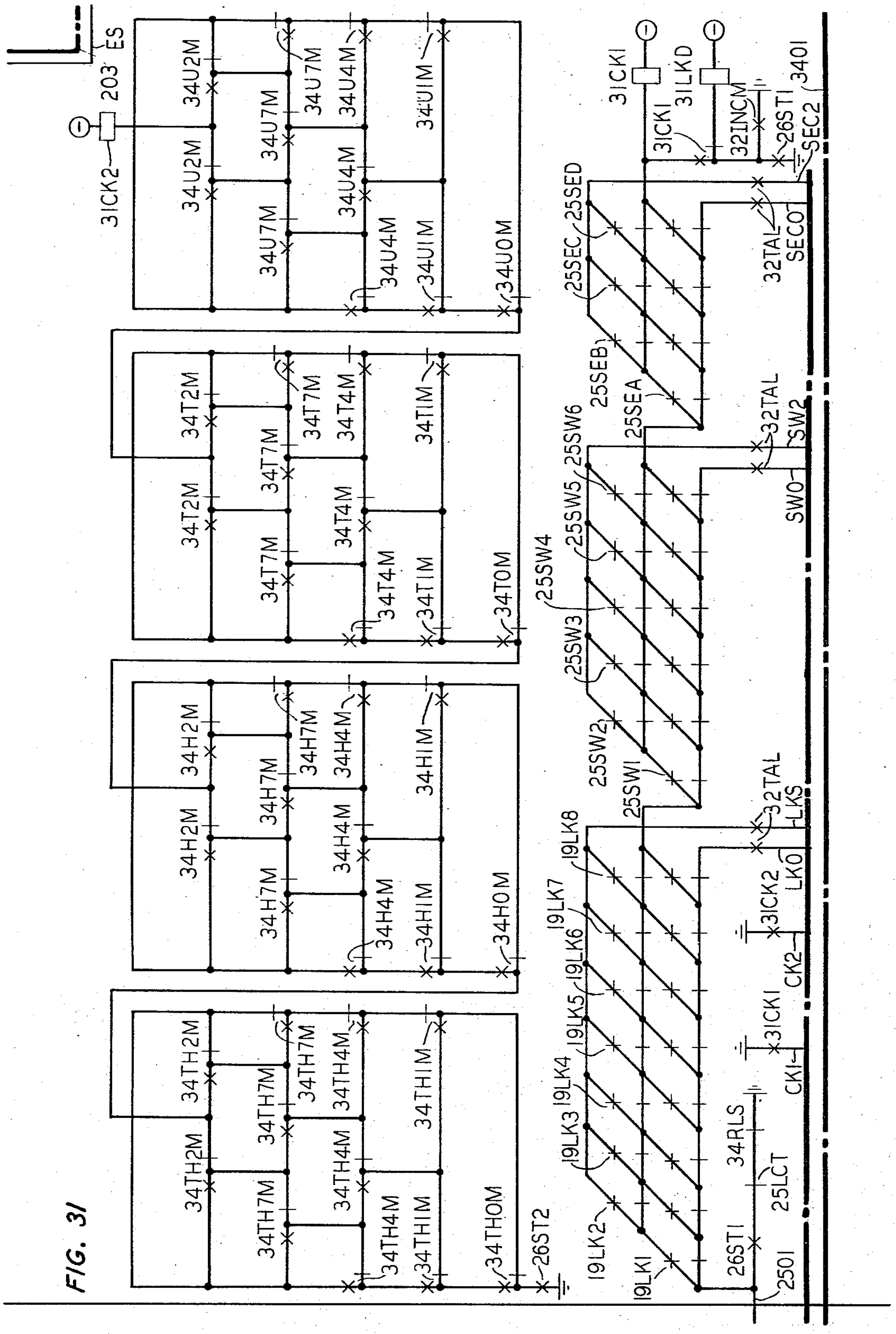
Figure 32:
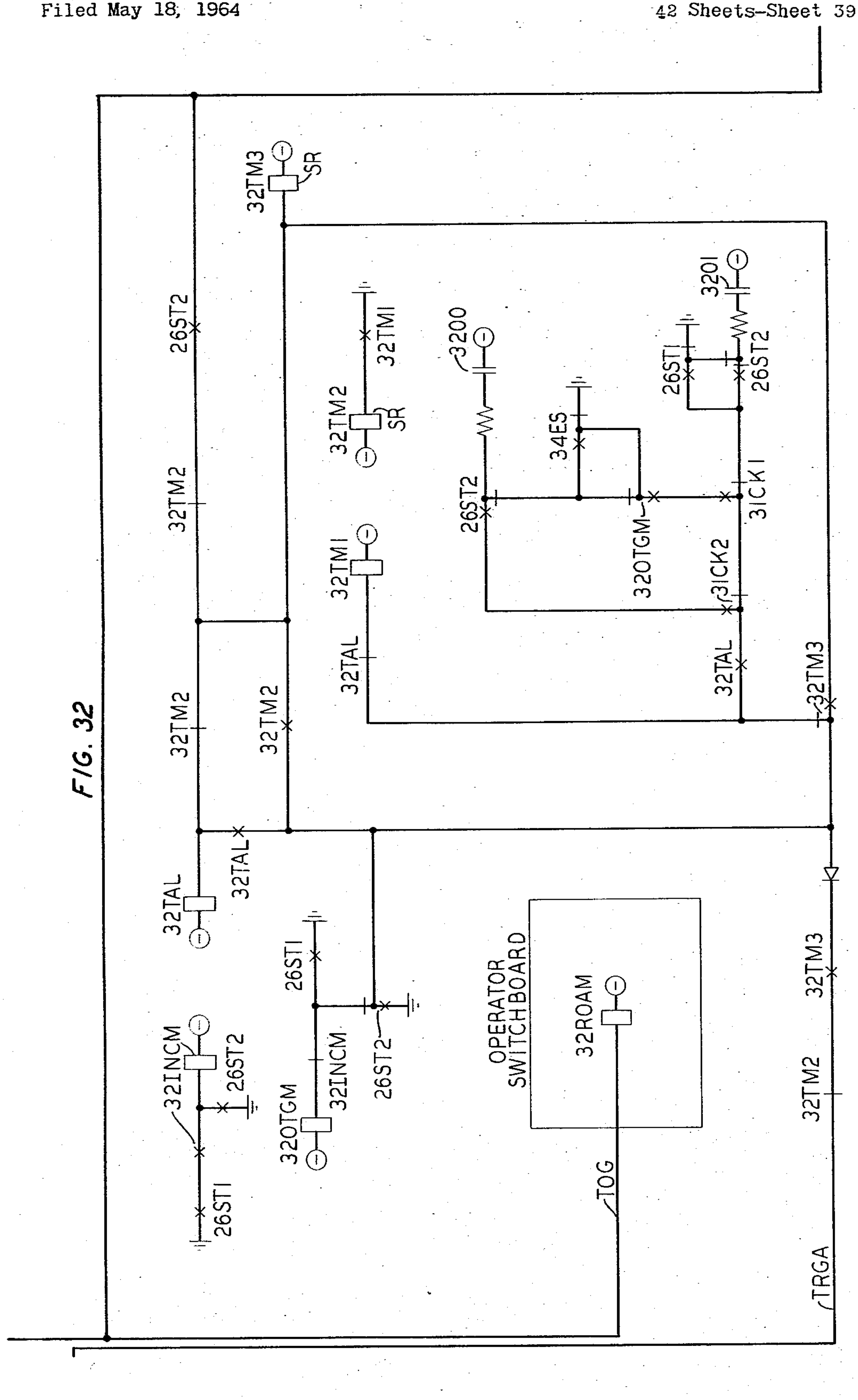
Figure 33:
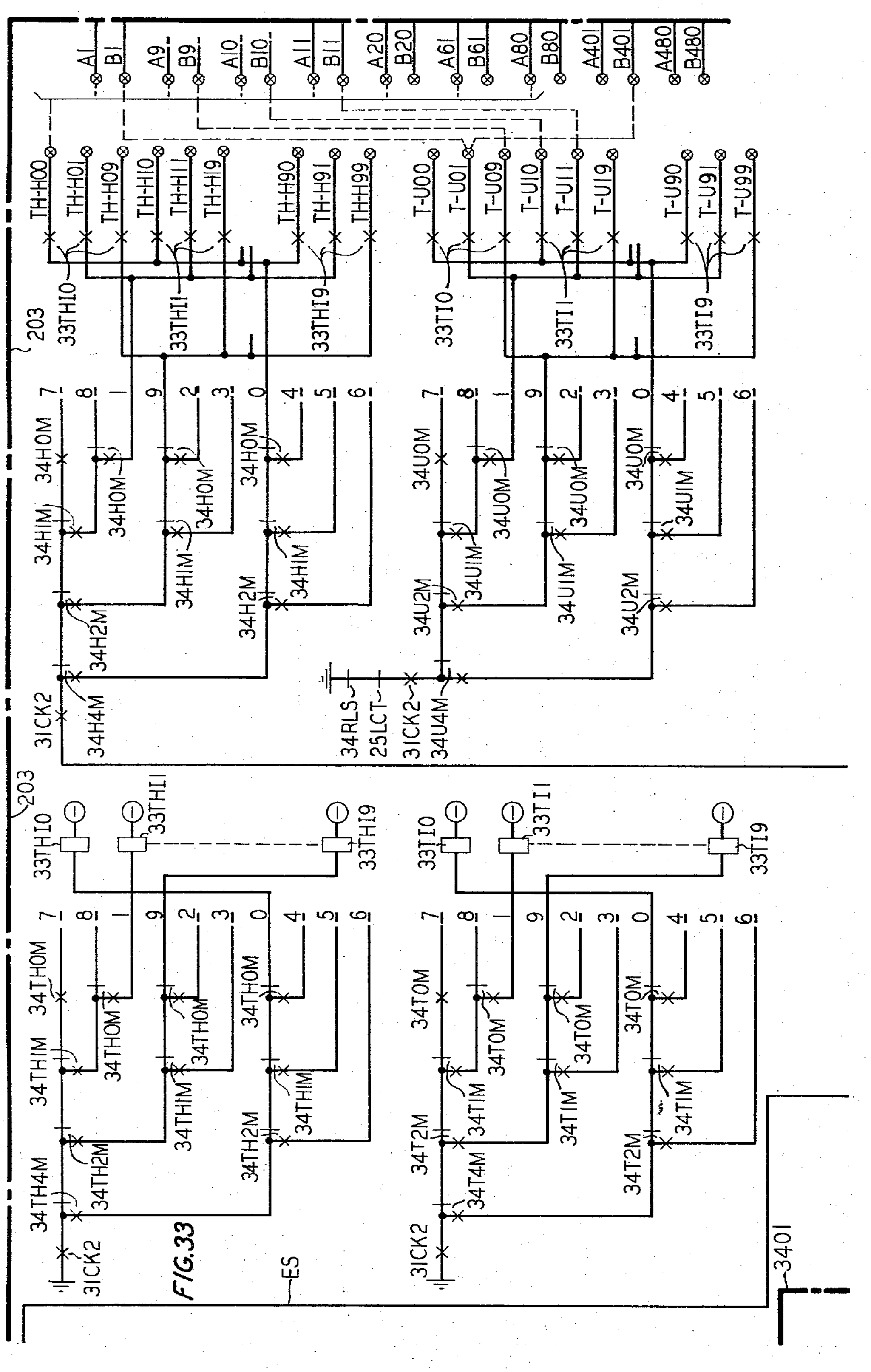
Figure 34:
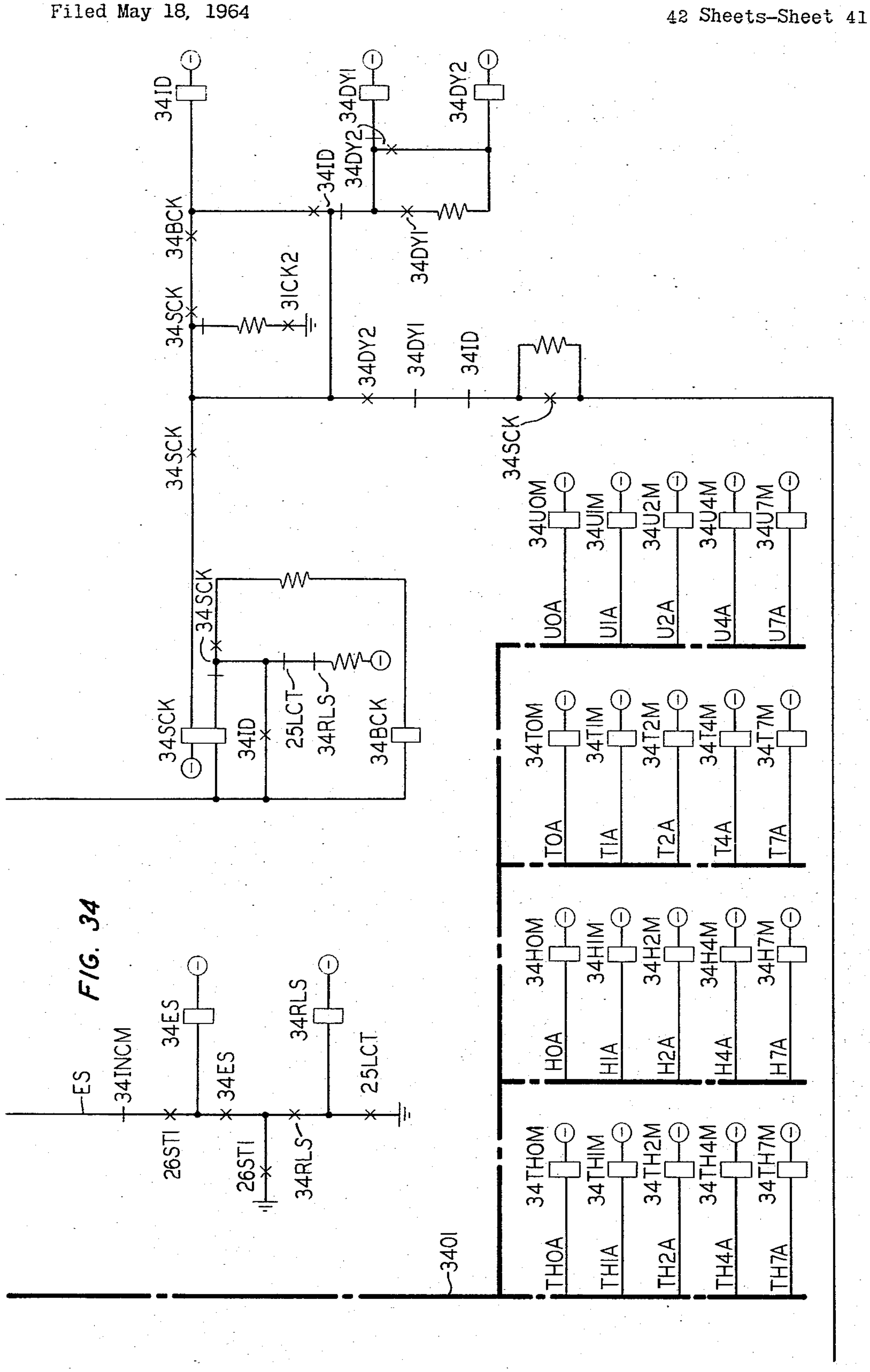
Figure 35:
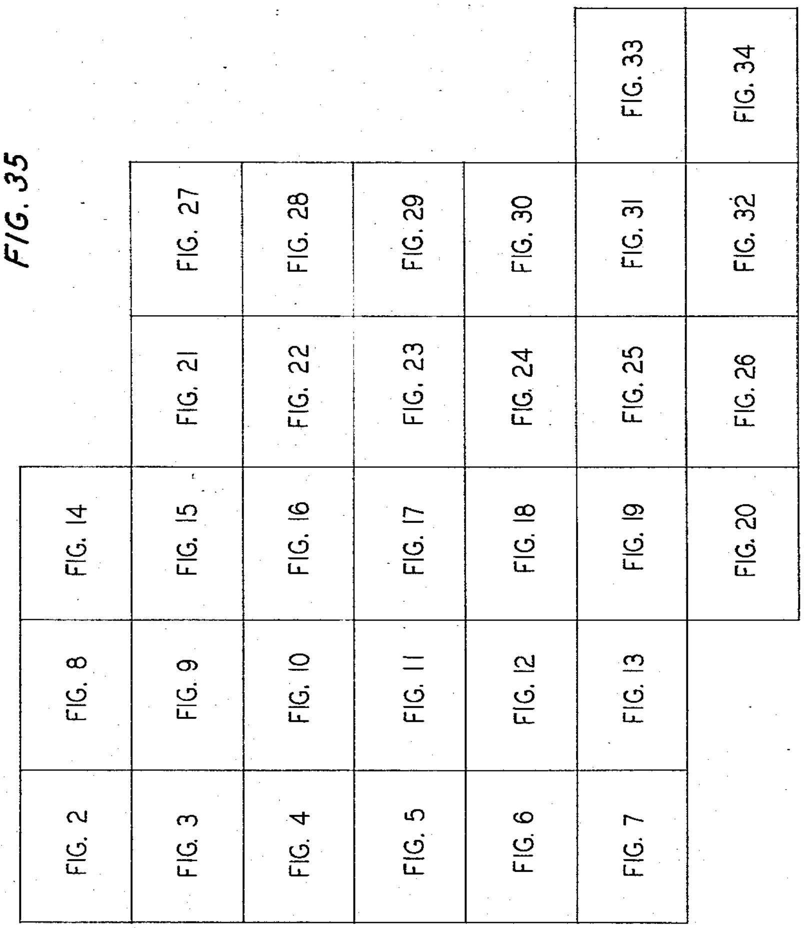

FIG. 5 includes the details of the line group demand circuit which is a portion of the line chain and allotter circuit;

FIG. 6 shows the relay chains of the switch group relays and the chain allotter relays which determine preference in the line chain and allotter circuit;

FIG. 7 shows the group check relay circuitry;

FIG. 8 includes the details of a crossbar switch which couple lines on the horizontals to links on the vertical of the switch;

FIG. 9 shows additional switches similar to that of FIG. 8;

FIG. 10 shows the hold magnet circuits for the respective crossbar switches;

FIG. 11 includes alarm detection circuitry for discriminating between erroneous release of the chain alarm relays and legitimate release thereof;

FIG. 12 includes the release circuitry for the line chain and allotter;

FIG. 13 includes control relays for the line chain and allotter;

FIG. 14 shows the upper and lower select magnet circuitry as well as the switching select magnet circuitry for the crossbar switches of FIGS. 8 and 9;

FIG. 15 shows a portion of the storage relays of the register circuit;

FIG. 16 includes the decimal to two-out-of-five translator circuitry for the register;

FIG. 17 includes the equipment in the sender for prefixing the area code designation;

FIG. 18 shows the counting and comparator circuit for controlling the sender outpulsing circuit of FIG. 24;

FIG. 19 shows the connections between the line chain and allotter circuit and the control relays for the select magnet circuits of FIG. 14;

FIG. 20 shows additional control relays for operating the select magnets;

FIG. 21 includes the remaining storage relays of the register;

FIG. 22 includes the translation matrices for converting from equipment location to directory number designation;

FIG. 23 includes registers for the last four digits of the directory number in the sender circuit;

FIG. 24 shows the steering relays for the sender;

FIG. 25 includes the control circuitry for operating specified hold magnets of FIG. 10;

FIG. 26 shows the "downcheck" equipment for verifying the marker relays have been released;

FIG. 27 shows the steering relays for the register circuit as well as the comparator equipment for detecting roamers;

FIG. 28 is an outline circuit showing the links and control circuitry therein;

FIG. 29 is a translator circuit for regenerating the called mobile directory number on outgoing calls;

FIG. 30 includes duplicate switching and test access circuit showing lamp indications for indicating particular call progress;

FIG. 31 includes checking circuitry for the marker relays of FIG. 34;

FIG. 32 includes timing circuitry and alerting equipment responsive to the roamer detection circuitry of FIG. 27;

FIG. 33 shows the translating equipment for converting from directory number to line location designation in response to digits received by the incoming register;

FIG. 34 includes the marker relays which store the incoming calling mobile unit directory number; and FIG. 35 shows the relative disposition of FIGS. 2–34 to disclose the invention.

GENERAL DESCRIPTION OF MAJOR COMPONENTS

Figure 1A:
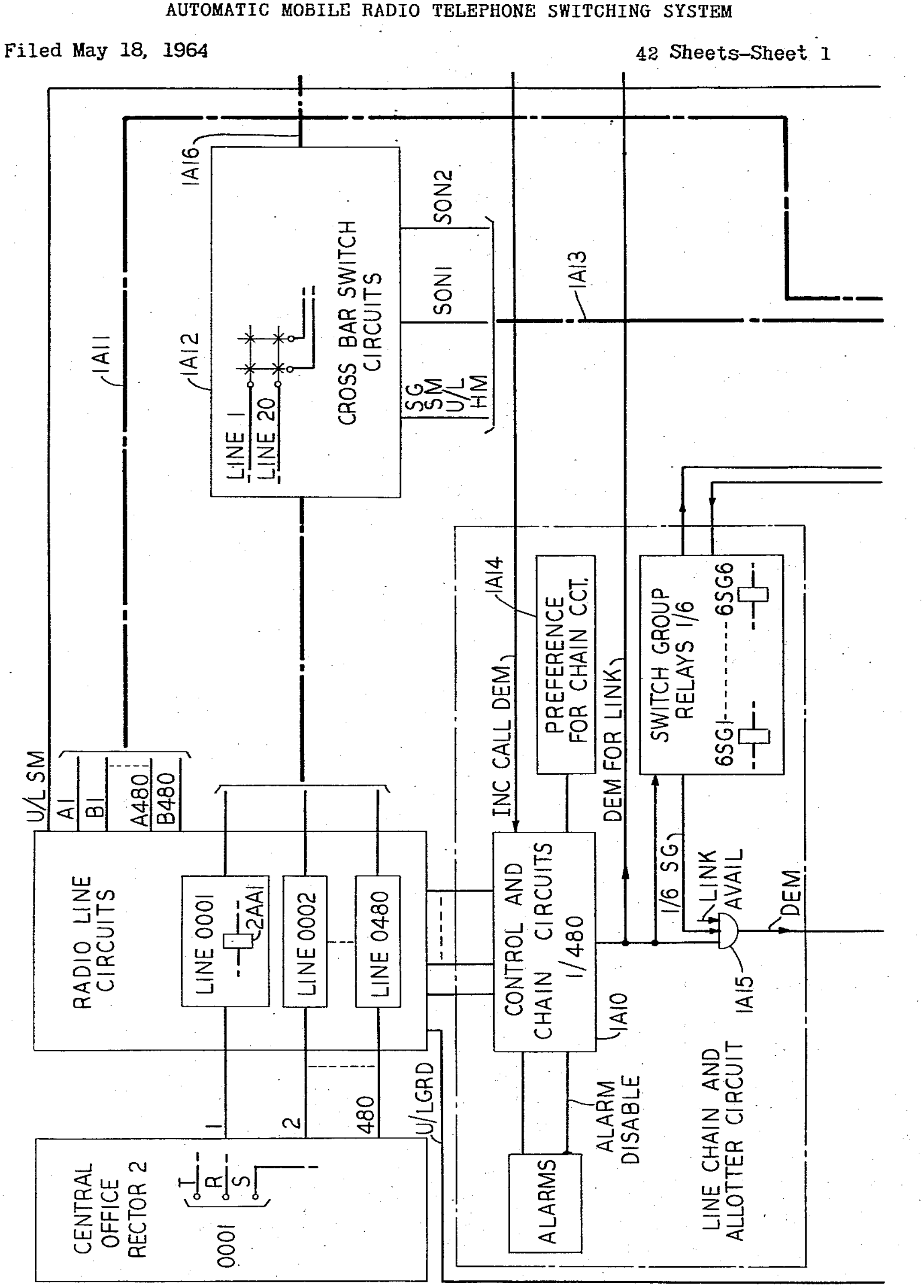
FIG. 1I shows the relative disposition of FIGS. 1A through 1H to disclose the invention.
Figure 1B:
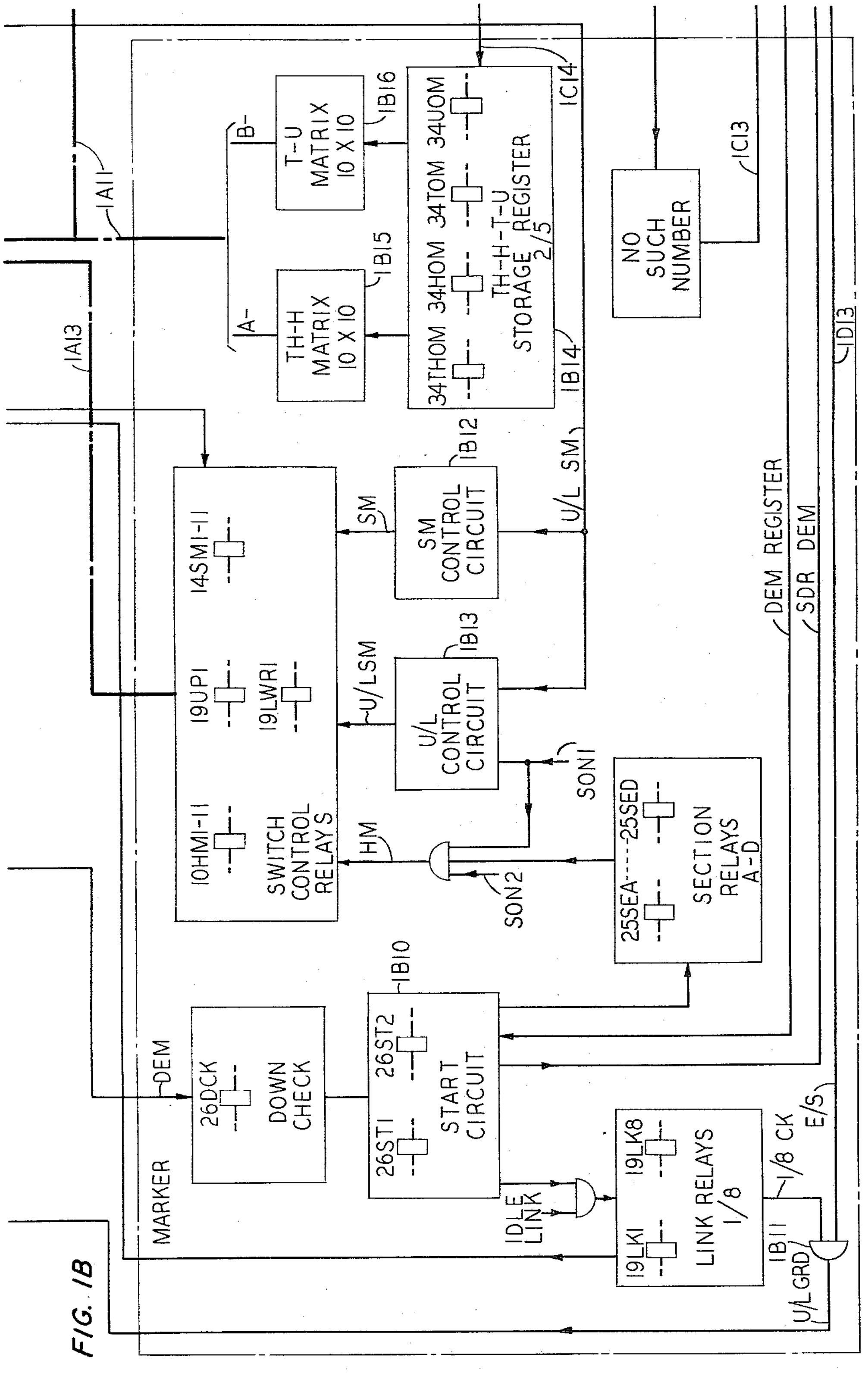
Figure 1C:
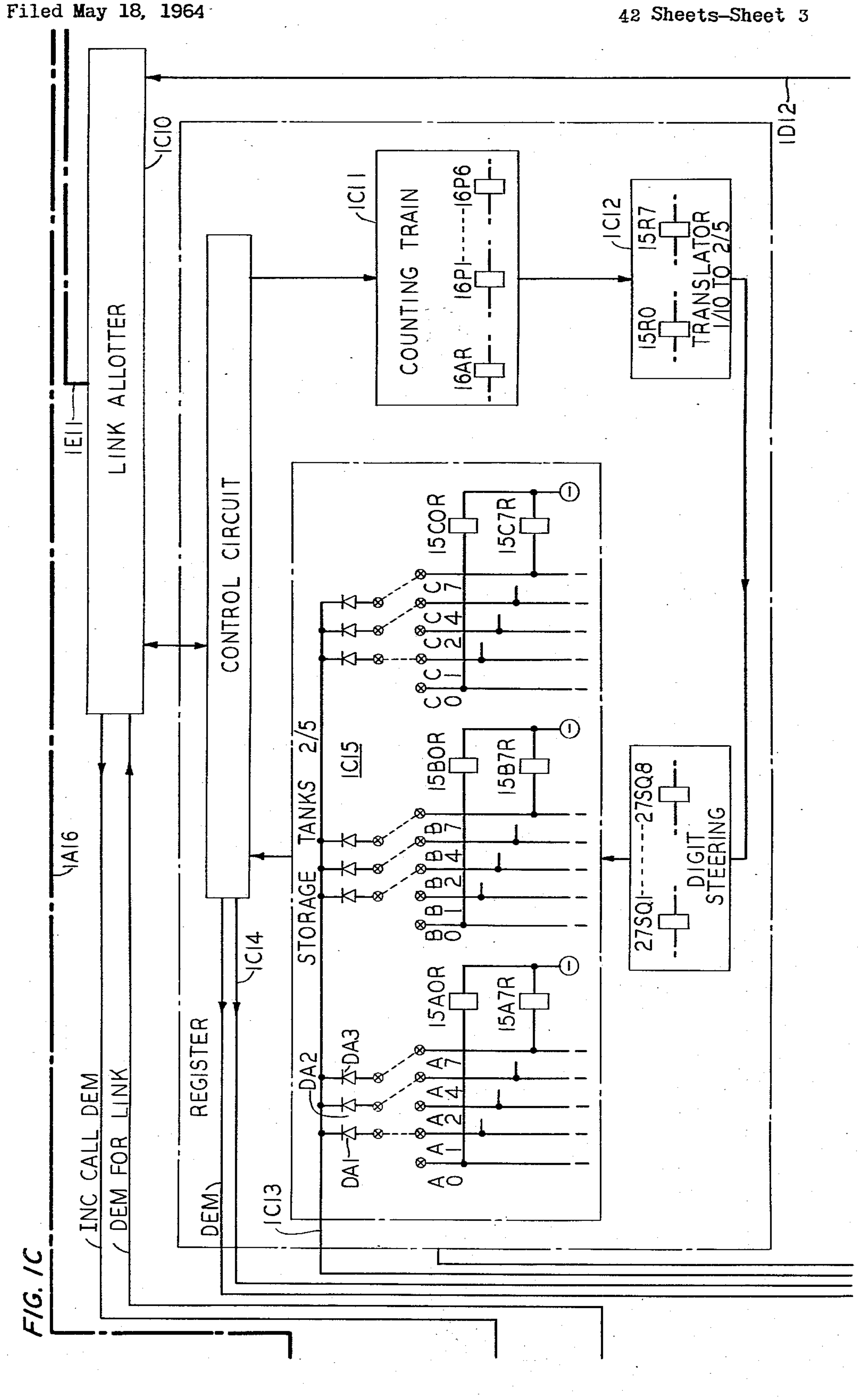
Figure 1D:
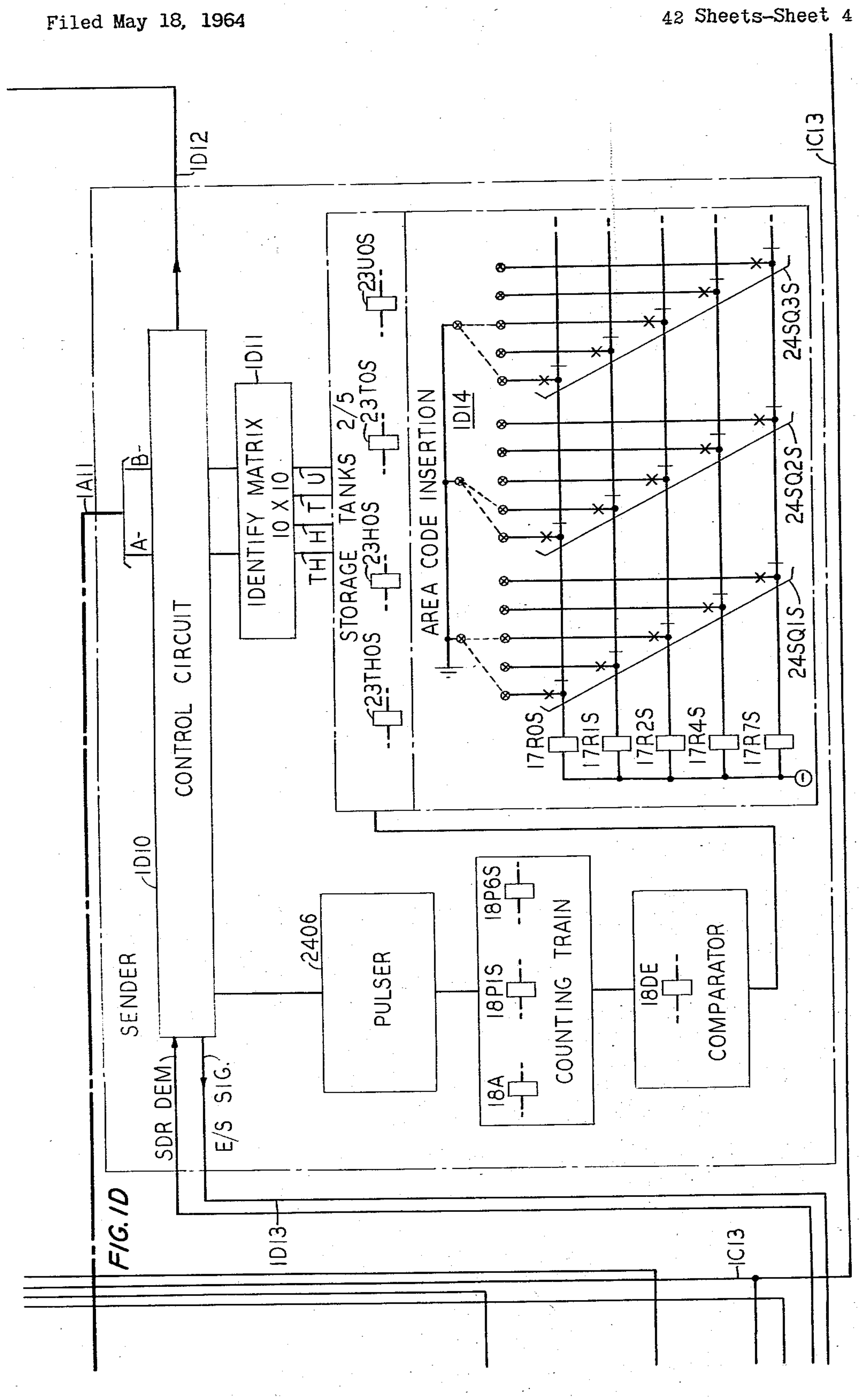
Figure 1E:
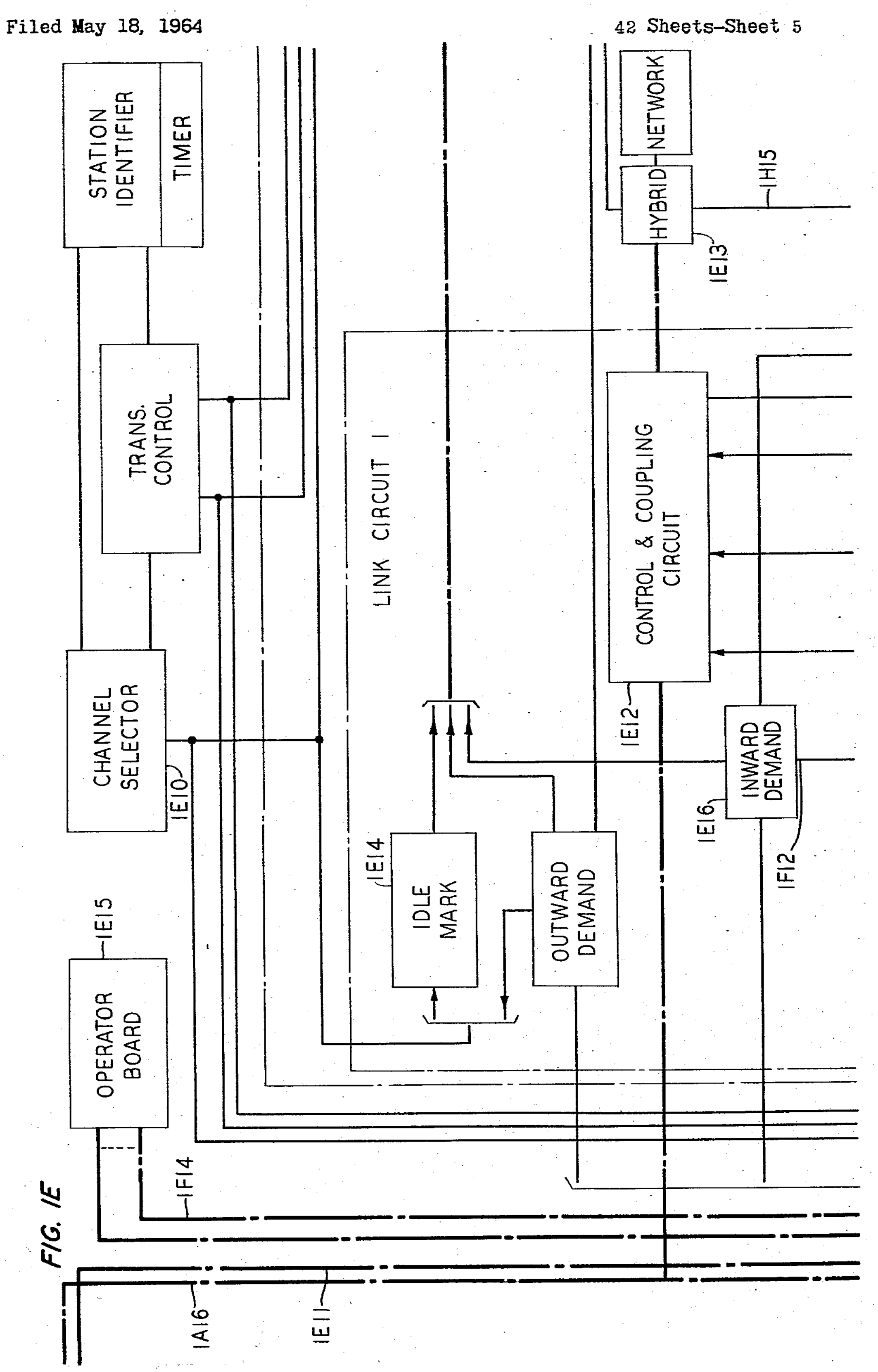
Figure 1F:
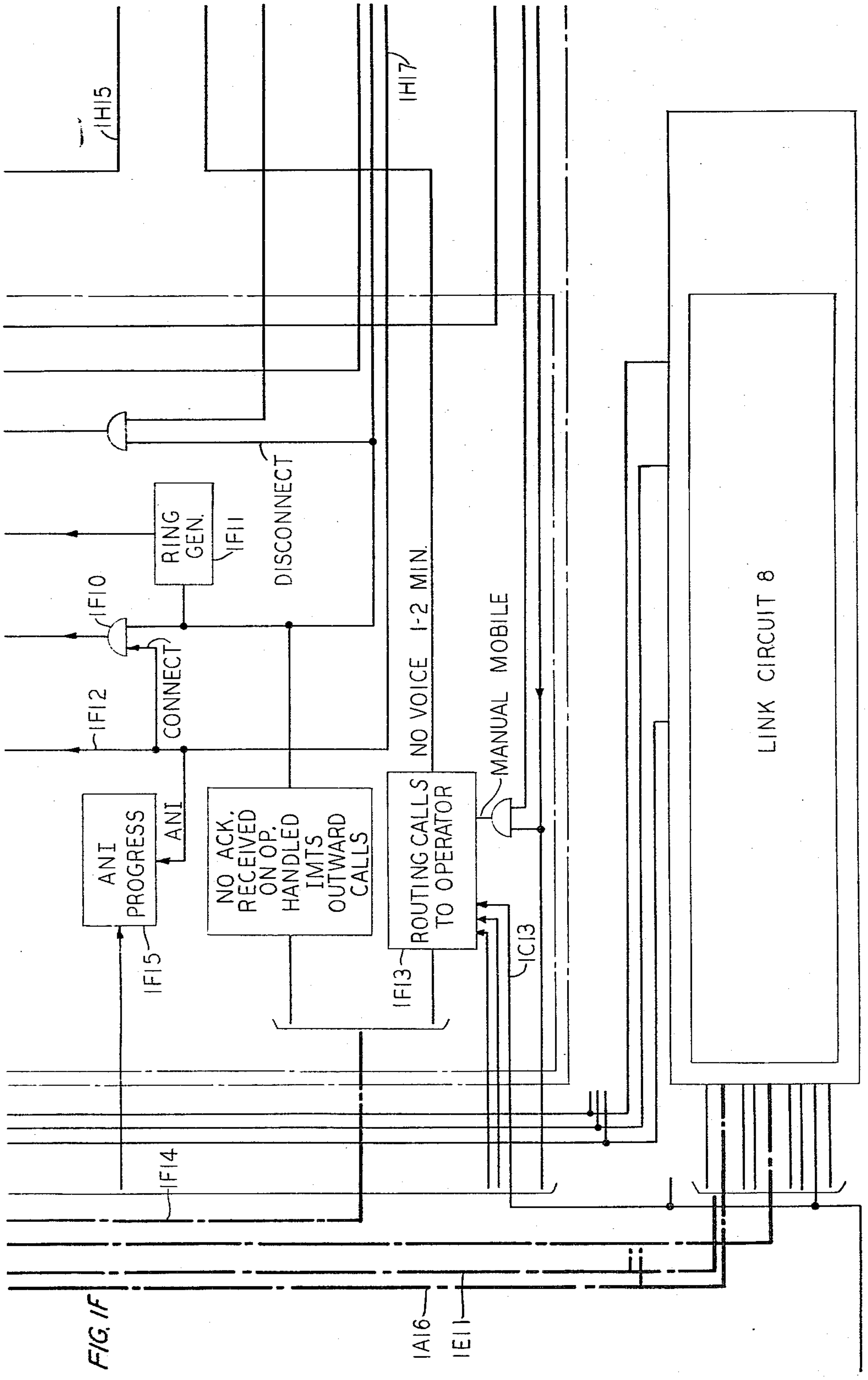
Figure 1G:
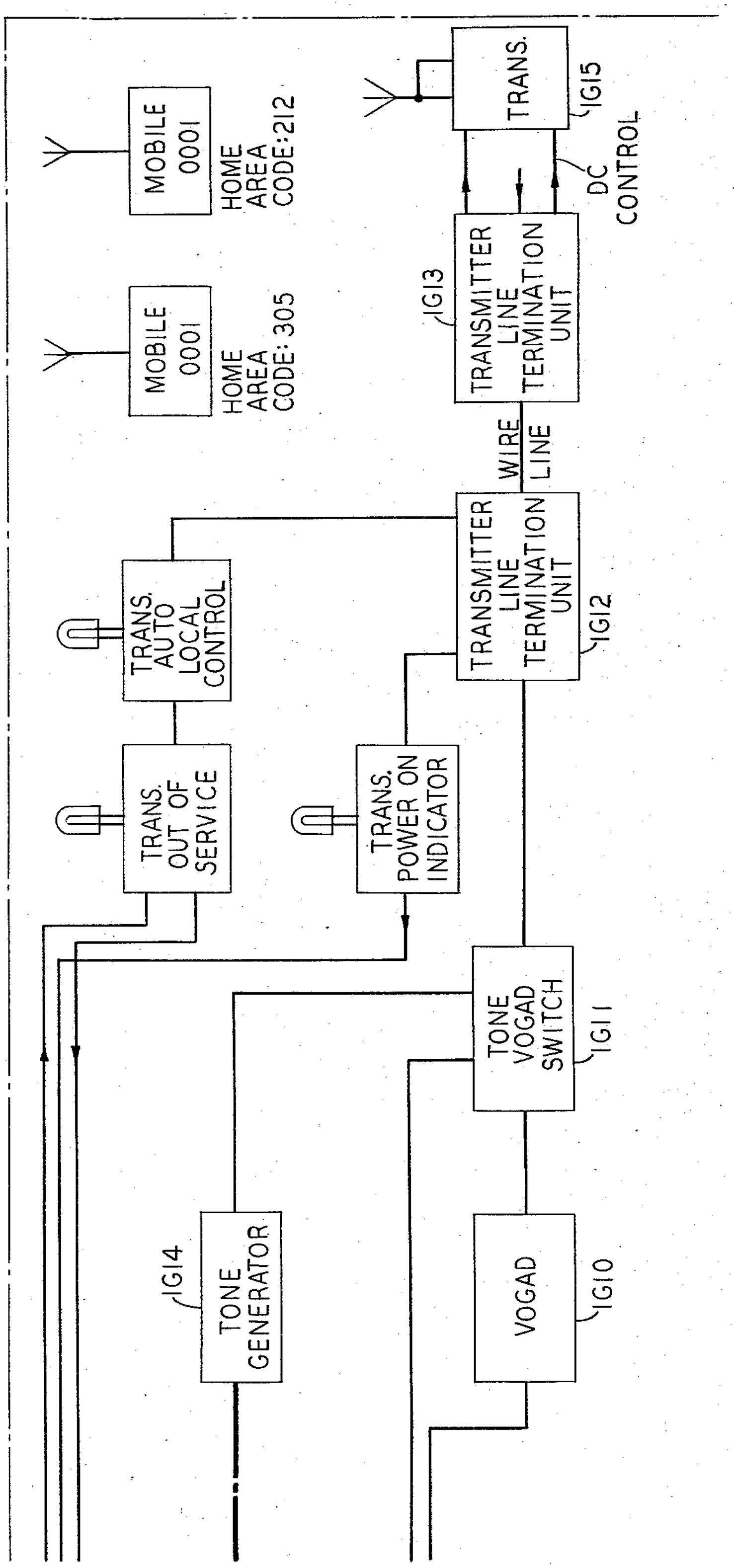
Figure 1H:
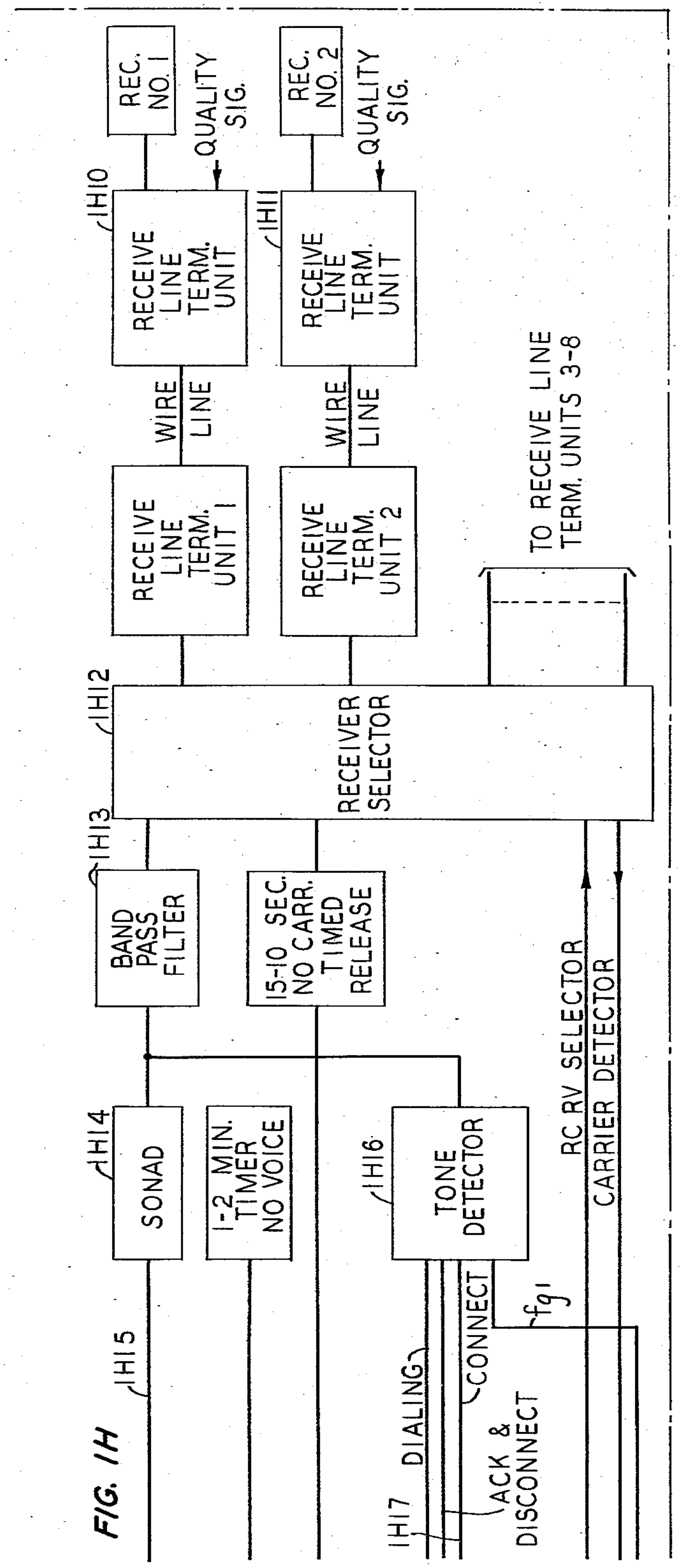
Figure 1I:
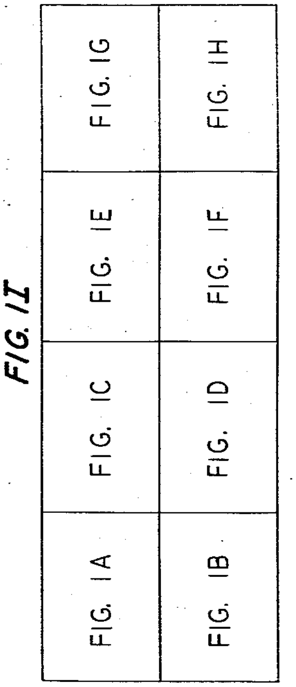

An outline diagram of the major components of the mobile telephone system is shown in FIGS. 1A through 1H. A complete system will include base station and mobile radio equipments and also base station and mobile telephone and related control circuit equipment. The latter facilities are utilized to couple the radio transmitting equipment for which termination units are shown in FIG. 1G, and radio receiving equipment for which termination units are shown in FIG. 1H to the conventional dial telephone central office of FIG. 1A.

Although not shown herein in order to preserve the clarity of presentation of the instant invention, suitable transmitting and receiving equipment and related circuitry in both the mobile unit and the central office terminal is shown in Patents 2,599,097 of June 3, 1952, of F. S. Entz et al.; 2,594,087 of Apr. 22, 1952, of R. O. Soffel; 2,641,757 of June 9, 1953, and 2,657,266 of Oct. 27, 1953, both of D. F. Hoth et al.

The central office terminal will mark an idle channel or radio frequency to be used for the next call. Channel selector 1E10 is shown to provide this function. All mobile units, such as mobile 0001 of FIG. 1G, when idle and energized will automatically search and find the marked idle channel. When the marked idle channel is found by a mobile, it will "lock" to that channel until the tone is removed or until the selector in the mobile unit detects a code mismatch in a manner related to that taught in the above-referred-to patents.

As shown in FIG. 1A, a group of crossbar switch circuits 1A12 are used to couple the radio line circuits individually associated with corresponding terminals in the conventional central office to a group of link circuits shown in FIGS. 1E and 1F over cable 1A16.

*Line chain and allotter*

The line chain and allotter circuit of FIG. 1A operates in conjunction with the radio line circuits to select one of the illustrative 480 lines for processing on an incoming or outgoing call. A preference circuit 1A14 provides an equitable priority allocation among the respective switch groups and lines after each call. In a related manner, the switch group relays 6SG1–6SG6 provide a lockout circuit for selecting one of the six crossbar switch groups.

It will be noted that the circuitry of FIGS. 1A through 1H includes symbolic control equipment, such as gate 1A15, which is operated when a link is available and the switch group and line circuit selections have been made. The actual circuitry for accomplishing this result is shown, for example, in FIG. 13 as energizing conductor 1/24GRD.

*Marker circuit*

The marker circuit of FIG. 1B includes facilities responsive to the energization of a particular line circuit on an outgoing call to a mobile unit to initiate the operation of the appropriate select magnets and hold magnets in the crossbar switch circuits 1A12 to effect a metallic connection between the central office line terminal and the selected idle link. These arrangements include the select magnet upper and lower circuit and the switching select magnet circuit 1B13 and 1B12, respectively. The latter are effective to pick a particular pair of select magnets which are uniquely related to a particular line terminal. In practice, this is acccomplished by returning a signal to the line circuit over conductor U/LGRD of FIG. 1B which is returned over conductor U/LSM of FIG. 1A under control of the operated contacts of relay 2AA1 unique to the line as described both generally and in detail hereinafter.

*Sender circuit*

The sender circuit of FIG. 1D includes facilities responsive on an outgoing call for effecting an equipment number (line location number) to directory number translation. Significantly, in accordance with a particular aspect of the present invention, facilities are provided in the sender circuit to prefix the area code individual to the REctor 2 central office prior to the four digits of the directory number. As will be shown herein, area code 212 illustratively associated with the REctor 2 central office is included by cross-connections 1D14. Thus, prior to the transmission of each series of directory number digits, the area code 212 of the local area is outpulsed under control of pulser 2406 and the counting train including relays 18A, 18P1S–18P6S. When the sender has completed outpulsing over the idle link and corresponding radio channel, a signal is delivered to the marker circuit for effecting the line-to-link connection.

*Register circuit*

The register circuit of FIG. 1C is effective in response to the incoming calls from a remote mobile unit to receive the directory number digits of the mobile. These digits are automatically transmitted in a manner described, for example, in the above-referred-to patents.

The first three digits transmitted by the mobile always comprise the area code representing the home area of the mobile. In the case of mobile 0001, the area code digits are 212. These digits are received in the relay registers 15A7R, 15B7R, 15C7R, etc., and a comparison is made by the cross-connection field 1C15 with the correct area code digits for the central office REctor 2. If any one of the area code digits is incorrect, for example, if the first digit is "3," a signal will be delivered over terminal A1 and diode DA1 and conductor 1C13 to the operator board 1E15 to alert the operator. This arrangement is predicated on a two-out-of-five code storage of the calling digits in the manner explained herein in detail. Again, assuming the first digit to be "3," relays 15A0H and 15A1R (the latter not shown, but see FIG. 15) will be operated and, as shown in FIG. 15, will apply reference potentials to terminals A1 and A2. In view of the cross-connection between terminal A1 and diode DA1, the signal is delivered to the operator as described above.

The incoming pulses from the link circuit which are on a decimal basis, having been translated from the frequency tones transmitted over the radio channel, are delivered through the counting train 1C11 and translator 1C12. In this manner the sequential pulses are translated to a two-out-of-five code representation and through the digit steering relays 27SQ1–27SQ8 are stored in the respective relay registers, also in the two-out-of-five code referred to in FIG. 1C as storage tanks. Although only three groups of relays are shown in FIG. 1C, it is understood that provisions are available for accepting the full seven-digit identification of the calling mobile station as shown in detail in FIGS. 15 and 21.

Assuming that the stored digits include the appropriate area code, a signal is delivered from the register circuit to energize the marker and to transfer the final four digits stored in the register to corresponding relay storage devices 1B14. Thereupon, a translation is made from the two-out-of-five code registration in circuit 1B14 over matrices 1B15 and 1B16 to energize a particular A– lead and B– lead over cable 1A11. This operation, as shown in detail in FIG. 2, results in the energization of relay 2AA1 which is unique to the calling mobile identification. The operation of relay 2AA1 initiates the functioning of the line chain and allotter circuit and the marker circuit which both proceed in the manner described above for an outgoing call to couple the line termination 0001 to link 1.

*Link circuit*

The link circuit 1, shown in FIG. 1E and in FIG. 1F, is one of an illustrative eight link circuits which serve the 480 radio line circuits. Each link is individual to a particular radio channel. This arrangement includes facilities which, in conjunction with the interface equipment between the radio facilities and the wire facilities, serve to couple the crossbar switch and line circuits thereon to the radio channels.

*Channel selector*

The channel selector 1E10 may illustratively include a chain circuit for selecting a new idle channel when a particular channel is seized. The channel selector governs which link circuit will apply an idle mark tone to the selected idle channel as shown for link circuit 1 by idle mark circuit 1E14.

The tone detector 1H16 is arranged to receive appropriate frequencies from the mobile unit and to translate such signals to corresponding direct-current indications over the leads connected thereto.

Various speech volume control and noise reduction facilities 1G10, 1G11, 1H13, 1H14, etc., are provided to preserve the quality of transmission in a conventional manner. The tone generator 1G14 is effective to convert the direct-current potentials applied by the link circuit to corresponding radio frequencies suitable for transmission to the mobile unit, also as explained in the above-referred-to disclosures. Additional timing devices with respect to the detection of a failure to apply speech to the radio channel and a failure of the carrier are also shown in conventional application in FIG. 1H. The receiver selector 1H12 elects which receiver to utilize on the basis of the relative signal qualities. FIGS. 1E and 1F include conventional showings of timed station identification in accordance with FCC requirements and also show in outline form control facilities 1F15 responsive to automatic number identification for indicating progress of the identification.

GENERAL DESCRIPTION OF OPERATION ON AN OUTGOING CALL

It will be assumed for illustrative purposes that an outgoing call is to be extended from the line termination 0001 in FIG. 1A to the mobile station having such line termination. The call is initiated by an originating subscriber who will dial the conventional code digits, for example REctor 2–0001, whereupon the central office of FIG. 1A responds in a conventional manner by extending a connection to the terminals 0001. Although only one terminal is shown, it is understood that a sufficient number of terminals for the individual mobile units will be allocated in the central office. Illustratively, 480 radio line circuits are shown in FIG. 1A which are individual to the mobile units and also individually associated with corresponding terminals in the central office, of which only terminal 0001 is shown.

As explained herein in detail, the energization of terminal 0001 causes the operation of relay 2AA1 in the radio line circuits.

The line chain and allotter circuit of FIG. 1A is effective in conjunction with the radio line circuits to select for service a particular line for connection to an idle available link. The link has been previously designated by a link allotter circuit 1C10 and is associated on an individual basis with the radio channel on which idle tone has been marked in accordance with the operation of channel selector 1E10. The latter operates in a conventional manner to select an idle channel and to apply a frequency characterizing the idle condition thereto.

The line chain and allotter circuit, in response to the operation of the chain circuits 1A10 and the appropriate switch group relay, for example 6SG1, together with an indication from the link allotter 1C10 that a link is available, will deliver a signal on lead DEM (FIG. 1A) to energize the marker circuit. As shown herein, the signal will, assuming that all of the marker relays have been released and that relay 26DCK is released, result in the operation of start relay 26ST1 in the start circuit 1B10. The signal is further delivered over the sender demand lead SDRDEM to energize control circuit 1D10 in the sender. The marker will now transmit a signal to energize conductors A1 and B1 which are in turn extended over cable 1A11 to energize particular conductors in the identification matrix 1D11. The latter in turn cause the operation of particular storage relays 23TH0S, 23H0S, etc., to store the thousands, hundreds, tens, and units digits of the called number on a two-out-of-five basis.

Thereafter, the pulser 2406 of FIG. 1D is effective to deliver signals through control circuit 1D10 and conductor 1D12 to the link allotter circuit and over cable 1E11 to the link circuit 1. From the link circuit, the signals are further transmitted through the control and coupling circuit 1E12 and volume gain and hybrid and adjustment circuitry 1E13, 1G10, and 1G11 to the transmitter line termination unit 1G12 and thereafter over wire lines to the transmitter line termination unit 1G13 and ultimately to the transmitter 1G15. The counting train including relays 18A and 18P1S–18P6S in conjunction with a comparator including the digit end relay 18DE is used to control the pulser which responds to the digits stored in the storage tanks. Prior to the transmission of the thousands, hundreds, tens, and units digits, however, a group of signals representative of the area code is transmitted as shown in FIG. 1D. Therein, it is assumed that the area code is 212. In consequence, it will be noted that on the operation of relay 24SQ1S, as explained in detail herein, relays 17R0S and 17R2S will be operated under control of field 1D14. Subsequently, the pulser 2406 in conjunction with the counting chain and the comparator will deliver a number of pulses equal to the digital value stored in the relays 17R–S—in the assumed illustration, two pulses. Subsequently, the steering relays 24SQ2S and 24SQ3S are operated sequentially to transmit the remaining digits of the area code. Finally, the four digits stored in the storage tank relays 23TH0S, etc., are transmitted to all of the distant mobiles.

It will be noted in this respect that although the calling party may have dialed the digits RE2–0001, that the digits ultimately transmitted via the idle marked radio channel are the digits 212–0001. When the sender has completed transmission of the seven digits, a signal is returned over conductor 1D13 which, in conjunction with the selection of an idle link as represented by the operation of one of the link relays 19LK1–19LK8, delivers a signal as shown symbolically by AND gate 1B11 to conductor U/LGRD which extends to the line chain and allotter circuit. This signal is transmitted over conductor U/LSM to energize the appropriate crossbar switch control relay in preparation for completing a connection between the terminal 0001 and link 1 over the appropriate contacts in the crossbar switch circuits 1A12. Thus, the signal over conductor U/LSM is traced further over the switching select magnet control circuit 1B12 and the upper and lower select magnet control circuit 1B13. Energization of control circuit 1B12 results in the operation of a particular select magnet, for example select magnet 14SM1–11. In consequence, a signal is returned over conductor S0N1 and cable 1A13 to operate an additional select magnet, not shown, over the contacts of relay 19UP1. Operation of the latter select magnet causes a return signal over conductor S0N2 and cable 1A13 to operate relay 10HM1–11, the hold magnet associated with link 1. At this time a path is available between line circuit 0001 and link circuit 1 which, as described above, extends over transmitter line termination unit 1G13 to a transmitter. Moreover, the link circuit is coupled over a plurality of receiver line termination units 1H10, 1H11, etc., to a receiver selector 1H12 from which the circuit is further extended over bandpass filter 1H13, noise reducer 1H14, conductor 1H15 to hybrid circuit 1E13 and the link circuit 1.

It will be noted that when link circuit 1 was connected to the line, the marked idle channel is made busy by changing the idle tone on the channel to a different frequency by representing a seize tone through tone generator 1G14. At the same time a new channel is marked idle by the channel selector 1E10. All mobile units previously locked to the idle tone use the seize tone as a latch in a manner related to that explained in the above-referred-to patents. The seize tone latch is effective only until a mismatch is detected in response to the signals transmitted by the sender circuit in the manner described. Requiring the idle tone to be present to stop a search for a marked idle channel prevents mobile units from locking to a seized channel on which the sender has partially completed pulsing.

On completion of signaling by the sender, all mobile units except the called mobile will have been unlatched to seek a new idle marked channel.

Selection of the called mobile unit 0001 causes a signal in the mobile to be activated and energizes the mobile transmitter to transmit an acknowledgment signal which is shown in FIG. 1H as being received through tone detector 1H16 and delivered over conductor ACK and AND gate 1F10 to the control circuit of the link 1E12. Recognition of this signal acknowledges that the called mobile has received the call. Failure to receive the signal within a predetermined time will cause the call to be abandoned by the line switch unit and will deliver a disconnect signal to the control circuit 1E12. If an acknowledgement signal is received, but the mobile does not answer within a fixed period of time thereafter, a disconnect signal is also delivered to the control circuit 1E12. The ringing generator 1F11 is arranged to continue ringing until the mobile unit delivers an answer signal following the acknowledgement signal as indicated through the tone detector 1H16. If all channels are busy, however, the line circuit will immediately cause ringing to be tripped and busy signal to be returned to the calling party until the call is abandoned, as explained in detail herein.

In the case of an outgoing call to a "roaming" mobile unit, the operator at board 1E15 extends the call by dialing or keying the last four digits of the roamer's directory number preceded by the roamer's area code digits. Thus, for a Miami mobile, the digits outpulsed may illustratively be 305–1234.

GENERAL DESCRIPTION OF OPERATION ON INCOMING CALL

When the receiver at mobile unit 0001 goes off hook, it transmits a connect tone over the marked idle channel. Again, assuming that the channel is individual to link 1, the connect tone will be received in a conventional manner in tone detector 1H16, as described in the above-referred-to patents, and a signal will be delivered over conductor 1H17, AND gate 1F10, and conductor 1F12. When the connect tone is received, the idle tone applied by circuit 1E14 will be removed and a seize tone of a different frequency will be placed on the channel. When the mobile unit detects the seize tone, it automatically transmits the area code digits 212 and the directory number digits 0001 of the mobile unit individually associated with terminal 0001 in FIG. 1A. The automatic transmission being in the manner explained in the above-referred-to patents. These signals are delivered through the receiving circuitry of FIG. 1H and link circuit 1 of FIG. 1E to the register circuit of FIG. 1C over cable 1E11. The signals are counted in counting train 1C11 by relays 16AR and 16P1–16P6 in the manner explained herein in detail. Moreover, a translation is made in relays 15R0–15R7 from a decimal basis to a two-out-of-five code as shown in translator 1C12. Ultimately, for each digit received, a pair of relays 15R– are operated. The digit steering relays 27SQ1–27SQ8 store the seven transmitted digits 212–0001 in seven groups of five relays on a two-out-of-five basis.

In FIG. 1C, for simplicity, only the first three groups of storage relays are shown. At this juncture, a convenient and expeditious arrangement is effective for ascertaining whether the calling mobile station is, in fact, a local or home mobile as distinguished from a roaming mobile having a foreign area code designation. As shown in FIG. 1C, the reception of an initial digit of "2" will result in the application of a signal on conductors A0 and A2 but no signal will be applied to conductor A1, A4, or A7. In consequence, no signal will be delivered through the diode DA1, DA2, or DA3 which extends over conductor 1C13 and control circuit 1F13 to cable 1F14 and the operator switchboard 1E15.

The same analysis applies to the reception of the remaining two digits 12 of the area code. Thus, if the correct digits are transmitted, no signal is delivered over conductor 1C13 to alert the operator at switchboard 1E15.

Assume, however, that mobile unit originating the call has directory number digits 0001 and the exchange letters RE but is, in fact, a mobile unit which has its "home" station in Miami, Fla., and thus has the area code 305. When the first digit 3 is stored in relays 15A1R and 15A2R (not shown, but see FIG. 15), a signal may be traced over conductor A1, diode DA1 and the path outlined above to operator switchboard 1E15. The operator is thus advised that the mobile unit which is initiating the call is a foreign mobile and will proceed to complete the call on a manual basis in the manner described in the above-referred-to patents.

Figure 2:
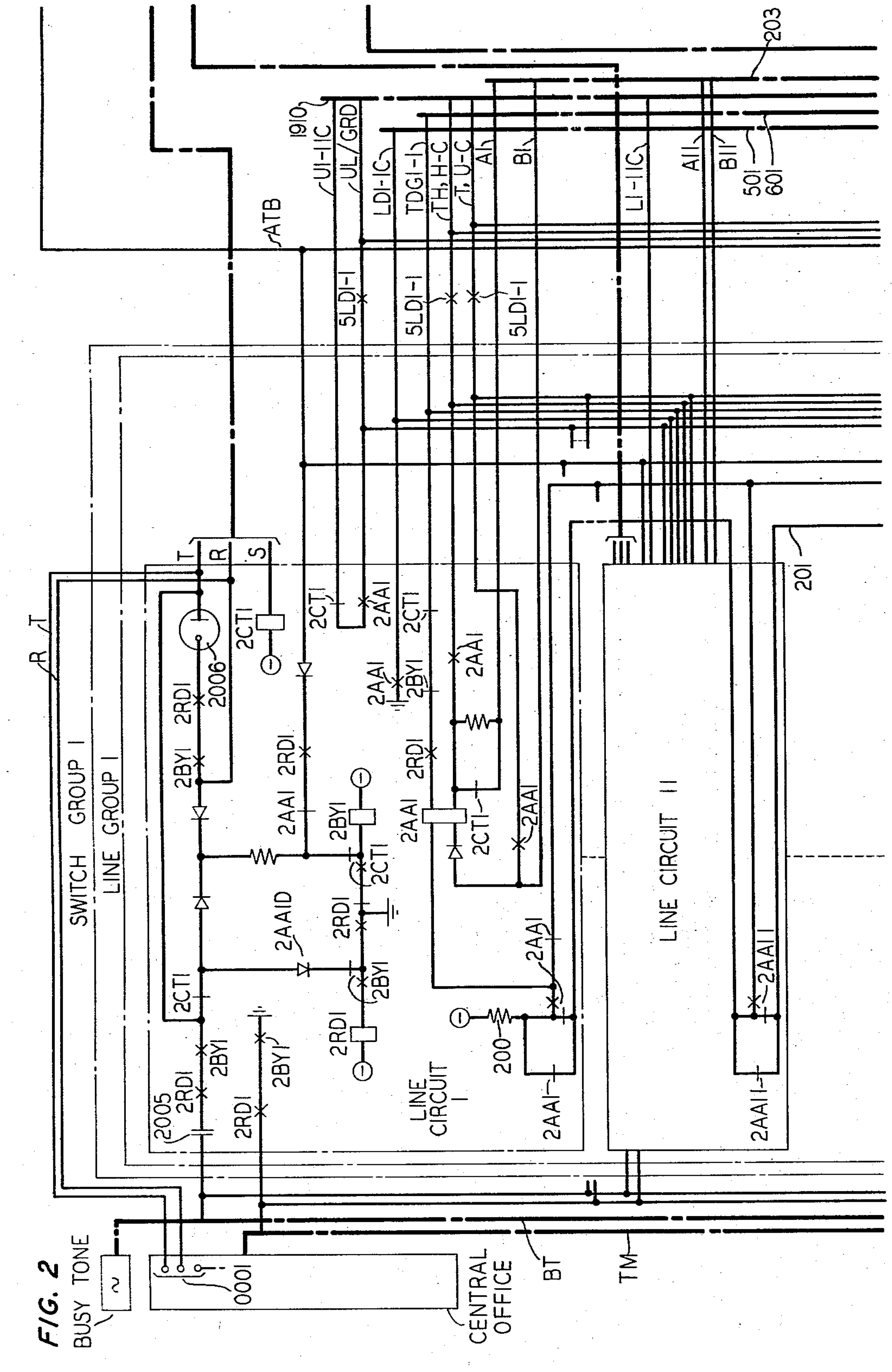
FIG. 2 shows the details of a line circuit in the control terminal.

Assuming, however, that the calling mobile station is, in fact, that associated with the central office of FIG. 1A, the digits automatically transmitted and stored in the register will be transferred over cable 1C14 to the two-out-of-five storage relays 34TH0M, 34H0M, etc. of the marker. Since the area code has already been verified, it is necessary to store only the final four digits representing the thousands, hundreds, tens, and units value. When these digits are stored in register 1B14, the identifying matrices 1B15 and 1B16 are energized to apply a signal over a selected conductor A– and a selected conductor B– to energize a corresponding relay 2AA– in the radio line circuits. In the assumed illustration, conductors A1 and B1 will be energized and, as shown in FIG. 2 herein, serve to operate relay 2AA1. The latter relay, as described above with respect to an outgoing call, is individual to terminal 0001 in the conventional REctor 2 central office.

The operation of relay 2AA1 simulates, for the line chain and allotter circuit, an outgoing calling condition. In consequence, the operation previously described in response to the energization of relay 2AA1 for an outgoing calling condition is repeated. Thus, a signal is delivered to the marker circuit indicating the necessity for extending a connection between the line 0001 and the marked idle link. The marker in turn proceeds to extend a connection over the crossbar switch circuits 1A12 in the manner described above for an outgoing call. When the connection is completed, line termination 0001 will be energized. Thereafter, upon connection of a dial pulse register to terminal 0001, a dial tone will be transmitted by the link circuit from the central office dial tone supply.

The duplicate switch and test access circuit of FIG. 30 may illustratively be used for lamp displays and other indications of the call progress through line chain and allotter, marker and other circuitry, as shown.

It will be noted that throughout the detailed description and wherever feasible to enhance the clarity of the disclosure and to reduce the complexity thereof, symbolic switches have been used to initiate or complete control functions.

It is understood that conventional relay or other circuitry may be incorporated by those skilled in the art to perform the corresponding functions and to effect the same results. Since the explicit details for achieving such functions do not contribute to an understanding of the present invention, the details thereof have been omitted. Moreover, it is understood that the specific registers, counters, etc. are merely illustrative and that conventional apparatus may be substituted therefor.

It is understood that within a particular numbering plan area that several control offices may be equipped with control terminals, but that in such an instance, the mobile units within an area may have different exchange codes but will all have individual and unique directory numbers. Thus the directory numbers of the mobile units local to particular numbering plan area cannot be duplicated even though they are associated with different central offices.

DETAILED DESCRIPTION OF MAJOR COMPONENTS

*Line chain and allotter circuit*

Figure 3:
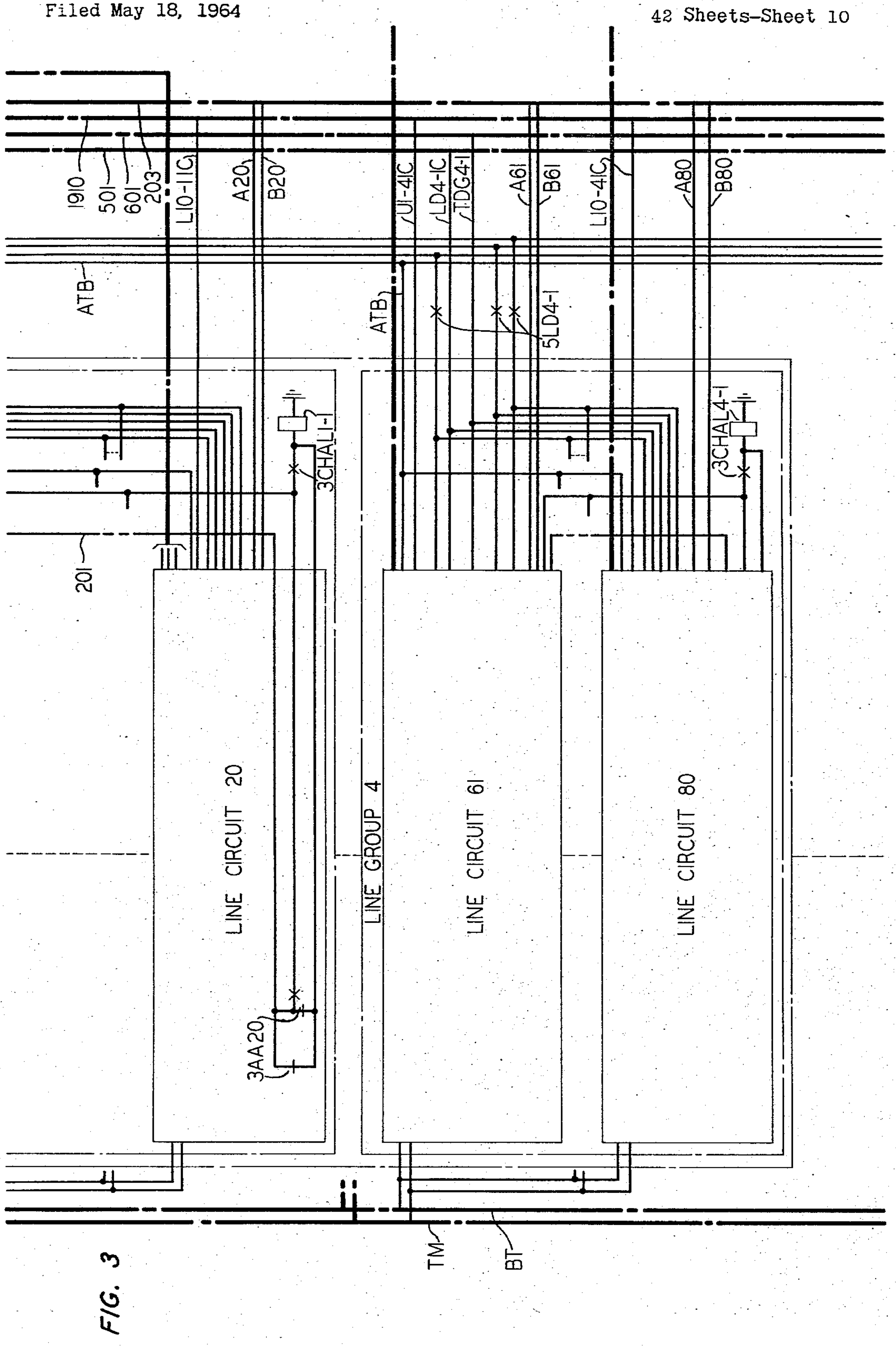
FIGS. 3 and 4 show additional line circuits and line groups similar to that of FIG. 1.
Figure 4:
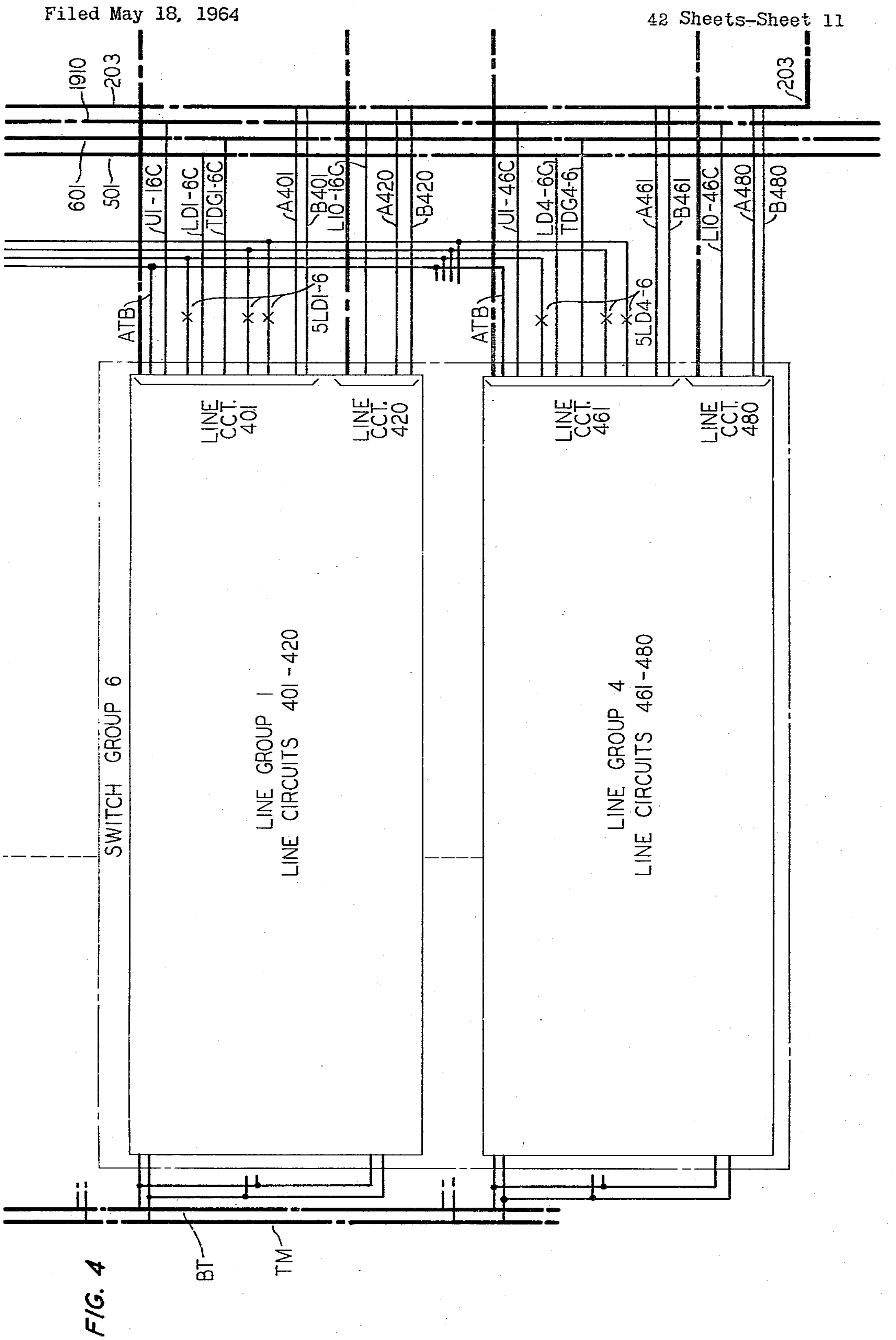

The line chain and allotter circuit includes connections to the line circuits shown in FIGS. 2–4 and is arranged to provide sequential one-at-a-time servicing of the line circuits. Thus, for example, the line groups are arranged in chain circuits and allocated preference in a predetermined order, as shown in FIG. 5, and the particular switch groups are allocated preference in the manner shown in FIG. 6. Relay 5LD1–1 is unique to line group 1. The remaining relays 5LD2–1, etc., are unique to the remaining line groups. The particular switch group selected is determined by relays 6SG1, etc., and the manner of allocation of preference is determined in accordance with the allotter relays 6A1–6A8. When a particular line circuit requesting service has been allocated preference, a mark is delivered over conductor 1/24GRD to the marker circuit, FIG. 26.

*Choice allotter relays 6A1–6A8*

The function of the choice allotter is to rotate battery selection for relays 5LD1–1, etc., and 6SG1, etc., in order to give preference sequentially to each line group in a switch group. In addition, preference is accorded on a rotating basis to each of the line switch groups. In response to the initial demand to the line chain and allotter circuit, relays 6A1–6A8 and pulse divider relay 6PD2 will be in the normal released condition. Battery is supplied through resistance 600 in a manner which will accord preference to relay 6SG1. When relay 7D is operated, a path is provided for the operation of relay 6DA2. The operation of relay 6DA2 operates relay 6PD1 and opens a locking path of relay 6PD2. Moreover, a ground condition is extended to the contacts of relays 6A1–6A5 and 6A6–6A8 over the contacts of relay 6PD2. The operation of relay 6PD1 causes the operation of relay 6PD2 if relay 6DA2 is released. When the line chain and allotter performs its function and relay 6DA2 is released, relay 6PD1 remains operated.

The release of relay 6DA2 causes the operation of relay 6PD2 and removes the ground condition from relays 6A1–6A8. The operation of relay 6PD2 extends a path from ground, contacts of relays 6PD2, 6A2–6A5, winding of relay 6A1 to negative battery. In addition, relay 6A6 is operated from negative battery, contacts of relays 6A8, 6A7, 6PD2 to ground. The operation of relay 6A1 prepares an operating path for relay 6A2 when relay 6PD2 is released at the end of the next call processing. The operation of relay 6A6 prepares an operating path for relay 6A7 at the end of the next call processing. On a subsequent demand to the line chain and allotter circuit when relay 6DA2 reoperates, relay 6PD1 is released to prepare the circuit for the next cycle of operation. Again, at the end of call processing, relay 6DA2 is released and causes the operation of relays 6A2 and 6A7 as described above. The cycle thus continues in the same manner.

*Chain alarm relays 11AL1–11AL4*

During the idle condition of the line chain and allotter circuit, relay 11ALD will not be operated. A path may be traced from battery over the contacts of relay 11ALD to the windings of relays 11AL1–11AL4. A ground condition on any lead CHAL– operates the associated relay 11AL– which locks operated to ground. If a chain fault occurs and in turn causes the release of relay 3CHAL1–1, the associated alarm relay 11AL1 will therefore be operated.

*Line circuits*

As shown in FIGS. 2, 3 and 4, the individual line circuits are unique to a particular terminal in the conventional central office. For example, line circuit 1 of FIG. 2 is unique to terminal 0001 in the central office. Relay 2AA1 when operated indicates a service request for an outgoing call or an incoming call through terminal 0001 of the central office. As shown herein with respect to the register circuit and the marker circuit, the line circuit relay 2AA1 is effective to designate the line location information indicative of line 0001 in the crossbar switches of FIGS. 8 and 9. In addition, the contacts of relays 2AA1 and 5LD1–1 are effective to mark the thousands and hundreds designation as well as the tens and units designation of the line associated with relay 2AA1 whenever a line location or equipment number translation to directly number is required. The conductors in line circuit 1 for accomplishing this function are shown as TH, H–C, T, U–C, A1, and B1.

*Crossbar switches*

The switches are shown in FIGS. 8 and 9 and include connections to the individual line circuits on the switch horizontals and to the link circuits on the switch verticals. Since six contact crosspoints are used on the switches, twenty lines may be connected to ten horizontal levels by appropriate operation of upper and lower select magnets at levels H11 and H12 as shown in FIG. 8. It is understood that throughout the drawing, only a portion of the equipment is shown in order to preserve clarity. For example in FIGS. 8 and 9, only switch groups 1 and 6 are shown—it being understood that corresponding switches may be utilized for switch groups 2–5.

*Register circuit*

The register circuit is adapted as shown in FIG. 16 to receive pulses for operating relay 16L. In response thereto, the counting circuit relays 16AR and 16P1–16P6 are effective to store the digital value of the incoming pulses shown symbolically by the operation of contacts of relay 28PLS representative of the directory number of a mobile subscriber on an incoming call and to operate relays 15R0–15R7 on a two-out-of-five basis representative of the individual digit counted by the relays of FIG. 16. Concurrently, the steering circuit relays 27SQ1–27SQ7 are effective to store the digital value temporarily registered in relays 15R– in corresponding two-out-of-five locations in relays 15A0R, etc.; 15B0R, etc.; and 15C0R, etc., of FIG. 15. The latter three relays store the area code designation or NPA (numbering plan area) of the calling mobile station. These digits are automatically outpulsed by the calling mobile station by means not shown herein as not essential to an understanding of the present invention. Reference may be made to Patent No. 2,599,097 of F. S. Entz et al., issued June 3, 1952, for a suitable explanation of this type of automatic outpulsing. The subsequent four digits indicative of the directory number of the calling mobile subscriber are stored in relays 21TH0, etc.; 21H0, etc.; 21T0, etc.; and 21U0, etc., all under control of relays 27SQ–. In this manner the seven digits of the calling mobile station, which include the area code and the last four digits of the directory number but do not include the exchange code, are stored in individual relays of FIGS. 15 and 21.

At this point a significant aspect of the invention is apparent from the connections shown between FIGS. 15 and 27 over conductors A0–A7, B0–B7, and C0–C7. As shown in FIG. 27, the latter conductors are coupled through a cross-connecting field to corresponding terminals which are representative of the storage in the relays of FIG. 15 of an incorrect area code. Thus, assuming that the correct or home area code is 212, it will be seen that the registration of a "3" for the A digit, as represented by the operation of relays 15A1R and 15A2R, will result in an output on conductor A1 in FIG. 15 which may be traced to terminal DA1 of FIG. 27 and thereafter over diode CR1, conductor TOG to an alarm relay 32ROAM which alerts an operator to intercept the call. In this manner a roaming mobile is automatically intercepted by a mobile operator upon transmission of the local area code of the roaming mobile and the mismatch over the cross-connecting field of FIG. 27.

It will be noted that relay 27T0R is effective in response to the reception of an excess number of digits which may be due to "fading" of the radio signal, and may be used to signal an alarm.

*Sender circuit*

The sender circuit includes a group of storage relays 23TH0S, etc.; 23H0S, etc.; 23T0S, etc.; and 23U0S, etc., which are adapted to temporarily store for outgoing transmission the digits of the called mobile. As indicated by the relay designations, the digits stored are the last four digits of the mobile directory number. The first three digits, which are not the exchange code of the called mobile but instead represent the area code, are automatically "inserted" before the last four digits by the cross-connecting field of FIG. 17. Illustratively, the connections for the automatic transmission of the area code 212 prior to the transmission of the last four digits area shown in FIGS. 17 and 24 as controlled by the contacts of steering relays 24SQ1S through 24SQ7S. The sender circuit includes a pulsing circuit 2406 which delivers sequential output pulses over conductor 2405 to the link circuit of FIG. 28 for transmission to the remote mobile unit. Relays 17R0S through 17R7S are operated for each digital position and in turn control the outpulsing over conductors 1SC, 2SC, etc., of FIG. 18 and digit end relay 18DE which arrests further outpulsing. It will be seen herein that although the conventional terminal of the called mobile station in the central office is reached by dialing the exchange code, for example REctor 2 followed by the directory number digits 0001 of the called mobile station, that the digits outpulsed to the called mobile are, as shown in FIGS. 17 and 23, the area code digits 212 followed by the directory number digits 0001.

*Marker circuit*

Essentially, the marker circuit includes equipment for establishing a connection in the crossbar switch between the central office mobile line termination and a designated idle link circuit. Thus, for example, the marker circuit is effective on an incoming call to respond to the storage therein—specifically in relays 34TH0M, etc.; 34H0M, etc.; 34T0M, etc.; and 34U0M, etc., on a two-out-of-five basis to store the digits of the called mobile number. Thereafter, as shown in FIG. 33, particular conductors, for example conductors TH–H00 and T–U01, are energized to operate relay 2AA1 individual to the called mobile station. In this manner the marker prepares for a directory number to line location number or equipment number translation. The operation of relay 2AA1 is utilized to mark the particular select magnet unique to the called line termination by the application of an identifying ground from the marker circuit in FIG. 19 over conductor U/LGRD which may be traced in FIG. 2 through the contacts of relays 5LD1–1, 2AA1 and 2CT1 to conductor U1–11C which in turn extends in FIG. 19 to conductor UP1C to operate relay 19UP1, the upper control select magnet, and relay 14SM1–11 which is the switching select magnet on switch 1 effective for controlling line 1. The operation of the switching select magnet 14SM1–11 and the upper control select magnet 14SMU–11 returns signals over conductors S0N1–111C and S0N2–11C. As shown in FIG. 20, the latter two conductors are effective to cause the operation of relays 20S0N1 and 20S0N2.

Subsequently, a path may be traced for the operation of a particular hold magnet, for example hold magnet 10HM1–11, over conductor HM1–11C in a manner explained herein. The hold magnet will, in conjunction with the previously operated select magnets, extend a connection between line 1 and link 1 in view of the association of select magnet 14SM1–11 with horizontal level H1 and select magnet 14SMU–11 with horizontal level H11. It will be noted that horizontal level H12 is associated with the select magnet 14SML–11.

*Link circuit*

Although shown in outline form in FIG. 28, it is understood that the link circuits 108 provide appropriate equipment for coupling the link conductors extending from the crossbar switches to particular transmitter or radio channels individual to the links in order that any signals transmitted to or from the link circuits be converted to appropriate signals for transmission by radio to the mobile unit. These circuits are also shown in FIGS. 1G and 1H.

DESCRIPTION OF OPERATION ON OUTGOING CALL

In the following description and in the drawing, only a sufficient portion of the equipment which is necessary for an understanding of the invention is shown. It is understood that various other arrangements and control circuitry may be utilized to accomplish the objects of the invention.

For illustrative purposes, it will be assumed that a call is being directed to the mobile station having the conventional directory number REctor 2–0001. The calling subscriber (not shown) will dial the seven digits of the called director number and ultimately be connected to a conventional manner over the switch train to the terminals 0001 unique to the called mobile station at the conventional office. As shown in FIG. 2, the terminals do not extend to a conventional wire line but instead are connected to the radio line circuit 1 individual to mobile station 0001 of the REctor 2 central office. The application of ground potential to the conventional tip terminal ultimately causes the operation of relay 2RD1 over contacts of relay 2CT1, diode 2AA1D, contacts of relay 2BY1, winding of relay 2RD1 to battery in the radio line circuit unique to the mobile station 0001.

The operation of relay 2RD1 completes a path for the operation of relay 2AA1 which may be traced from ground, contacts of relay 13TDG, conductor TDG1–1, cable 601, contacts of relays 2CT1, 2BY1, 2RD1, winding of relay 2AA1, contacts of relay 2AA1, contacts of relay 3CHAL1–1, contacts of relay 3AA20, conductor 201, contacts of relays 2AA11, 2AA1, resistance 200 to negative battery to ground. Relay 3CHAL1–1 was previously operated over a chain circuit including the contacts of relay 3AA20, conductor 201, contacts of relays 2AA11, 2AA1 to negative battery. The operation of relay 2AA1 indicates the calling line identification, in this case line 0001.

As explained herein, when the crossbar switch is operated, ground will be applied to conductor S to operate relay 2CT1 which in turn releases relay 2RD1. When the latter relay releases, relay 2BY1 is operated. Relay 2CT1 remains operated over the sleeve conductor and the link circuit as explained herein.

The operation of relay 2AA1 places a ground condition on conductor LD1–1C which may be traced over cable 501 to FIG. 5, conductor LD1–1C, winding of relay 5LD1–1, contacts of relays 5LD1–1 through 5LD4–1, contacts of relays 6A8, 6A7, 6A6, resistance 500 to negative battery.

*Line chain and allotter operation*

The operation of relay 2AA1 also opens the path to the winding of relay 3CHAL1–1 which extended over the contacts of relays 2AA1, 2AA11 and 3AA20 to release relay 3CHAL1–1.

As described above, relay 5LD1–1 is operated to indicate the group (1) in which the demand for service has been made and results in the application of a ground potential on conductor ALD0P1 which extends over conductor 702 to FIG. 11 to operate the alarm delay relay 11ALD. Relay 7D is operated over the contacts of relay 5LD1–1. Relay 6SG1 is operated over a path from ground, contacts of relay 5LD1–1, winding of relay 6SG1, contacts of relays 6SG1–6SG6, contacts of relays 6A4, 6A2, 6A5, 6A3, 6A1, 6PD2, resistance 600 to negative battery. Relay 7GCK1 is operated over the contacts of relays 5LD1–1 and ground is removed from conductor G1–1 in FIG. 7 which extends to relay 11AL1 over cable 703. Relay 5LD1–1 closes a locking path over its own contacts to negative battery and interrupts the operating path of other relays 5DL– in the same group. Moreover, the contacts of relay 5LD1–1 prepare a path in FIG. 2 for extending leads TH, H–C and T, U–C over conductors A1 and B1 to the corresponding terminals in the sender circuit at FIG. 22, over cable 203. In this instance, conductors A1 and B1 of FIG. 2 are extended respectively to terminals TH–H00 or FIG. 22 and T–U01 also of FIG. 22. Moreover, the contacts of relay 5LD1–1, FIG. 2, prepare for the extension of a ground condition from the marker circuit and the contacts of relays 2AA1 and 2CT1 to designate the particular select magnet associated with the calling line over conductor U1–11C and cable 1910.

Thus far, it is seen that the line chain and allotter circuit has identified the calling line and prepared a path to the sender for conveying the line identification information and also prepared a path to the marker circuit for energizing the marker circuit to initiate the function of coupling the calling line circuit to an idle available link circuit. Morover, heretofore, in response to the operation of relay 5LD1–1, relays 6SG1, 7D, and 11ALD have been operated.

The operation of relay 7D extends a ground condition over conductor LKD in FIG. 13 to the link circuit over a path including ground, contacts of relays 12RLS2, 7D, 13INC and conductor LKD. The latter circuit returns a ground (if an idle link is available) to operate relay 13OTG. This procedure is shown symbolically by the operation of switch 1305.

In addition, the operation of relay 7D completes a path for the operation of relay 7OKCK which verifies that only one 7GCK– relay has operated and is effective in the event of multiple outgoing calls. Relays 6DA1 and 6DA2 are operated over the contacts of relay 7D. In FIG. 12, a ground condition is extended over the contacts of relay 7D, conductor 5 to contacts of relay 34RLS in the marker circuit. Subsequently, as will be described herein, the operation of relay 34RLS will return a ground over conductor 6 to operate relay 12RLS2 to effect the release of the line chain and allotter circuit.

In addition, the operation of relay 7D extends a path for the operation of relay 25LCT in the marker circuit. The latter relay is operated, as shown herein, to effect a cut-through of the line circuit to the link circuit. This procedure is shown by the operation of switch 2506.

The operation of relay 6SG1, described above, completes a locking path over its own contacts and prevents the operation of other relays 6SG–. In addition, the contacts of relay 6SG1 prepare a path to operate the appropriate switch relay 25SW– in the marker circuit.

In FIG. 6, a ground condition is extended over the contacts of relays 12RLS2, 13INC, 7CK, 6SG1, and 5LD1–1, conductor TDG1–1 and cable 601 to the winding of relay 2AA1 to maintain that relay operated when relay 13TDG is operated as explained herein. Relay 7CK is operated over the contacts of relays 6SG1 and 13OTG to verify that only one relay 6SG– has been operated.

The operation of relay 11ALD, described above, removes the resistance battery from the windings of relays 11AL1, 11AL2, etc., to prevent an alarm indication. This feature will be described in further detail herein when multiple outgoing calls are considered. The operation of relay 7GCK1, as described above, removes the ground condition in the path to relay 7OKCK, also as described herein with respect to outgoing simultaneous calls.

It is now seen that after the operation of relays 7D, 6SG1, 11ALD, and 7GCK1, the additional relays operated include 7CK, 6DA1, 6DA2, and 13OTG.

Relay 13TDG is operated over the contacts of relays 7CK and 12RLS2. Relay 13OTG is locked operated over the contacts of relay 7CK in parallel with the contacts of relay 7D.

As shown in FIG. 13, the contacts of relay 7CK, in series with the lead 1/24GRD, are closed to check that only one relay 6SG– has been operated before a start signal is transmitted to the marker circuit.

The operation of relay 6DA1, described above, completes a path for relay 13OK which operates to indicate that a "one line only" condition is obtained which in turn removes the ground condition from delay relays 13DLY1–13DLY3. The latter relays serve to delay the start signal to the marker over conductor 1/24GRD.

The operation of relay 6DA2, described above, prepares a path for the operation of the pulse divider relays 6PD1 and 6PD2 in prepartion for advancing the allotter relays 6A1–6A8 to provide a new preference for relays 5LD1– and 6SG– on the next operation of the line chain and allotter circuit.

The operation of relay 13TDG removes the common ground on cable 601 at the contacts of relay 13TDG in FIG. 6 to prevent any further requests to the line chain and allotter circuit until the subsisting service request has been disposed of. It will be noted that this operation will release any relays 2AA–, etc., other than relay 2AA1 which is maintained operated over conductor TDG1–1 over the path above described.

The operation of relay 13TDG applies a ground condition to operate relay 13OK which will operate if relay 7OKCK has not yet operated. Relay 13DLY1 operates to initiate delay timing but is released when relay 13OK operates.

As a result of the foregoing relay operations, a start signal is now extended (to the marker circuit) in FIG. 13 from ground, contacts of relays 13TDG, 12RLS2, 13OK, 7CK, 13OTG, conductor 1/24GRD to FIG. 26 and the contacts of relay 26DCK, winding of marker start relay 26ST1 to negative battery.

*Marker operation*

The operation of relay 26ST1 results in the operation of relay 31LKD over an obvious path. The latter relay is a link demand relay which prepares for the selection of the link associated with the marked idle channel for connection to the calling line. The contacts of relay 26ST1 also extend a ground condition from the marker in FIG. 25 over the contacts of relay 25LCT, which is extended over the contacts of relay 5LD1–1 to operate relay 25SEA, the crossbar switch section relay in the marker circuit. In addition, a path is extended from FIG. 31 over the contacts of relays 34RLS, 25LCT, 26ST1 over conductor 2501 and the contacts of relay 6SG1 and 19LK1 to operate relay 25SW1 in the marker circuit.

It is assumed that link 1 is the available link and that the radio channel corresponding to link 1 has been marked with a frequency indicating that the link is idle. Relay 19LK1 was previously operated over the contacts of relay 31LKD as shown by switch 1905. As indicated heretofore, all idle mobile units will have automatically advanced to the idle marked channel.

The operation of relay 26ST1 also extends a ground condition to operate relay 24HS as shown symbolically by the operation of switch 2408. Since link 1 has been assumed to be available, relay 19LK1 has been operated as indicated above by a selector which is responsive to the availability of selected links as shown herein symbolically by switch 1905 over the contact of relay 31LKD. As shown in the checking circuit of FIG. 31, relay 31CK1 will be operated when one relay 19LK–, one relay 25SW– and one relay 25SE– have been operated. The operation of relay 31CK1 extends a path from conductor U/LGRD in FIG. 19 from ground, contacts of relays 31CK1, 34RLS, 25LCT, 26ST1 to the contacts of relay 34ES.

At this time the marker circuit awaits the transmission of the called mobile identification by the sender circuit.

*Sender circuit operation*

As described above, the operation of relay 24HS causes the operation of relay 24SQ1S over the contacts of relays 24ESS, 24SQ7S through 24SQ2S, winding of relay 24SQ1S to negative battery. Relays 22TH–HA, 22TH–HB and 22TH–HC are operated over switch 2211. At this time a path may be traced from FIG. 19 over switch 2211A and cable 1910 to conductor A1 in cable 203 FIG. 2 over the contacts of relay 5LD1–1, 2AA1, 2CT1 to terminal TH–H00 of FIG. 22, contacts of relay 22TH–HA, resistance 2205, winding of relay 22M10 to negative battery and resistance 2206, winding of relay 22M20 to negative battery. The operation of mark relays 22M10 and 22M20 identifies the thousands and hundreds digits of the called subscriber.

The contacts of relays 22M– are arranged in an appropriate tree configuration, only a portion of which is shown to provide a decimal to 2-out-of-5 translation. As shown in FIG. 29, the operation of relay 22M10 causes a signal to be extended from ground, contacts of relays 22SM, 22M10, additional contacts of relay 22M10, conductor TH7SC, cable 2901, winding of relay 23TH7S to negative battery. In addition, a similar path may be traced to operate relay 23TH4S. Ultimately, relays 23TH4S, 23TH7S, 23H4S, and 23H7S will be operated.

At this time relay 22FM is operated in consequence of the storage of the thousands and hundreds digits as shown symbolically by the operation of switch 2207. The operation of relay 22FM and switch 2212A initiates the identification of the tens and units digits of the mobile circuit by an extension of a ground condition over cable 1910, the contacts of relay 2AA1, 5LD1-1, conductor B1, cable 202 to terminal T-U01 of FIG. 28, contacts of relay 22T-UA, mark relay 22M10 over resistance 2208, and mark relay 22M21 over resistance 2209. Previous thereto relays 22T-UA, 22T-UB and 22T-UC are operated and switch 2212 and relays 22TH-HA, 22TH-HB and 22TH-HC released.

The operation of the relays 22M10 and 22M21 effects the storage of the tens and units digits of the called mobile over a path which may be traced from ground, contacts of relays 22SM, 22M10 and ultimately over contacts of relay 29SS, conductor T4SC, T7SC, U0SC and U1SC to operate relays 23T4S, 23T7S, 23U0S, and 23U1S. At this time the final four digits of the called mobile directory number have been stored and, in response to the operation of the tens and units storage relays, relay 22SM is operated as shown herein symbolically by switch 2210. The operation of the second mark relay indicates the storage of the directory number digits and initiates the operation of the outpulsing relays to transmit the called mobile identification. In consequence, the contacts of relay 24SQ1S extend a ground condition representing the first digit of the area code over conductors A0SC and A2SC to the windings of relays 17R0S and 17R2S. The outpulsing circuit 2406 is thereafter energized. The pulsing circuit applies ground pulses over lead 2405 in a cyclical manner until arrested. As each pulse is delivered, relays 18A, 18P1S, etc., are cyclically advanced over conductor 2410 in a conventional manner to count each digit outpulsed. When the number of digits outpulsed is equal to the digital value of the signals stored in relays 17R0S and 17R2S, a path is extended over cable 1705 and conductor 25C to operate relay 18DE to signal the end of digit pulsing or the end of the first digit (2) of the area code 212. The operation of relay 18DE prevent further outpulsing by opening the path from the pulsing circuit of FIG. 24.

During the interdigital period when relay 18DE is operated, relay 18ID1 is operated as shown symbolically by switch 1805. Relay 18ID2 is subsequently operated by switch 1806 to cause the release of relay 18DE. The operation of relay 18ID2 also applies a mark to a particular conductor—in this case, conductor 5SC which determines the number of pulses the counting train will receive to control the interdigital period. At this time, additional pulses from the pulsing circuit 2406 of FIG. 24 are extended over the conductor 2410 to operate the counting circuit (while no pulses are transmitted over conductor 2405) until a count of five has been reached at which time a path is again extended for the operation of relay 18DE. When relay 18DE is again operated, the pulser action is interrupted. At this time, relays 18ID1, 18ID2 and 18DE are released and relay 24SQ2S is operated as shown by switch 2411 to initiate transmission of the second digit of the area code. Thus, with the operation of relay 24SQ2S and the release of relay 24SQ1S, a path is extended over conductors B0SC and B1SC to operate relays 17R0S and 17R1S representing the second digit (1) of the area code 212. A similar procedure is followed for the outpulsing to the link circuit and thereafter over the radio channel through conductor 2405 of the second digit. The third digit (2) is transmitted in a similar manner. When relay 24SQ4S is operated, a path is extended over the contacts of relays 23TH4S and 23TH7S to operate relays 17R4S and 17R7S. In this manner the remaining digits are transmitted.

It will be noted that although the calling party has dialed the conventional directory code number of the called mobile station, REctor 2-0001, that the digits outpulsed over the idle radio channel to all called mobiles correspond to the digits 212 of the area code followed by the called directory number digits 0001.

When the sender circuit has completed outpulsing the called mobile identification digits, as described above, a ground is extended to the end of signaling relay 24ESS which in turn is extended over conductor ES from FIG. 18 to FIG. 34 of the marker circuit and over the contacts of relays 32INCM and 26ST1 to operate relay 34ES. The latter relay locks operated under the control of relay 26ST1.

*Connection of line to link circuit*

On the completion of signal transmission, the marker prepares to extend a ground over conductor U/LGRD in FIG. 19 from ground, contacts of relays 31CK1, 34RLS, 25LCT, 26ST1, 34ES, conductor U/LGRD, cable 1910, contacts of relay 5LD1-1 in FIG. 2, contacts of relays 2AA1, 2CT1, conductor U1-11C and thence over cable 1910 to conductor UP1C of FIG. 19. The circuit is further extended from conductor UP1C over the contacts of relay 19UP1, winding of relay 19UP1 to negative battery. As explained above, the marker relays 26ST1, 25SW1, 25SEA, 19LK1, 34ES, and 19UP1 are now operated. The ground on conductor UP1C is extended over the contacts of relay 19UP1 and conductor 1911, contacts of relay 25SW1, conductor SM1-11C, cable 2001, and conductor SM1-11C to the winding of relay 14SM1-11. This results in the operation of select magnet 14SM1-11 unique to the called mobile line number. The contacts of relay 14SM1-11 extend a ground condition back over conductor S0N1-111C, cable 2001, conductor S0N1-111C, contacts of relay 25SW1 to the winding of relay 20S0N1 and negative battery. The operation of the latter relay extends a path in FIG. 19 from ground, contacts of relays 34RLS, 25LCT, 26ST1, 20S0N1, 19UP1, conductor 1912, contacts of relay 25SW1, condutor SMU-11C, cable 2001, conductor SMU-11C, winding of relay 14SMU-11 to negative battery. The operation of the latter select magnet relay associated with horizontal level H11 of switch 1 of FIG. 8 prepares the crossbar switch to connect line 1 to link 1 when the hold magnet is operated. A path may now be traced in FIG. 14 from ground, contacts of relay 14SMU-11, conductor S0N2-11C, cable 2001, conductor S0N2-11C, contacts of relay 25SW1, winding of relay 20S0N2 to negative battery. The operation of the latter relay prepares for the cut-through of the line to the link and completes a path for the operation of the hold magnet which may be traced in FIG. 25 from ground, switch 2507, contacts of relays 34RLS, 25LCT, 20S0N2, 20S0N1, 19LK1, 25SEA, 25SW1, HM1-11C, cable 2502, conductor HM1-11C, winding of relay 10HM1-11 to negative battery (not shown), over conductor HB1-1, cable 2802 to the link circuit of FIG. 28. The switch 2801 is symbolic of a conventional supervisory relay in the link circuit and maintains hold magnet 10HM1-11 operated over conductor H1-1 and cable 2802.

When hold magnet 10HM1-11 is operated, a path is extended from the tip, ring, and sleeve conductors of line circuit 0001 to link 1. In addition, ground is extended from the link circuit over switch 2801 to conductor H1-1. The sleeve conductor of the link circuit extends a ground condition through the crosspoint contacts to operate relay 2CT1 in the line circuit. The operation of relay 2CT1 releases the ground condition on conductor U1-11C which in turn releases the select magnets 14SM1-11 and 14SMU-11. Moreover, relay 2AA1 is released at the contacts of relay 2CT1 in series with the windings thereof. When select magnet 14SM1-11 is released, relay 20S0N1 releases to open the operating path for the hold magnet which, however, remains operated over the conductor extending to the link circuit. Relay 25LCT is operated at this time, as shown symbolically by the closure of switch 2506, over a path including the contacts of relay 7D, winding of relay 25LCT to negative battery. The operation of the latter relay causes the release of relays 25SEA, 25SW1, as well as relays 19LK1, 19UP1, and 20S0N2. Relay 34RLS is operated at the contacts of relay 25LCT to initiate the marker release operation. As shown in FIG. 12, conductors 5 and 6 are interconnected over the contacts of relay 34RLS to extend a ground condition to operate relay 12RLS2. The operation of the latter relay removes the operating ground from conductor TDG1–1 in FIG. 6 and removes ground from lead LKD in FIG. 13. It was noted previously that relay 2AA1 was released when relay 2CT1 was operated. Release of relay 2AA1 causes the release of relay 5LD1–1 which in turn causes the release of relays 6SG1, 7GCK1, 7D, and 11ALD. The release of relay 6SG1 causes the release of relay 7CK and the release of relay 7D causes the release of relays 6DA1 and 6DA2. Release of relay 7CK will effect the release of relay 13OTG and release of relay 6DA1 releases relay 13OK. The locking grounds coupled to the winding of relay 12RLS2 have now been removed to release that relay.

When the line chain and allotter has completed its release function, ground is removed from conductor 1/24GRD to release relay 26ST1.

Release of the latter relay causes the release of relays 31CK1, 34ES, and 25LCT. Moreover, the path to relay 26DCK is prepared at the contacts of relay 26ST1 to operate relay 26DCK if any of the marker relays are not restored to normal. The connection is maintained between the line circuit and the link circuit under control of the hold magnet 10HM1–11 which is in turn under the supervision of the link circuit as shown symbolically by switch 2801.

It will be noted that when the seventh digit was outpulsed, relay 24ESS in the sender was operated whereupon the sender is released as shown symbolically by the release of switch 2408.

Heretofore, the hold magnet has been held operated by the link circuit. When a disconnect signal is received from the mobile unit, the link circuit removes the ground condition from lead S to release the hold magnet which in turn releases the crosspoint and causes relay 2CT1 to release.

INCOMING CALL

It will now be assumed that mobile station 0001 is originating a call which will be extended through the conventional central office over the terminals 0001 of FIG. 2. As described above, the off-hook condition at the calling mobile station results in the seizure of an idle marked channel and the delivery of the signal to the link circuit in FIG. 28 associated with the idle marked channel. For illustrative purposes, it will be assumed that link 1 is the selected channel. When the link circuit is seized, a signal is transmitted to operate relay 13INC as shown herein symbolically by switch 1307. Operation of relay 13INC causes the operation of relay 13TDG over the contacts of relay 12RLS2. Relay 13INC opens the path to relay 13OTG and opens conductor LKD since a link circuit is already selected.

Operation of relay 13TDG removes ground from leads TDG1– to prevent outgoing calls. In the interim the register circuit is seized as shown symbolically by the operation of switches 1605 and 1606. The pulses received by the register over the radio channel and link 1 are delivered over the contacts of relay 16AH to relay 16L. It is understood that conventional responsive equipment in the link circuit will respond to the pulses transmitted in the form of frequency signals over the radio channel to cause corresponding pulsing of relay 16L. For simplicity, this operation is shown symbolically by the appropriate operation of relay 28PLS. Again it will be illustratively assumed that the digits automatically transmitted by the calling mobile unit are 212–0001.

As seen from FIG. 16, relay 16AR is initially operated over a path from ground, contacts of relays 16H, 16AH, 16L, 16SR, 16P6, winding of relay 16AR to negative battery. Relay 16AR locks operated over its own contacts. A subsequent pulse at the contacts of relay 16L is delivered over the contacts of relay 16AR to operate relay 16P1. The remaining pulses operate the biquinary relays 16P2–16P6 in a similar and well-known manner. Assuming that the first digit is a "2," relay 16P2 will be operated. In consequence, a path may be traced from ground, contacts of relays 16AH, 27T0R, 22GDA, 16SR, 16P5, 16P4, 16P3, 16P2, 16P1 and 16AS to conductor A2. Moreover, the path extends also to conductor A0 over additional contacts of relays 16P5, 16P4–16P1, 16P6, and 16AS. At the end of each series of pulses, relay 16SR is released which in turn causes the release of relay 16AS. In consequence, the relays in the counting chain are released.

When the register was seized, relay 27SQ1 was operated resulting in the extension of the counting circuit of FIG. 16 over cable 1601 to the register relays 15A0R–15A7R of FIG. 15. In this manner relays 15A0R and 15A2R will be operated. Relays 15R0–15R7 verify the two-out-of-five operation of the register relays.

Since it has been assumed that the area code is 212, the succeeding digit to be counted and stored in the register will be "1." In consequence, relays 15B0R and 15B1R will be operated. In a similar manner, relays 15C0R and 15C2R will be operated to store the final digit "2" of the area code. It is seen from FIG. 27 that a ground condition will be applied beginning in FIG. 15 at the contacts of relay 15H to each conductor associated with an operated relay which stores the area code. Since the digits 212 have been stored, none of the terminals of FIG. 27 which are cross-connected to conductors DA1, DA2, etc., is energized. This signifies that the calling mobile station has transmitted the local area code and is therefore a home mobile station rather than a roaming mobile station. If any other digit had been transmitted as part of the area code, one of the nine conductors cross-coupled to terminals DA1, DA2, etc., of FIG. 27 would have been energized, thus extending a signal through the corresponding diode CR– to the marker circuit from FIG. 32 to operate relay 32ROAM over conductor TOG. The operation of this relay transmits a signal condition to the operator switchboard shown in FIG. 1D to summon the operator for completion of the connection since the call is being originated by a roaming mobile station.

Assuming that the digits transmitted, representative of the area code, are correct, the remaining four digits 0001 which are automatically transmitted from the mobile station, are stored in relays 21TH4, 21TH7, 21H4, 21H7, 21T4, 21T7, 21U0, and 21U1.

When the seven digits have been stored and relay 27SQ7 is released and relay 27SQ8 operated, a signal is delivered to the marker to operate relay 26ST2 as shown symbolically by the actuation of switch 2601. The marker in turn delivers a ground over the contacts of relay 26ST2 to operate relay 27MR1. Relay 27MR2 operates over an obvious path and effects a transfer of the digits in the final four digit register relays to corresponding registers in the marker circuit, FIG. 34 over cable 3401. Thus, for example, a path may be traced from ground, contacts of relays 16H, 21TH4, 27MR2, conductor TH4A, cable 3401 to operate relay 34TH4M. Similar paths may be traced for the operation of the remaining storage relays 34TH7M, 34H4M, 34H7M, 34T4M, 34T7M, 34U0M and 34U1M in FIG. 34 of the marker. Relays 33THI0 and 33TI0 are operated at this time over the contacts of relays 31CK2 and the operated register relays. The marker circuit thereafter extends a ground condition over conductors A1 and B1 which may be traced, for example, in FIG. 33 from ground, contacts of relays 34RLS, 25LCT, 31CK2, 34U4M, 34U2M, 34U1M, 34U0M, contacts of relay 33TI0 to terminal T–U01 and conductor B1. A similar path may be traced for terminal TH–H00 from FIG. 34. In consequence, battery is applied over a path in FIG. 34 from the contacts of relays 34RLS, 25LCT, 34SCK, winding of relay 34SCK to the thousands and hundreds terminals, whereas ground is extended to the tens and units terminals of FIG. 33. In consequence, relay 2AA1 will be operated over cable 203 and conductors A1 and B1 to initiate the operation of the line chain and allotter circuit in the manner described above for an outgoing call.

It is significant to note that although the call being serviced is an incoming call from a mobile station that the control equipment is arranged to proceed in a manner analogous to that described above for an outgoing call. For example, the line chain and allotter circuit will function in response to the operation of relay 2AA1 in the manner described above for the operation of the same relay on an outgoing call. In addition, upon completion of the selection function of the line chain and allotter circuit and the energization of conductor 1/24GRD to the marker circuit, marker operation will be the same as that previously described for an outgoing call.

It will be noted that relay 13INC was operated, as described above, and remains operated under control of switch 1307. Relay 31LKD is operated over the contacts of relay 32INCM. When relay 26ST1 is operated over conductor 1/24GRD, the subsequent procedure including the operation of the select magnets and hold magnet is similar to that described above for an outgoing call with the exception that relay 34ES is not operated since the sender is not actuated. When relay 25LCT is operated, indicating the cut-through of the line to the link circuit, the demand signal to the register circuit is released as shown by the opening of switches 1605 and 1606. Thereupon, the register storage relays are released. When relay 26ST2 is released, as shown symbolically by the opening of switch 2601, relay 31CK2 is also released, in turn releasing relays 33THI0, etc., and 33TI0, etc. It will be noted that the battery and ground applied to the appropriate terminals of FIG. 33 are removed when relay 25LCT is operated. This in turn causes the release of relay 2AA1 which results in the release of the line chain and allotter circuit in the manner described above. When the marker relays are all restored to normal, relay 26DCK is released to permit servicing another call.

OUTGOING MULTIPLE DEMANDS

The above description applied to a single outgoing call on the line chain and allotter circuit. However, it is possible for more than one relay 2AA1, etc., to be operated at the same time and therefore to place multiple demands on the line chain and allotter circuit. In the case of multiple demands in the same line group of twenty lines, the chain circuit including the contacts of relays 2AA1, 2AA11, 3AA20, etc., control the operation of only one line relay 2AA1, etc. In consequence, only one relay 2AA1, etc., in a particular line group can be operated at any specific time. In the switch group, which includes four line groups or eighty lines, four demands may be made on the associated line group demand relays 5LD1–1 through 5LD4–1. Since the latter relays are in a chain circuit, only one relay 5LD– in a particular group may lock operated. Since all relays 3CHAL– are released by the respective operated relays 2AA–, 3AA–, etc., the ground condition from the nonoperated contacts of relays 5LD– will be transferred to lead OKCK when the respective relays 3CHAL– release. This ground on lead OKCK causes the operation of relay 7OKCK and prevents the operation of relay 13OK to delay a ground condition on lead 1/24GRD to the marker.

When relay 13TDG is operated, as described for an outgoing call, all remaining relays 2AA1, etc., except the relay which is operated over a ground from conductor TDG– will release. Upon release, the respective line group chains, over the contacts of relays 2AA1, etc., are closed to reoperate the associated relays 3CHAL–. This in turn removes the ground condition from lead OKCK which was applied over the contacts of relays 3CHAL–, 4CHAL–, etc., in FIG. 11. The particular relay 3CHAL–, etc., associated with the selected relay 5LD– will not reoperate since the ground condition for the particular combination of relays 5LD1–1 and 3CHAL1–1 was removed when relay 5LD1–1 operated. It may be assumed that a particular relay 2AA1, etc., has been operated in each of the twenty-four line groups. As a result, a relay 5LD1–1, etc., in each of the six line group demand circuits has been operated. When the associated relays 3CHAL1–1, release, a ground condition will not be extended to lead OKCK. Thereafter when relay 5LD1–1 operates, ground is applied to operate relay 7GCK1, etc.

If it has been assumed that all group check relays 7GCK1–7GCK6 operate since there is a demand in each switch group, the latter relays will place a ground on lead OKCK when no relays 7GCK– are operated or when more than one relay 7GCK– is operated. In consequence, multiple demands from plural switch groups operate relay 7OKCK when the demand relay 7D operates and prevent operation of relay 13OK until all relays 5LD1–1, etc., except one, have released to check that all relays 2AA1, etc., except one, have been released.

OPERATION OF DELAY RELAYS

The function of relays 13DLY1–13DLY3 is to provide a ground condition on conductor 1/24GRD when an open chain condition exists in any line group to release the associated relay 3CHAL1–1, etc. Since the open chain condition can be caused by a fault, the released relay 3CHAL1–1, etc., will maintain a ground on lead OKCK to operate relay 7OKCK when an outgoing demand is made on the line chain and allotter circuit.

When a demand is originated and relay 7D operates, as described above, relay 7OKCK will operate and will not be released during the timing period. When relay 13TDG operates, a ground condition will be extended over the contacts of relays 6DA1, 13OK, 13DLY3, and the winding of relay 13DLY1 to negative battery. Thereafter, relays 13DLY1–13DLY3 operate sequentially. Relay 13DLY2 locks operated over the contacts of relay 13DLY1. When relay 13DLY3 operates, it removes ground from the winding of slow-to-release relay 13DLY1. Thereafter, the latter relay releases and in turn releases relay 13DLY2. At this time a path may be traced from ground, contacts of relays 13TDG, 12RLS2, 13DLY3, 13DLY2, 7CK and 13INC. Since the operation of relay 13TDG removes ground from all except the selected relay 2AA1, etc., the timing provided by relays 13DLY1, etc., allows all excess relays 2AA– to restore to normal.

TIME-OUT RELEASE ON AN OUTGOING CALL

In response to the operation of relays 7D and 6DA1, as described above, a path is extended to operate relay 13TP1 over conductor 2 and the contacts of relay 13TP2. This signal is transferred from the marker over the contacts of relay 34ES on lead 2 as shown in FIG. 13. The first pulse operates relay 13TP1 which locks to ground over its own contacts and the contacts of relay 6DA1 through the winding of relay 13TP2. The operation of relay 13TP1 opens the operate path for relay 12RLS1 and prepares a path for the operation of relay 13TP2. When the first pulse is terminated, relay 13TP2 operates in series with the locking path for relay 13TP1. Thus, relays 13TP1 and 13TP2 are operated.

Illustratively, fifteen seconds is allowed as the time for the sender to operate the end of signaling relay 34ES in the marker. If for any reason the end of signaling relay is not operated by the sender before the second pulse, a time-out condition exists and the line chain and allotter is released. The second pulse grounds the winding of relay 13TP1 in a direction opposite to that of the locking winding to release the relay and maintains the operation of relay 13TP2 over its lower winding. When relay 13TP1 releases, a path is again completed for operating relay 12RLS1 which locks operated to the multiple ground path from the operated line chain and allotter relays. The operation of relay 12RLS1 prepares a ground path to operate relay 12RLS2. The latter removes the ground condition on lead 1/24GRD to release the marker circuit relays. Relays 12RLS1 and 12RLS2 release when the remaining line chain and allotter relays release.

ALL-CHANNELS-BUSY CONDITION ON AN OUTGOING CALL

When all channels are busy, the link circuit will apply a ground condition to lead ATB. When an outgoing call is initiated by the central office in the manner described above, relay 2RD1 operates over a ground condition on the tip terminal in the central office. Relay 2BY1 operates over the contacts of relays 2CT1, 2AA1, and 2RD1 to the all-channels-busy lead ATB. At this time, busy tone is connected over condenser 2005, contacts of relays 2RD1, 2BY1 to the tip conductor T and the tip terminal of substation 0001 in the central office. When ringing is received on conductor R in the conventional manner, gas tube 2006 will be ionized and the central office conventional ring tip relay (not shown) will operate.

In this manner the calling party will receive busy tone until the call is discontinued.

It is to be understood that the above-described arrangements are illustrative of the application of the principles of the invention. Numerous other arrangements may be devised by those skilled in the art without departing from the spirit and scope of the invention.

What is claimed is:

1. A mobile radio telephone system comprising a plurality of mobile telephone units, a control terminal individual to a particular area code designation, each of said mobile units having a unique office code, directory station number and area code designation, means in said control terminal effective during a calling connection to a particular unit for generating first signals representative of said mobile directory station number, sender means for prefixing to said first signals second signals representative of the area code designation of said control terminal, and additional means in said sender means for outpulsing said first and second signals to differentially select among stations having the same office code and directory station number designation.

2. A mobile radio telephone system including a plurality of mobile radio units having directory numbers and area code designations, certain of said units having the same directory numbers, a control terminal having an area code designation, a plurality of terminations in said control terminal individual to said mobile units, and means in said control terminal effective in response to the energization of one of said terminations indicative of an outgoing calling condition to a particular one of said mobile units for generating first signals representative of said mobile unit, which first signals may be common to more than one of said mobile units, and for generating additional signals representative of the area code designation of said control terminal.

3. A mobile radio telephone system including a telephone central office having a particular office code and area code designation, a plurality of terminations in said office individual to mobile radio units, a control terminal in said office including a plurality of terminations individually connectable to said central office terminations, each of said central office terminations corresponding to a directory station number, means in said control terminal effective in response to the energization of said central office line terminations for energizing corresponding control terminal terminations, means responsive to the energization of said control terminal terminations for generating signals representative of the directory station numbers of said mobile units individual to said terminations, and means for prefixing said signals with additional signals representative of the area code designation of said central office.

4. A mobile radio telephone system for use with a plurality of mobile radio units each having a standard area code, office code, and directory station number designation, comprising a telephone central office having a particular office code and area code designation, a control terminal in said office, a plurality of links in said control terminal individual to radio communication channels, a plurality of line terminations in said control terminal individual to the mobile units, switching means for coupling said terminations to said links, means in said control terminal effective in response to a calling connection to a particular one of said line terminations for controlling said switching means to couple said line termination to a selected idle link, and additional means in said control terminal for delivering outgoing signals to said link representative of the directory station number designation of the mobile unit individual to said particular line termination and means for prefixing signals representative of the area code of said telephone central office.

5. A mobile radio telephone system comprising a plurality of mobile radio units having area code designations, a telephone central office having a particular area code designation, a control terminal in said telephone office, register means in said control terminal effective in response to a calling condition from one of said mobile stations for receiving and storing signals indicative of the area code designation of said calling station, and additional means for delivering a signal indication to a mobile radio operator in response to the reception of an area code designation different from the area code designation of said telephone office.

6. A mobile radio telephone system comprising a telephone central office having a particular area code designation, a control terminal, a plurality of remote mobile telephone units, register means in said control terminal effective in response to an incoming calling signal from one of said mobile units for receiving and storing signals from said mobile unit indicative of the area code designation of said calling mobile unit and the directory number designation of said unit, comparator means responsive to said register means for comparing said mobile unit area code designation with the area code designation of said telephone office, and additional means in said control terminal responsive to a mismatch between said central office and mobile unit area code designations for alerting a mobile radio operator.

7. A mobile radio telephone system including a telephone central office, a control terminal in said office, a plurality of mobile radio units, a plurality of terminations in said office and said control terminal individual to said mobile units, a plurality of links in said control terminal individual to radio transmission channels, means in said terminal effective in response to an incoming calling signal from a particular mobile unit for receiving and registering signals indicative of the area code designation of said mobile unit and the directory number designation of said unit, comparator means for comparing said received area code designation with said area code designation of said telephone office, means in said control terminal effective responsive to a mismatch between said area codes for alerting a mobile radio operator, and additional means effective responsive to a matching of said area code designations for coupling said line termination individual to said particular mobile unit to a selected idle link and radio channel.

8. A mobile radio telephone system including a telephone central office, a control terminal, a plurality of terminations in said office and said control terminal individual to local remote mobile telephone units, a plurality of links and radio channels coupled to said control terminal, means in said terminal effective in response to the energization of a line termination in said office for generating signals indicative of the mobile unit individual to said termination, additional means for prefixing signals indicative of the area code designation of said office and local mobile units for differentially selecting among units having the same directory number designations, register means in said control terminal effective in response to an incoming call from a particular mobile unit for receiving and registering signals indicative of the area code designation of said mobile unit and the directory number designation of said mobile unit, and comparator means in said office effective in response to a mismatch between said area code designations indicating a calling roaming station for alerting a mobile radio operator.

9. A mobile radio telephone system including a telephone central office having a particular area code designation, a control terminal, a plurality of remote mobile units, a plurality of terminations in said office and said control terminal individual to said units, a plurality of link circuits individual to radio channels, means in said terminal effective in response to a calling connection to one of said office terminations for generating signals indicative of the area code designation of said central office for differentially selecting among remote mobile units having similar directory designations, means in said control terminal effective in response to a calling condition from a remote mobile unit for receiving and registering signals indicative of the area code designation of said calling mobile unit and for comparing said designation with the area code designation of said mobile units individual to said line terminations, means responsive to a matching condition between said area code designations for extending a connection between a link circuit and said particular line termination, and means effective responsive to a mismatch between said area code designations indicating a calling roaming station for alerting a mobile radio operator.

10. A mobile radio telephone system including a telephone central office having a particular area code designation, a plurality of remote mobile units, a control terminal in said office, a plurality of line terminations in said office and said control terminal individual to said mobile units, means in said office responsive to the extension of a calling connection to a particular line termination representative of a called mobile unit for energizing said corresponding line termination in said control terminal, means responsive to the energization of said control terminal termination for effecting an equipment-to-directory-number translation, means responsive to said translation for generating signals for transmission to all of said mobile units representative of the directory station number designation of said mobile unit, and additional means responsive to said translation for generating additional signals indicative of the area code designation of said office for transmission to all of said remote units for differentially selecting among units having similar directory numbers and different area code designations.

11. An automatic telephone switching system comprising a control terminal having a particular area code designation, means in said terminal effective in response to a calling connection to a particular mobile unit for generating signals for transmission to all said mobile units indicative of the directory station number designation of said particular mobile unit, and additional means in said control terminal for transmitting signals indicative of the area code designation of said control terminal for differentially selecting among said called mobile unit and roaming units having the same directory number designation.

12. An automatic telephone switching system including a control terminal having a particular area code designation, means in said terminal effective in response to a calling signal from a particular mobile unit indicative of an incoming calling connection for receiving and registering signals representative of the area code designation of said calling mobile unit, additional means in said terminal for comparing said received area code designation with the area code designation of said terminal, and additional means responsive to a mismatch indication representative of a calling roaming unit between said area code designations for transmitting a signal indication to an operator switchboard.

13. An automatic telephone switching system comprising a telephone central office, a control terminal, a plurality of remote mobile units, a plurality of terminations in said office and said terminal individual to said remote mobile units, said office having a particular area code designation in accordance with a nationwide numbering plan system, means responsive to the extension of a calling connection to a particular line termination in said office for energizing the corresponding line termination in said control terminal, means in said office effective in response to the energization of said terminal termination for effecting an equipment-to-directory-number translation of said mobile unit individual to said termination, a cross-connecting field in said control terminal, a plurality of bistable devices, means for sequentially coupling said field to said bistable devices for generating signals indicative of the area code designation of said office, and additional bistable devices responsive to said translation for generating signals indicative of the directory station number designation of said particular mobile unit.

14. An automatic telephone switching system including a telephone central office, a control terminal, a plurality of line terminations in said office and said control terminal individual to remote mobile radio units, said office having an area code designation in accordance with a universal area numbering plan, bistable means in said office effective in response to the reception of a signal indicating a calling condition at one of said remote units for receiving and registering signals indicative of the area code designation of said remote mobile unit, cross-connecting fields in said terminal, and means effective in response to the operation of said bistable devices for energizing said fields in response to a mismatch between said area code designation of said calling mobile unit and the area code designations of said office.

15. An automatic telephone switching system comprising a telephone central office, a control terminal, a plurality of line terminations in said office individual to remote mobile units, said office and terminations having an area code designation assigned in accordance with a universal numbering plan system, means in said terminal effective in response to the energization of particular terminations in said office for effecting a line location to directory number translation of said mobile unit individual to said termination, relay storage means operable in response to said translator means for storing the directory station number designation, and additional means including cross-connecting fields and bistable devices connectable to said fields for generating signals indicative of said area code designation of said office and termination for transmission to all said mobile units to differentially select among units having similar directory numbers and different area code designations.

16. An automatic telephone switching system in accordance with claim 15 including in addition a plurality of link circuits individual to radio channels, and switching means for coupling said line terminations to said links to effectuate communication paths between said line terminations individual to said mobile units and said respective mobile units.

17. An automatic telephone switching system in accordance with claim 16 wherein said link circuits are fewer in number than said line terminations, and including in addition link selecting means for designating a particular link and corresponding idle channel for utilization on a succeeding calling connection.

18. An automatic telephone switching system including a telephone central office, a control terminal in said office, a plurality of remote mobile units, a plurality of line terminations in said office and said control terminal individual to said mobile units, means in said terminal effective in response to the reception of signals indicative of a calling condition at a particular mobile unit for receiving and registering signals indicative of the area code designation and directory number designation of said calling mobile unit, additional means in said office including cross-connecting fields and bistable devices connectable to said fields for comparing said area code designation with the area code designation of said office terminations, and means responsive to a mismatch condition between said designations for transmitting a signal to an operator switchboard.

19. An automatic telephone switching system in accordance with claim 18 including in addition a plurality of link circuits in said terminal individual to radio channels, switching means for coupling said link circuits and channels to said terminations, and means responsive to a match condition between said area code designation of said calling mobile unit and said area code designation of said terminations for controlling said switching means to extend a connection between said termination individual to said calling mobile unit and a selected idle link.

20. An automatic telephone switching system in accordance with claim 19 wherein said means for controlling said switching means includes additional means responsive to the reception of said signals representative of the directory number designation of said calling mobile unit for energizing said line termination in said terminal individual to said mobile unit, and wherein said means for controlling said switching means further includes translating means for effecting an equipment-to-directory-number translation of said mobile unit identification and means responsive to said translating means for energizing said switching means to effect said connection between said line termination and a selected idle link.

References Cited

UNITED STATES PATENTS

| | | | |
|---|---|---|---|
| 3,118,018 | 1/1964 | Cornell et al. | 179—41 |
| 3,173,996 | 3/1965 | Rypinski | 179—41 |

KATHLEEN H. CLAFFY, *Primary Examiner.*

A. H. GESS, *Assistant Examiner.*